(12) United States Patent
Rappaport

(10) Patent No.: US 9,044,682 B1
(45) Date of Patent: Jun. 2, 2015

(54) METHODS AND APPARATUS FOR ELECTRONIC COMMERCE INITIATED THROUGH USE OF VIDEO GAMES AND FULFILLED BY DELIVERY OF PHYSICAL GOODS

(71) Applicant: Matthew B. Rappaport, Austin, TX (US)

(72) Inventor: Matthew B. Rappaport, Austin, TX (US)

( * ) Notice: Subject to any disclaimer, the term of this patent is extended or adjusted under 35 U.S.C. 154(b) by 87 days.

(21) Appl. No.: 14/107,308

(22) Filed: Dec. 16, 2013

Related U.S. Application Data

(60) Provisional application No. 61/883,189, filed on Sep. 26, 2013.

(51) Int. Cl.
*G06Q 30/00* (2012.01)
*A63F 13/30* (2014.01)
*G06Q 30/06* (2012.01)
*A63F 13/20* (2014.01)
*G06Q 30/02* (2012.01)
*A63F 13/61* (2014.01)

(52) U.S. Cl.
CPC ............ *A63F 13/12* (2013.01); *G06Q 30/0641* (2013.01); *A63F 13/06* (2013.01); *G06Q 30/0253* (2013.01); *G06Q 30/0209* (2013.01); *G06Q 30/02* (2013.01); *G06Q 30/0633* (2013.01); *G06Q 30/0613* (2013.01); *G06Q 30/0617* (2013.01); *G06Q 30/06* (2013.01); *G06Q 30/0601* (2013.01); *A63F 13/61* (2014.09)

(58) Field of Classification Search
CPC .............. G06Q 30/02; G06Q 30/0209; G06Q 30/0253; G06Q 30/06; G06Q 30/0601; G06Q 30/0603; G06Q 30/0641; G06Q 30/0613; G06Q 30/0617; G06Q 30/0633; G06Q 30/0269; G06Q 30/0643; H04L 67/02; H04L 67/306; H04L 9/3231; H04N 21/4532; H04N 21/44222; H04N 21/812
USPC .................. 463/29, 40–42; 705/14.12, 19.19, 705/14.23, 14.26, 26.1
See application file for complete search history.

(56) References Cited

U.S. PATENT DOCUMENTS

| 8,090,618 B1 * | 1/2012 | Chu ............................. 705/26.1 |
| 2005/0137015 A1 * | 6/2005 | Rogers et al. .................... 463/42 |
| 2007/0276721 A1 * | 11/2007 | Jackson .......................... 705/10 |

(Continued)

OTHER PUBLICATIONS

Lotro-Wiki.com,"Turbine Point", Apr. 23, 2012, <http://lotro-wiki.com/index.php?title=Turbine_Point&oldid=461847>.*

*Primary Examiner* — Justin Myhr
(74) *Attorney, Agent, or Firm* — Whitham Curtis Christofferson & Cook, PC

(57) ABSTRACT

Some embodiments present systems and methods for electronic commerce within video game environments. Some embodiments perform displaying within a video game environment a representation of a merchant outlet, receiving input originating from a video game player indicating acceptance of one or more offers of items for sale, and, responsive at least in part to the input originating from the video game player indicating acceptance of one or more offers of items for sale, preparing an order for one or more item corresponding to one or more of the offers of items for sale to be physically delivered to the video game player. Within the video game environment, the merchant outlet presents one or more offers of items for sale. The offers of items for sale comprise one or more offers of items for sale having physical existence outside of the video game environment.

3 Claims, 33 Drawing Sheets

(56) References Cited

U.S. PATENT DOCUMENTS

| | | | |
|---|---|---|---|
| 2008/0214253 A1* | 9/2008 | Gillo et al. | 463/1 |
| 2008/0263454 A1* | 10/2008 | Chan et al. | 715/745 |
| 2009/0222127 A1* | 9/2009 | Lind | 700/132 |
| 2009/0248544 A1* | 10/2009 | Ganz | 705/27 |
| 2010/0030564 A1* | 2/2010 | Castineiras | 705/1 |
| 2010/0030578 A1* | 2/2010 | Siddique et al. | 705/3 |
| 2010/0030660 A1* | 2/2010 | Edwards | 705/27 |
| 2010/0058183 A1* | 3/2010 | Hamilton et al. | 715/706 |
| 2010/0070378 A1* | 3/2010 | Trotman et al. | 705/26 |
| 2010/0121810 A1* | 5/2010 | Bromenshenkel et al. | 706/54 |
| 2010/0185514 A1* | 7/2010 | Glazer et al. | 705/14.51 |
| 2011/0124390 A1* | 5/2011 | Wilen | 463/9 |
| 2012/0021814 A1* | 1/2012 | Gurovich et al. | 463/16 |

* cited by examiner

US 9,044,682 B1

METHODS AND APPARATUS FOR ELECTRONIC COMMERCE INITIATED THROUGH USE OF VIDEO GAMES AND FULFILLED BY DELIVERY OF PHYSICAL GOODS

CROSS REFERENCE TO RELATED APPLICATIONS

This application claims benefit of priority of U.S. Provisional Application Ser. No. 61/883,189 entitled "Electronic Commerce Through The Use Of Video Games And Computer Networking" filed Sep. 26, 2013, the content of which is incorporated by reference herein in its entirety.

BACKGROUND

Description of the Related Art

Many retailers now maintain online presences. Shopping on online stores accounts for billions of dollars in annual sales, and has become an integral part of many merchants' retail business strategy. However, in spite of the growth and popularity of online stores, the Internet, and video games, there is presently no way for video game players to perform shopping for real life goods and services within the gameplay of the video games they play. There are many possible reasons for this. The current format and structure of online stores does not lend itself to inclusion as part of many video games, owing to the aesthetics of the video game environment.

By way of example, a video game may present a virtual video game environment that is futuristic, space-based, fantasy-based or otherwise. A conventional online store does not fit with such an environment aesthetically—as such stores operate as standalone websites or apps with their own aesthetics—and would thus clash and/or be out of place if they were combined with a video game's virtual environment. Video games may also present three dimensional worlds where a conventional online store (usually presented in the form of a two dimensional website or app interface) simply does not fit with the atmosphere, feel, and tenor of the game because of the difference of the rendering of the virtual video game environment as compared to the rendering of the online store. Moreover, the wide variety of programming languages used to create and present online stores (i.e., HTML, XHTML, XML, PERL, ASP, Java, and JavaScript languages, among others) does not necessarily overlap with the programming languages that video games are created and presented with today.

SUMMARY

Some embodiments present systems and methods for electronic commerce within video game environments. Some embodiments perform displaying within a video game environment a representation of a merchant outlet, receiving input originating from a video game player indicating acceptance of one or more offers of items for sale, and, responsive at least in part to the input originating from the video game player indicating acceptance of one or more offers of items for sale, preparing an order for one or more item corresponding to one or more of the offers of items for sale to be physically delivered to the video game player. Within the video game environment, the merchant outlet presents one or more offers of items for sale. The offers of items for sale comprise one or more offers of items for sale having physical existence outside of the video game environment.

Figure 1:
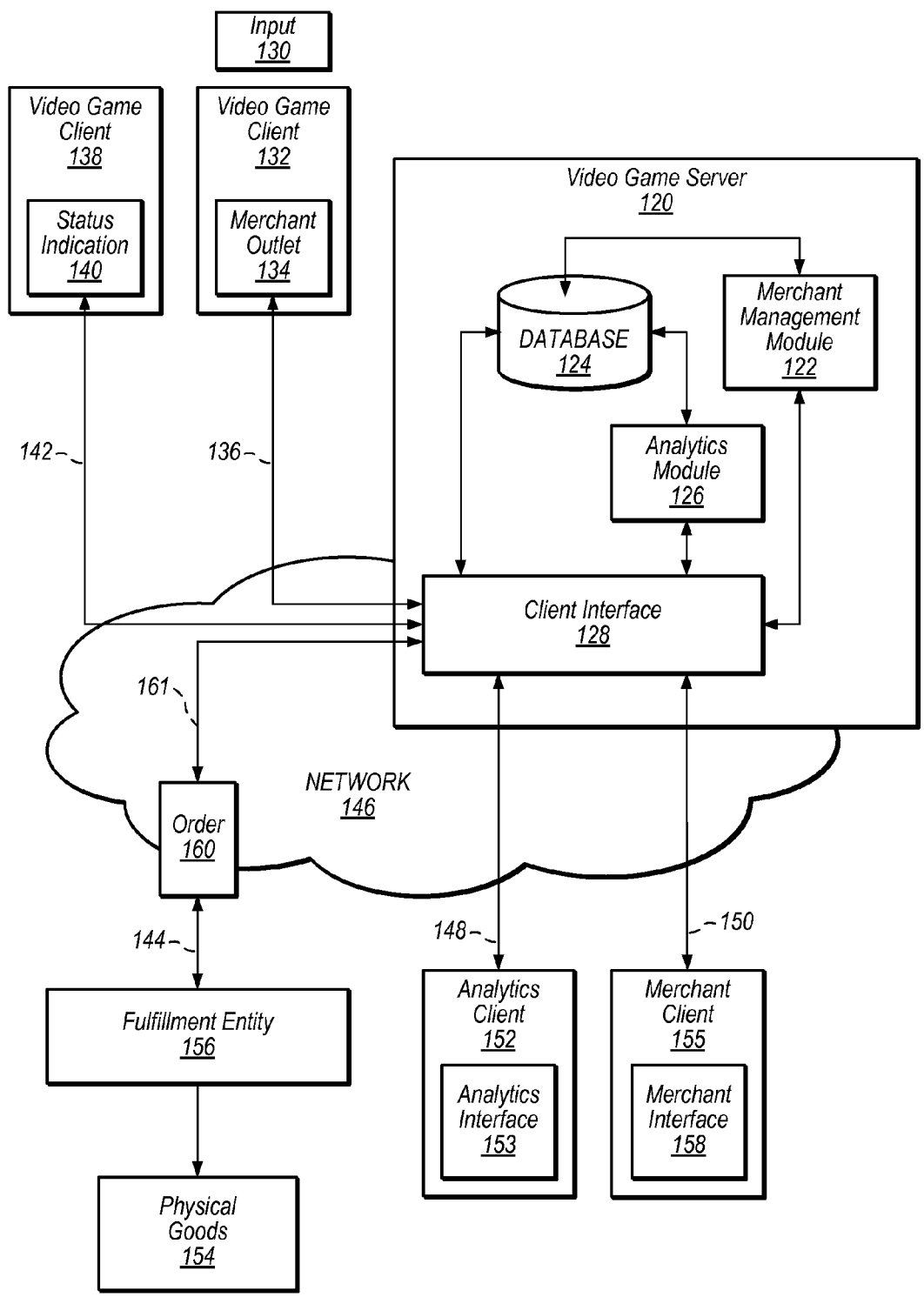
FIG. 1 illustrates a system architecture for electronic commerce initiated through use of video games and fulfilled by delivery of physical goods, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

The disclosed embodiments relate to electronic commerce through the use of video games and computer networking. In some embodiments, electronic commerce is conducted through the operations of a video game, where goods and/or services are purchased for use in real life through a purchase made by a video game player within a video game.

Brief Introduction to Computing Terminology

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

It has proven convenient at times, principally for reasons of common usage, to refer to signals, inputs, outputs, and the like as originating from certain source entities. It should be understood that through this usage a signal, input, output or the like originating from an entity may pass through, be amplified by, be repeated by, be promulgated by, be diverted by, or otherwise processed by one or more intermediary device or entity, yet it will still be referred to as originating from that source entity.

Introduction to Electronic Commerce Initiated Through Use of Video Games and Fulfilled by Delivery of Physical Goods Various embodiments of methods and apparatus for electronic commerce initiated through use of video games and fulfilled by delivery of physical goods are presented. In some embodiments, a method includes displaying within a video game environment a representation of a merchant outlet. Within the video game environment, the merchant outlet presents one or more offers of items for sale, and the offers of items for sale includes one or more offers of items for sale having physical existence outside of the video game environment. In some embodiments, the method includes receiving input originating from a video game player indicating acceptance of one or more offers of items for sale. In some embodiments, the method includes, responsive at least in part to the input originating from the video game player indicating acceptance of one or more offers of items for sale, preparing an order for one or more item corresponding to one or more of the offers of items for sale to be physically delivered to the video game player.

In some embodiments, the method includes transmitting over a network game state information. In some embodiments, the game state information is capable of being used by a video game computer for rendering the video game environment. In some embodiments, the video game computer is capable of receiving inputs originating from the video game player. In some embodiments, the transmitting of game state information is accomplished using a video game server. In some embodiments, the video game environment comprises a representation of a plurality of spaces. In some embodiments, one of the plurality of spaces comprises the merchant outlet.

In some embodiments, receiving input originating from the video game player indicating movement of one or more character through the video game environment and receiving input originating from the video game player indicating manipulation of one or more virtual objects in the video game environment. The input originating from the video game player indicating movement of one or more character through the video game environment indicates movement of one or more character into one of the plurality of spaces. Input originating from the video game player indicating manipulation of virtual objects in the video game environment includes manipulation of virtual objects representing one or more items wherein the items correspond to one or more of the offers of items for sale. Inputs originating from the video game player are received through the use of the video game computer and the use of a network.

In some embodiments, receiving input originating from the video game player indicating acceptance of one or more offers of items for sale includes receiving character action input originating from the video game player indicating an action by a character, wherein the action by the character is associated with a purchase from the representation of the merchant outlet of one or more item corresponding to one or more of the offers of items for sale. The character action input is represented in the video game environment as an action of a character in the video game environment associated with the video game player.

In some embodiments, the method further includes indicating in the video game environment the status of an order for an item. The item corresponds to one or more of the offers of items for sale to be physically delivered to the video game player, and the indicating in the video game environment of the status of the order for the item is represented in the video game environment through the action of a character associated with the merchant outlet in the video game environment or through a representation within the video game environment of the item.

In some embodiments, the method further includes generating a transaction record associated with the order. The transaction record comprises customization terms associated with the acceptance of one or more of the offers of items for sale, and the customization terms represent options associated with one or more of the offers of items for sale.

In some embodiments, the method further includes generating a transaction record associated with the order, and the transaction record comprises analytic data associated with the video game player.

In some embodiments, the method further includes indicating in the video game environment the status of an order for an item, and the item corresponds to one or more of the offers of items for sale to be physically delivered to the video game player.

In some embodiments, receiving input originating from the video game player indicating acceptance of one or more offers of items for sale includes receiving character action input originating from the video game player indicating an action by a character representing a purchase from the representation of the merchant outlet of one or more item corresponding to one or more of the offers of items for sale.

In some embodiments, the method further includes communicating to a fulfillment entity the order for one or more item corresponding to one or more offers of items for sale to be physically delivered to the video game player.

In some embodiments, the method further includes generating a transaction record associated with the order, and communicating the transaction record to one or more persons through the use of email.

Some embodiments may include a means for providing electronic commerce initiated through use of video games and fulfilled by delivery of physical goods. For example, a merchant manager module operates on a system including at least one processor and a memory with program instructions, such that the program instructions are executable by the at least one processor to display within a video game environment a representation of a merchant outlet. Within the video game environment, the merchant outlet presents one or more offers of items for sale, and the offers of items for sale comprise one or more offers of items for sale having physical existence outside of the video game environment. Embodiments may further include program instructions executable by the at least one processor to receive input originating from a video game player indicating acceptance of one or more offers of items for sale, and responsive at least in part to the input originating from the video game player indicating acceptance of one or more offers of items for sale, prepare an order for one or more item corresponding to one or more offers of items for sale.

In some embodiments, the program instructions are further executable by the one or more processors to receive player characteristic information corresponding to one or more attributes associated with the video game player, generate from the player characteristic information a player characteristic profile comprising attributes associated with the video game player, and transmit the player characteristic profile to a merchant outlet operator.

In some embodiments, the program instructions are further executable by one or more processors to receive player characteristic information corresponding to one or more attributes associated with a plurality of video game players, generate from the player characteristic information one or more player aggregate profiles including attributes associated with the plurality of video game players, and transmit the one or more player aggregate profiles to a merchant outlet operator.

In some embodiments, the program instructions are further executable by one or more processors to receive player characteristic information corresponding to one or more attributes associated with the video game player, generate from the player characteristic information a player characteristic profile associated with the video game player comprising attributes associated with the video game player, and generate purchase interests associated with the video game player by comparing the player characteristic profile associated with the video game player to a plurality of player characteristic profiles associated with other video game players, wherein the plurality of player characteristic profiles associated with other video game players include information concerning previous purchases made in the video game environment by the other video game players. In some embodiments, the program instructions are further executable by one or more processors to select one or more offers of items for sale to present to the video game player based at least in part on the purchase interests associated with the video game player.

In some embodiments, the program instructions are further executable by the one or more processors to generate a transaction record associated with the order, wherein the transaction record comprises customization terms associated with the acceptance of one or more of the offers of items for sale, and the customization terms represent options associated with one or more of the offers of items for sale.

In some embodiments, the program instructions are further executable by the one or more processors to display in the video game environment one or more characters associated with the merchant outlet, wherein the one or more characters associated with the merchant outlet are customer service representatives associated with the merchant outlet.

In some embodiments, the program instructions are further executable by the one or more processors to display in the video game environment one or more representations of items corresponding to the one or more offers of items for sale as items manipulable by a character in the video game environment in response to character action input represented in the video game environment as an action of a character associated with the video game player in the video game environment, and alter the representation of one or more items corresponding to the one or more offers of items for sale to display customizations of the offers of items for sale.

In some embodiments, the program instructions are further executable by the one or more processors to present one or more offers of items for sale selected based at least in part on a game state.

In some embodiments, the offers of items for sale include offers of items for sale wherein the prices associated with the offers are based at least in part on analytic data describing a video game player.

In some embodiments, the program instructions are further executable by the one or more processors to determine prices associated with one or more offers of items for sale according to one or more rates of exchange between a virtual currency and a government-authorized currency.

Some embodiments include a non-transitory computer-readable storage medium storing program instructions. In some embodiments, the program instructions are computer-executable to implement displaying within a video game environment a representation of a merchant outlet. Within the video game environment, the merchant outlet presents one or more offers of items for sale, and the offers of items for sale comprise one or more offers of items for sale having physical existence outside of the video game environment. In some embodiments, the program instructions are computer-executable to implement receiving input originating from a video game player indicating acceptance of one or more offers of items for sale. In some embodiments, the program instructions are computer-executable to implement, responsive at least in part to the input originating from the video game player indicating acceptance of one or more offers of items for sale, preparing an order for one or more item corresponding to one or more of the offers of items for sale to be physically delivered to the video game player.

Some embodiments further include computer-executable program instructions to implement generating a transaction record associated with the order. The transaction record comprises analytic data associated with the video game player.

Some embodiments further include computer-executable program instructions to implement indicating in the video game environment the status of an order for an item. The item corresponds to one or more of the offers of items for sale to be physically delivered to the video game player.

In some embodiments, the computer-executable program instructions to implement receiving input originating from the video game player indicating acceptance of one or more offers of items for sale comprise computer-executable program instructions to implement receiving character action input originating from the video game player indicating an action by a character. The action by the character is associated with a purchase from the representation of the merchant outlet of one or more item corresponding to one or more of the offers of items for sale.

Some embodiments further include computer-executable program instructions to implement communicating to a fulfillment entity the order for one or more item corresponding to one or more offers of items for sale to be physically delivered to the video game player.

Some embodiments further include computer-executable program instructions to implement generating a transaction record associated with the order, and computer-executable program instructions to implement communicating information associated with the transaction record to one or more video game players.

Some embodiments further include computer-executable program instructions to implement presenting one or more offers of items for sale selected based at least in part on a game state.

Some embodiments further include computer-executable program instructions to implement communicating to an online social network information associated with the order for an item corresponding to one or more offers of items for sale.

Some embodiments further include computer-executable program instructions to implement receiving player characteristic information corresponding to one or more attributes associated with a plurality of video game players. Some embodiments further include computer-executable program instructions to implement generating from the player characteristic information one or more player aggregate profiles comprising attributes associated with the plurality of video game players. Some embodiments further include computer-executable program instructions to implement transmitting the one or more player aggregate profiles to a merchant outlet operator.

Some embodiments further include computer-executable program instructions to implement receiving player characteristic information corresponding to one or more attributes associated with the video game player. Some embodiments further include computer-executable program instructions to implement generating from the player characteristic information a player characteristic profile associated with the video game player comprising attributes associated with the video game player. Some embodiments further include computer-executable program instructions to implement generating purchase interests associated with the video game player by comparing the player characteristic profile associated with the video game player to a plurality of player characteristic profiles associated with other video game players, wherein the plurality of player characteristic profiles associated with other video game players comprise information concerning previous purchases made by the other video game players. Some embodiments further include computer-executable program instructions to implement selecting one or more offers of items for sale to present to the video game player based at least in part on the purchase interests.

In some embodiments, a method includes displaying within a video game environment a representation of a merchant outlet. Within the video game environment, the merchant outlet presents one or more offers of items for sale, and the one or more offers of items for sale includes offers of items for sale having physical existence outside of the video game environment. In some embodiments, the method further includes receiving input from a video game player indicating acceptance of at least one of the one or more offers of items for sale, and, responsive at least in part to the input from the video game player indicating the acceptance of at least one of the one or more offers of items for sale, preparing an order for an item corresponding to the at least one of the one or more offers of items for sale to be physically delivered to the video game player.

In some embodiments, the method further comprises transmitting over a network game state information. In some embodiments, the game state information is capable of being used by a video game computer for rendering the video game environment. In some embodiments, the video game computer is capable of being accessed by the video game player. In some embodiments, the transmitting of game state information is accomplished using a video game server. In some embodiments, the video game environment comprises a representation of a plurality of spaces.

In some embodiments, one of the plurality of spaces includes the merchant outlet. In some embodiments, the method includes receiving input from the video game player indicating movement of a character through the video game environment and input from the video game player indicating manipulation of virtual objects in the video game environment. In some embodiments, the input from the video game player indicating movement of a character through the video game environment includes movement into one of the plurality of spaces. In some embodiments, input from the video game player indicating manipulation of virtual objects in the video game environment includes manipulation of virtual objects representing the one or more offers of items for sale. In some embodiments, inputs received from the video game player are received through the use of the video game computer and the use of a network.

In some embodiments, the method further includes receiving input from the video game player indicating acceptance of at least one of the one or more offers of items for sale comprises receiving character action input from the video game player indicating an action by a character representing a purchase from the representation of the merchant outlet of at least one of the one or more items for sale. In some embodiments, the character action input is represented in the video game environment as an action of a character associated with the video game player in the video game environment.

In some embodiments, the method further includes indicating in the video game environment the status of an order for an item corresponding to the at least one of the one or more offers of items for sale to be physically delivered to the video game player. In some embodiments, the indicating in the video game environment of the status of the order for an item corresponding to the at least one of the one or more offers of items for sale to be physically delivered to the video game player is represented in the video game environment through the use of the action of a character associated with the merchant outlet in the video game environment or through the use of a representation of an item corresponding to the at least one of the one or more offers of items for sale to be physically delivered to the video game player within the video game environment.

In some embodiments, the order is a record of a purchase transaction comprising transaction customization terms applicable to the acceptance of the at least one of the one or more offers of items for sale. In some embodiments, the customization terms represent options applicable to the one or more offers of items for sale.

In some embodiments, the order is a record of a purchase transaction comprising analytic data associated with the video game player.

In some embodiments, the method further includes indicating in the video game environment the status an order for an item corresponding to the at least one of the one or more offers of items for sale to be physically delivered to the video game player.

In some embodiments, receiving input from the video game player indicating acceptance of at least one of the one or more offers of items for sale includes receiving character action input from the video game player indicating an action by a character representing a purchase from the representation of the merchant outlet of at least one of the one or more items for sale.

In some embodiments, the method further includes communicating to a fulfillment entity the order for the item corresponding to the at least one of the one or more offers of items for sale to be physically delivered to the video game player.

In some embodiments, the order is a record of a purchase transaction including data corresponding to input from the video game player indicating acceptance of the at least one of the one or more offers of items for sale.

Some embodiments may include a means for providing electronic commerce initiated through use of video games and fulfilled by delivery of physical goods. For example, a merchant manager module operates on a system including at least one processor and a memory with program instructions, such that the program instructions are executable by the at least one processor to display within a video game environment a representation of a merchant outlet. In some embodiments, within the video game environment, the merchant outlet presents one or more offers of items for sale, and the one or more offers of items for sale include offers of items for sale having physical existence outside of the video game environment. Embodiments may further include program instructions executable by the at least one processor to receive input from a video game player indicating acceptance of at least one of the one or more offers of items for sale, and, responsive at least in part to the input from the video game player indicating the acceptance of at least one of the one or more offers of items for sale, prepare an order for an item corresponding to the at least one of the one or more offers of items for sale.

Some embodiments further include program instructions executable by the at least one processor to receive player characteristic information corresponding to one or more attributes associated with the video game player. Some embodiments further include program instructions executable by the at least one processor to generate from the player characteristic information a player characteristic profile describing the attributes associated with the video game player. Some embodiments further include program instructions executable by the at least one processor to transmit the player characteristic profile to a merchant outlet operator.

Some embodiments further include program instructions executable by the at least one processor to receive player characteristic information corresponding to one or more attributes associated with a plurality of video game players. Some embodiments further include program instructions executable by the at least one processor to generate from the player characteristic information a player aggregate profile describing the attributes associated with the plurality of video game players. Some embodiments further include program instructions executable by the at least one processor to transmit the player aggregate profile to a merchant outlet operator.

Some embodiments further include program instructions executable by the at least one processor to receive player characteristic information corresponding to one or more attributes associated with the video game player. Some embodiments further include program instructions executable by the at least one processor to generate from the player characteristic information a player characteristic profile describing the attributes associated with the video game player. Some embodiments further include program instructions executable by the at least one processor to predict purchase interests of the video game player by comparing the player characteristic profile describing the attributes associated with the video game player to a plurality of player characteristic profiles for players including information concerning previous purchases made in the video game environment. Some embodiments further include program instructions executable by the at least one processor to present to the video game player offers of items for sale selected for display based at least in part on the purchase interests.

In some embodiments, the order is a record of a purchase transaction comprising transaction customization terms applicable to the acceptance of the at least one of the one or more offers of items for sale. In some embodiments, the customization terms represent options applicable to the one or more offers of items for sale.

In some embodiments, the program instructions executable by the at least one processor to display within the video game environment the representation of the merchant outlet further include program instructions executable by the at least one processor to display in the representation of the merchant outlet representations of one or more customer service representatives as characters associated with the merchant outlet in the video game environment.

In some embodiments, the program instructions executable by the at least one processor to display within the video game environment the representation of the merchant outlet further include program instructions executable by the at least one processor to display representations of the one or more offers of items for sale as items manipulable by a character in the video game environment in response to character action input represented in the video game environment as an action of the character associated with the video game player in the video game environment and program instructions executable by the at least one processor to, responsive to character action input in the video game environment, alter a depiction of items associated with the character action input to display customizations of the offers of the items for sale.

In some embodiments, the program instructions executable by the at least one processor to display within the video game environment the representation of the merchant outlet further include program instructions executable by the at least one processor to present to the video game player offers of items for sale selected for display based at least in part on a game state.

In some embodiments, the one or more offers of the items for sale include offers of items for sale priced based at least in part on analytic data describing a video game player.

In some embodiments, the program instructions executable by the at least one processor to display within the video game environment the representation of the merchant outlet further include program instructions executable by the at least one processor to adjust prices associated with the offers of items for sale in response to fluctuations in rates of exchange between a virtual currency and a government-authorized currency.

In some embodiments, a module for providing electronic commerce initiated through use of video games and fulfilled by delivery of physical goods is implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform displaying within a video game environment a representation of a merchant outlet. Within the video game environment, the merchant outlet presents one or more offers of items for sale. The one or more offers of items for sale comprises offers of items for sale having physical existence outside of the video game environment, and the one or more offers of items for sale includes offers of items for sale selected for display based at least in part on analytic data describing a video game player. The computer-readable storage medium may store program instructions executable by the one or more processors to cause the computing apparatus to perform receiving input from a video game player indicating acceptance of at least one of the one or more offers of items for sale, responsive at least in part to the input from the video game player indicating the acceptance of at least one of the one or more offers of items for sale, preparing an order for an item corresponding to the at least one of the one or more offers of items for sale to be physically delivered to the video game player.

In some embodiments, the order is a record of a purchase transaction comprising analytic data describing the video game player.

Some embodiments further include computer-executable program instructions to implement indicating in the video game environment the status of an order for an item corresponding to the at least one of the one or more offers of items for sale to be physically delivered to the video game player.

In some embodiments, the computer-executable program instructions to implement receiving the input from the video game player indicating the acceptance of the at least one of the one or more offers of items for sale comprise computer-executable program instructions to implement receiving character action input from the video game player indicating an action by a character representing a purchase from the representation of the merchant outlet of at least one of the one or more items for sale.

Some embodiments further include computer-executable program instructions to implement communicating to a fulfillment entity the order for the item corresponding to the at least one of the one or more offers of items for sale to be physically delivered to the video game player.

In some embodiments, the order is a record of a purchase transaction comprising data representing the input from the video game player indicating acceptance of the at least one of the one or more offers of items for sale.

Some embodiments further include computer-executable program instructions to implement presenting to the video game player offers of items for sale selected for display based at least in part on a game state. Some embodiments further include computer-executable program instructions to implement responsive to character action input from the video game player, displaying performance by the character of purchase related actions in the video game environment.

Some embodiments further include computer-executable program instructions to implement receiving player characteristic information describing one or more attributes associated with a plurality of video game players. Some embodiments further include computer-executable program instructions to implement generating from the player characteristic information a player aggregate profile describing the attributes. Some embodiments further include computer-executable program instructions to implement transmitting the player aggregate profile to a merchant outlet operator.

Some embodiments further include computer-executable program instructions to implement receiving player characteristic information corresponding to one or more attributes associated with the video game player. Some embodiments further include computer-executable program instructions to implement generating from the player characteristic information a player characteristic profile describing the attributes associated with the video game player. Some embodiments further include computer-executable program instructions to implement predicting purchase interests of the video game player by comparing the player characteristic profile to a plurality of player characteristic profiles for players including information concerning previous purchases made in the video game environment. Some embodiments further include computer-executable program instructions to implement presenting to the video game player offers of items for sale selected for display based at least in part on the purchase interests.

Some embodiments include a method for electronic commerce initiated through use of video games and fulfilled by delivery of physical goods. The method includes displaying within a video game environment a representation of a merchant outlet. Within the video game environment, the merchant outlet presents one or more offers of items for sale, and the one or more offers of the items for sale comprises offers of items for sale having physical existence in the physical world outside of the video game environment.

In some embodiments, the method includes receiving input from a video game player indicating acceptance of at least one of the one or more offers of items for sale. In some embodiments, the method includes, responsive at least in part to the input from the video game player indicating the acceptance of the at least one of the one or more offers of items for sale, preparing an order for an item corresponding to the at least one of the one or more offers of items for sale to be physically delivered to the video game player.

In some embodiments, the method includes a video game server transmitting over a network game state information for rendering the video game environment for gameplay by the video game player. The video game environment comprises a representation of a plurality of spaces, and one of the plurality of spaces comprises the merchant outlet. In some embodiments, the method includes receiving input from the video game player indicating navigation through the video game environment and input from the video game player indicating manipulation of virtual objects in the video game environment. The input from the video game player indicating navigation through the video game environment includes navigation into the one of the plurality of spaces, and input from the video game player indicating manipulation of virtual objects in the video game environment.

In some embodiments, the receiving the input from the video game player indicating the acceptance of the at least one of the one or more offers of items for sale comprises receiving character action input from the video game player indicating an action by a character representing a purchase from the representation of the merchant outlet of at least one of the one or more items for sale. The character action input is represented in the video game environment as an action of a character associated with the video game player in the video game environment.

In some embodiments, the method includes indicating in the video game environment status of the item corresponding to the at least one of the one or more offers of items for sale to be physically delivered to the video game player. The indicating in the video game environment the status of the item corresponding to the at least one of the one or more offers of items for sale to be physically delivered to the video game player is represented in the video game environment through the action or attributes of a character in the video game environment.

In some embodiments the order is a record of a purchase transaction comprising transaction customization terms applicable to the acceptance of the at least one of the one or more offers of items for sale. In some embodiments the order is a record of a purchase transaction comprising analytic data describing the video game player.

In some embodiments, the method includes indicating in the video game environment status of the item corresponding to the at least one of the one or more offers of items for sale to be physically delivered to the video game player. In some embodiments, the receiving the input from the video game player indicating the acceptance of the at least one of the one or more offers of items for sale comprises receiving character action input from the video game player indicating an action by a character representing a purchase from the representation of the merchant outlet of at least one of the one or more items for sale.

In some embodiments, the method includes communicating to a fulfillment entity the order for the item corresponding to the at least one of the one or more offers of items for sale to be physically delivered to the video game player. In some embodiments, the order is a record of a purchase transaction comprising data representing the input from the video game player indicating acceptance of the at least one of the one or more offers of items for sale.

Some embodiments may include a means for providing electronic commerce initiated through use of video games and fulfilled by delivery of physical goods. For example, a merchant manager module operates on a system including at least one processor and a memory with program instructions, such that the program instructions are executable by the at least one processor to display within a video game environment a representation of a merchant outlet, receive input from the video game player indicating acceptance of at least one of the one or more offers of items for sale, and responsive at least in part to the input from the video game player indicating the acceptance of the at least one of the one or more offers of items for sale, prepare an order for an item corresponding to the at least one of the one or more offers of items for sale. Within the video game environment, the merchant outlet presents one or more offers of items for sale, and the one or more offers of the items for sale comprises offers of items for sale having physical existence in the physical world outside of the video game environment.

In some embodiments, the system further includes program instructions executable by the at least one processor to receive user characteristic information describing one or more attributes associated with the video game player, program instructions executable by the at least one processor to generate from the user characteristic information a user characteristic profile describing the attributes, and program instructions executable by the at least one processor to transmit the user characteristic profile to a merchant outlet operator.

In some embodiments, the system further includes program instructions executable by the at least one processor to receive user characteristic information describing one or more attributes associated with a plurality of video game players, program instructions executable by the at least one processor to generate from the user characteristic information a user aggregate profile describing the attributes, and program instructions executable by the at least one processor to transmit the user aggregate profile to a merchant outlet operator.

In some embodiments, the system further includes program instructions executable by the at least one processor to receive user characteristic information describing one or more attributes associated with the video game player, program instructions executable by the at least one processor to generate from the user characteristic information a user characteristic profile describing the attributes, program instructions executable by the at least one processor to predict purchase interests of the video game player by comparing the user characteristic profile to a plurality of user characteristic profiles for users including previous in-game purchase histories, and program instructions executable by the at least one processor to present to the video game player offers of items for sale selected for display based at least in part on the purchase interests.

In some embodiments, the program instructions executable by the at least one processor to display within the video game environment the representation of the merchant outlet further include program instructions executable by the at least one processor to display representations of the one or more offers of the items for sale as items manipulable by a character in the video game environment in response to character action input represented in the video game environment as an action of the character associated with the video game player in the video game environment.

In some embodiments, the program instructions executable by the at least one processor to display within the video game environment the representation of the merchant outlet further include program instructions executable by the at least one processor to display in the representation of the merchant outlet representations of one or more customer service representatives as characters associated with the merchant outlet in the video game environment.

In some embodiments, the program instructions executable by the at least one processor to display within the video game environment the representation of the merchant outlet further include program instructions executable by the at least one processor to display representations of the one or more offers of the items for sale as items manipulable by a character in the video game environment in response to character action input represented in the video game environment as an action of the character associated with the video game player in the video game environment and program instructions executable by the at least one processor to display as customizations of the offers of the items for sale responses to the character action input represented in the video game environment as the action of the character associated with the video game player in the video game environment.

In some embodiments, the program instructions executable by the at least one processor to display within the video game environment the representation of the merchant outlet further include program instructions executable by the at least one processor to present to the video game player offers of items for sale selected for display based at least in part on a game state.

In some embodiments, the one or more offers of the items for sale comprises offers of items for sale priced based at least in part on analytic data describing a video game player. In some embodiments, the program instructions executable by the at least one processor to display within the video game environment the representation of the merchant outlet further include program instructions executable by the at least one processor to adjust prices associated with the offers of items for sale in response to fluctuations in rates of exchange between a virtual currency and a government-authorized currency.

In some embodiments, a module for providing electronic commerce initiated through use of video games and fulfilled by delivery of physical goods is implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform displaying within a video game environment a representation of a merchant outlet, receiving input from the video game player indicating acceptance of at least one of the one or more offers of items for sale, and responsive at least in part to the input from the video game player indicating the acceptance of the at least one of the one or more offers of items for sale, and preparing an order for an item corresponding to the at least one of the one or more offers of items for sale, as described herein. Other embodiments of the for providing electronic commerce initiated through use of video games and fulfilled by delivery of physical goods may be at least partially implemented by hardware circuitry and/or firmware stored, for example, in a non-volatile memory.

In some embodiments, the order is a record of a purchase transaction comprising analytic data describing the video game player. In some embodiments, the computer-readable medium further includes instructions computer-executable to implement indicating in the video game environment status of the item corresponding to the at least one of the one or more offers of items for sale to be physically delivered to the video game player.

In some embodiments, the program instructions computer-executable to implement receiving the input from the video game player indicating the acceptance of the at least one of the one or more offers of items for sale include program instructions computer-executable to implement receiving character action input from the video game player indicating an action by a character representing a purchase from the representation of the merchant outlet of at least one of the one or more items for sale.

In some embodiments, the computer-readable medium further includes program instructions computer-executable to implement communicating to a fulfillment entity the order for the item corresponding to the at least one of the one or more offers of items for sale to be physically delivered to the video game player.

In some embodiments, the order is a record of a purchase transaction comprising data representing the input from the video game player indicating acceptance of the at least one of the one or more offers of items for sale. In some embodiments, the computer-readable medium further includes program instructions computer-executable to implement presenting to the video game player offers of items for sale selected for display based at least in part on a game state. In some embodiments, the computer-readable medium further includes program instructions computer-executable to implement, responsive to character action input from the video game player, displaying performance by the character of purchase related actions in the video game environment.

In some embodiments, the computer-readable medium further includes program instructions computer-executable to implement receiving user characteristic information describing one or more attributes associated with a plurality of video game players, program instructions computer-executable to implement generating from the user characteristic information a user aggregate profile describing the attributes, and program instructions computer-executable to implement transmitting the user aggregate profile to a merchant outlet operator.

In some embodiments, the computer-readable medium further includes program instructions computer-executable to implement receiving user characteristic information describing one or more attributes associated with the video game player, program instructions computer-executable to implement generating from the user characteristic information a user characteristic profile describing the attributes, program instructions computer-executable to implement predicting purchase interests of the video game player by comparing the user characteristic profile to a plurality of user characteristic profiles for users including previous in-game purchase histories, and program instructions computer-executable to implement presenting to the video game player offers of items for sale selected for display based at least in part on the purchase interests.

Introduction to Technologies for Enabling Electronic Commerce Initiated Through Use of Video Games and Fulfilled by Delivery of Physical Goods

1. Video Games

Many different types of video games exist for the purpose of providing video game players with entertainment and enjoyment. Many of these games provide game-play that enables a player to control a game character or other movable element (referred to herein as a "character") in the video game environment in a manner that enables the player to perform various actions within the game. In some video games, a player uses one or more input device to control actions and movement of one or more character in a video game environment that is a virtual game world.

A video game is an electronic game that involves human interaction with a user interface to generate, at a minimum, visual output on a screen or other visual output device. Many video games provide players with output in the form of screen displays and sounds from speakers, though haptic feedback (e.g., vibrational feedback) and other outputs may also be present. Video games are played on video game computers, which may come in a variety of forms, as discussed further herein. Computer games are types of video games that are typically played on general purpose computers. Video game players are sometimes referred to as video game users.

Input devices for video games may be connected to a video game computer by means of a wire or cord, or through a wireless connection. In some instances the input devices for a video game may be removable, while in other instances the input devices for a video game may be permanently affixed to the video game computer. The range of input devices for video games is wide. Such devices are sometimes known as game controllers, and can include keyboards, mice, buttons, joysticks, pedals, touch pads, motion sensors, accelerometers, gyroscopes, microphones, balance boards, track balls, analog sticks, directional pads, yokes, throttle quadrants, game pads, steering wheels, light guns, dance pads, etc. Some video game consoles, which are a type of video game computer, have special purpose game controllers for use with that particular video game console.

While video games vary widely in nature, one aspect of traditional video game play is the ability of game players to save the state of their game on a memory card, hard drive, or other form of computer memory. This memory may be physically located on a video game computer, located on removable electronic storage media, located on a game server, or otherwise. Specifically, in certain games, players may save their character (complete with that character's characteristics); save the objects, skills, abilities, weapons, titles, attributes, rewards, and awards they have acquired; save the location, level, or stage that they have achieved; and/or save the total points, health, strength, virtual currency, ranking etc. that one has acquired during the course of a game or set of successive game plays. Other information indicating a game state may also be saved. Once a game state is saved to memory, traditionally the player may access the saved game state to continue to play the game from the saved game state.

In many video games the game-play takes place in a video game environment that is a virtual game world or some other 2-D or 3-D computer-generated playing space, wherein a player controls one or more player character. Player characters may be considered in-game representations of the controlling player (sometimes called "avatars") in some games. The video game may display a representation of the player character and/or the virtual game world. The player provides inputs to the video game computer using one or more input device, where those inputs are processed by the video game computer (and/or game server) and video game software to determine a player character's actions within the video game. The video game and video game computer (and/or game server) determine the outcomes of events according to the video game software and player inputs and presents the player with a game display, sounds, and other outputs illuminating the game state. In some video games, there may be multiple players, wherein each player may control one or more player characters.

In many video games, there are various types of in-game awards and rewards that a player character can obtain. For example, a player character may acquire points, health, strength, virtual currency, experience points, characters, attributes, skills, abilities, weapons, or other in-game items of value. In some games, the goal of the game may be to acquire in-game rewards. For example, a player may strive to achieve a high score by accumulating points that are granted for performing in-game tasks or overcoming in-game obstacles. In some games the goal of the game may be to accomplish certain missions or defeat certain foes.

2. Online and Offline Video Games

Some video games are offline video games where the use of computer networking is not engaged (e.g., the game does not access the Internet or other networks). A business aspect of offline video games is that game publishers usually generate revenue through the sales of copies of the video game on the wholesale market. Wholesalers typically sell the copies of the game to distributors and retailers who in turn sell the copies of the game to the end consumer. The video games must be manufactured onto cartridges, CDs or DVDs and packaged and physically distributed by distributors and retailers. The physical distribution requirements of an offline video game limits game production and development to an approach whereby all aspects of the game, including characters, levels, other components, and "bug" fixes must be introduced according to the overall release schedule for the video game.

Some video games are online video games that make use of computer networking (e.g., the game accesses the Internet or other networks). With the use of the Internet and video games that make use of the computer networking, video game players may play with or against one another without being bounded by the physical constraints of the players' respective locations. For example, video game players playing on different video game computers that each have access to the Internet may play against each other or with each other in a wide variety of video games, should both players have the appropriate video game and should both players' video game computers be connected through the Internet. Players in this scenario may be located in different physical locations. Though online video games offer the above described benefits for multiple players, single-player online video games are also common.

One compelling aspect of online video games is that the social, cultural, and economic interactions that typically do not occur in the context of a traditional offline game may occur within the game-play of an online video game itself. As a result, the social, cultural, and economic interactions of an online video game can actually become part of the overall gaming experience. Specifically the game components, levels, achievements, skills etc. of a player may be known to others. Interactions between players in the form of discussions, trading, selling, advertising, and purchasing of items and a show of a player's character's attributes may be part of the experience of playing the game itself. Moreover, communication between players and the element of community has become an aspect of some online video games.

With online video games, game publishers may forego the manufacturing and distribution costs of releasing a physical copy of a game (e.g., on cartridge, CD, or DVD). Using the Internet or other networks as a distribution mechanism, game publishers may sell and distribute their games to consumers directly (e.g., by allowing a video game to be downloaded from a game publisher's server to a player's video game computer). Moreover, the flexibility of online distribution allows game publishers to release games in a more granular fashion, for example through staging their overall release schedules into several mini releases and/or more finely pricing game characters, levels, actions and components into individual product offerings and/or groupings.

3. Video Game Computers and Game Servers

Video games can be played on a variety of computers, including general purpose computers (e.g., personal computers, tablets, etc.). Video games can also be played on special purpose computers such as video game consoles. Examples of video game consoles include PSP, PlayStation 3, Playstation 4, Xbox 360, Xbox One, Nintendo DS, Wii U, Wii, and many others. Video games can also be played on computers that are mobile devices or smartphones, for example, those that run operating systems such as Android, iOS and Windows Phone. Video games may be played such that some or all of the software responsible for running the video game is located a computer other than a player's video game computer. For example, cloud gaming, also known as gaming on demand, is a type of gaming that allows on-demand streaming of video games onto a player's video game computer, through the use of a thin client, in which the actual game is stored on the game operator's or game company's server and is sent directly to players' video game computers accessing the server. For the purpose of this application, the computer(s) that a player interacts with to play a video game will be referred to as that player's "video game computer." This nomenclature does not necessarily connote ownership of the physical hardware.

Video games may be played in an individual manner, such that a game player may immerse himself interactively against the characters, scenarios, and/or challenges presented by the game itself. In other video games, interactive play with real human opponents and real human teammates may occur. Interactive game play with multiple real humans may occur through the use of single video game computer, with the players playing together in physical proximity, such that they can all access the same video game computer and any accessories needed to provide input to the video game. Interactive game play with multiple real humans may also occur through the use of multiple video game computers, where video game computers may be connected through computer networking. In some cases, video game computers are connected through network topologies (e.g., point-to-point, bus, star, ring/circular, mesh, tree, daisy chain, hybrid, etc.). Video game computers may also communicate with one or more game servers through networking, again with a variety of network topologies applied to the arrangement of computers within the network. The above described networks may be set up according to peer-to-peer or client-server models.

Game servers are computers that may serve as the authoritative source of the game state in an online video game. As such, game servers are sometimes called hosts. The game server transmits sufficient data about the game's internal state to allow its connected clients (e.g., players' video game computers) to maintain their own accurate representation of the game state, for display to players (e.g., through the display of the game world). Game servers also receive and process players' input, updating the data about the game state on the game server(s). One or more game server may be used in the operation of an online video game. Not all video games make use of game servers, and even those that do need not make use of a game server at all times.

Game servers are not used in connection will all video games. In some video games, whether they are online video games or offline video games, one or more video game computer provides the game state, not a game server. Such games are well known. For completeness, it should be noted that it is possible for a player's video game computer to also serve as a game server. However, in practice, game servers are almost always computers other than a player's video game computer.

Online video games that are accessible to multiple players via one or more game server are well known. This is a not uncommon use of game servers. For example, many thousands of players across the globe access video games known as massive multiplayer online games (MMOGs). Players of MMOGs usually access such games repeatedly (for durations that typically range from a few minutes to several days) over a given period of time, which may be days, weeks, months or even years. The games are often constructed such that players pay a periodic subscription price (e.g., $10 every month)

rather than, or in addition to, paying a one time purchase price for the game. Online games may also collect revenues through advertisements placed in the game and transaction fees for transactions that take place during games. Often, though not necessarily, online games (and MMOGs in particular) have no ultimate "winner" or "winning goal," but instead attempt to create a playing experience and a player community that game players find enjoyable. Some MMOGs are massive multiplayer online roleplaying games, (MMORPGs), wherein players control a character representing the player (sometimes known as an avatar) within a game world, exploring the landscape, fighting various foes, completing quests or missions, and interacting with non-player characters or other human players. World of Warcraft is an example of a popular MMORPG.

4. Online Commerce

The advent of the Internet brought about the possibility of widespread electronic commerce, along with its many benefits. Now, the use of the Internet to sell goods and services is well known. Computer users may purchase goods and services from merchants over the Internet through websites. Additionally, computer users may purchase goods and services over the Internet through the use of apps. Apps are self-contained programs or pieces of software designed to fulfill a particular purpose. Apps are particularly common on computers that are mobile devices, such as smart phones.

Merchants offering goods and services for sale electronically over the Internet may or may not also offer goods and services for sale through traditional "brick and mortar" stores, which are real-life physical stores, as opposed to stores that operate online. Merchants offer many types of goods and services over the Internet. As part of a typical online purchase of goods, a mailing address is provided for the customer to receive the purchased items, as well as billing information to pay for the goods purchased.

It is a common practice for merchants to maintain an online store through the use of an Internet webpage or app. An online store allows customers to use a webpage or app to browse and purchase products and/or services offered by the merchant. Usually, such an online store may be accessed at any time, from anywhere that the customer has Internet access. Online stores typically contain pictures and information about the products being sold. A search engine is usually provided as a feature of an online store in order to help shoppers more easily find products they are interested in. Furthermore, a shopping cart, or similar functionality, is typically provided as a feature of an online store to enable customers to gather products they wish to buy. Moreover, a payment gateway is typically provided to enable customers to pay for products and services that they purchase from the online store. Online stores accept electronic forms of payment, for example, credit card account information, bank account information, Pay Pal account information, bank account routing number information, electronic funds transfer information, or other information used in the processing of payments.

Users of a merchant's online stores may conduct a variety of actions online, such as viewing content, ordering items, etc. These online stores often present the user the option of taking a plurality of actions, through the interface provided, such that the user may choose the action that he would like to perform. Once the action is selected, the online store typically redirects the user's computer to a webpage or screen where the action can be completed.

For example, many merchants' online stores allow users to view and purchase goods and/or services from online merchant catalogs. The goods offered can include goods that are delivered electronically to the user over the Internet (e.g., digital music files, movie files) and items that are delivered through conventional distribution channels (e.g., CDs, DVDs, books) such as through common carriers. The goods can also be delivered through special purpose delivery services (e.g., a pizza merchant may dispatch a delivery person to the customer's address to deliver the customer's order). Some merchants' online stores allow users to rent items and purchase downloadable items such as software programs and digital publications. The services offered through merchant's online stores include a wide range of offerings. Consumers are able to purchase services of many types from vendors offering their services over the internet, including airlines offering plane flights (e.g., Southwest Airlines® (a registered trademark of Southwest Airlines Co.) at southwest.com™ (a trademark of Southwest Airlines Co.), American Airlines® (a registered trademark of American Airlines, Inc.) at aa.com® (a registered trademark of American Airlines, Inc.)).

There are many other services offered for sale over the internet, where some are sold in the form of vouchers or receipts that entitle the bearer to services. As an example, Groupon® operates a website and program interface that allows users to purchase services (as well as goods) over the internet. To redeem the purchased service (or good) at the vendor, the user must thereafter provide proof of their Groupon® purchase using a paper printout or computer screen that contains information confirming the purchase. The information confirming the Groupon® purchase may be scanned with the vendor's QR scanner, as a QR code appears on the user's Groupon® purchase confirmation. Alternatively, the Groupon® purchase may be proven by providing the vendor with a numerical code that the user received from Groupon® after making their purchase.

A "purchase" or "order" from a merchant's online store can include buying, renting, or licensing a good or service from an online merchant. A merchant networking system may provide an electronic catalog of items that are available for purchase along with information such as price, description, availability, and pictures of the goods and/or services. A user may view the online merchant catalog on an online merchant's website using a web browser (e.g., Chrome, Firefox, Internet Explorer, Safari, etc.) or through a special purpose app. In this manner a user may select various items to be ordered. Once the user has selected the items to be ordered, the merchant networking system may prompt the user for user-specific information to complete the ordering of the items. This user-specific information may include the user's name, credit card number (or other payment information), and a shipping address for the order. The merchant's website or app then typically confirms the order by redirecting the user's computer to an order confirmation webpage or an order confirmation screen within an app.

Electronic purchasing of goods and services through online stores can save consumers time by eliminating the need for a phone call or a trip to a merchant's physical location. Through electronic commerce, consumers have the ability to effect purchases from wherever they can access the Internet. Electronic ordering can also save retailers money by reducing the need to staff physical stores or pay employees to take phone-in orders. Moreover, electronic orders also tend to increase order accuracy and can speed up monetary transactions associated with purchases. The overhead associated with running a physical store is also avoided.

5. Online Social Networks

An online social network is a type of community accessed through computers connected through networking. An online social network may be available through one or more internet website and/or through one or more app. Examples of online social network apps include the Facebook® app, the Twitter® app, and the Foursquare® app. An online social network typically includes, as one of its features, a representation of each of its members (e.g., a profile for that member). Online social networks vary in their features and offerings, but commonly allow for members to edit their profiles, view information on other members, and/or communicate with other members. The ability to view content from an online social network may or may not be limited to users who are members of the online social network. Some or all of the content available through an online social network may be viewed only by members, as opposed to users who are non-members. Information available through an online social network may further be viewable to only certain other members of the online social network.

For example, a relationship between two members (e.g., establishing the two members are friends) may be required before the two members are able to view some or all of the information the other provides on the online social network. There may or may not be a fee associated with being a member of an online social network. Popular online social networks include, for example, Facebook®, Google+® (a registered trademark of Google, Inc.), Google® (a registered trademark of Google, Inc.) Buzz, LinkedIn® (a registered trademark of LinkedIn Corp), MySpace® (a registered trademark of MySpace, Inc.), Orkut® (a registered trademark of Google, Inc.), Twitter®, Foursquare®, eHarmony® (a registered trademark of eHarmony, Inc.), Bebo® (a registered trademark of Bebo.com LLC), JuiceCaster, Match.com® (a registered trademark of Match.Com, L.L.C.), AsianAvenue, BlackPlanet.com® (a registered trademark of Community Connect Inc.), Renren® (a registered trademark of Delson Group, Inc.), and Friendster® (a registered trademark of Friendster, Inc.).

As mentioned above, online social networks may recognize relationships between members. For example, an online social network may recognize that two members are denoted as friends, business connections, related through a familial relationship, or in a romantic relationship. Furthermore, information regarding members of online social networks may specify particular information to the social network provider that is not displayed at all, but which the social network provider, itself, maintains or determines through the usage and behavior its members. Such information may be used for marketing purposes, for example. An online social network may further allow members to form relationships with others by having common membership in groups or by recognizing the members have shared attributes (e.g., same alma mater, living in the same city, purchase of or interest in the same brands or goods). Alternatively, members may be able to define their relationships with one another on an online social network. Relationships between members may or may not be visible to other members on the online social network.

Online social networks are increasingly becoming popular platforms for their members to communicate and receive information from one another. Typically an online social network allows members to provide information and allows members to view the information provided by other members. For example, a member may provide contact information, background information (e.g., date of birth, astrological sign, etc.), education information, location, occupation, interests, hobbies, work history, relationship status (e.g., married, single, etc.) and so forth.

Online social networks may also provide members with the ability to share and exchange various information. Members may be able to exchange and share messages and files through online social networks. Online social networks may further allow members to share information with one another through chat or other real-time messaging, emailing or other non-real-time messaging, walls, blogging, video feeds, photo and video sharing, as well as through forums, groups, and the like.

Members of online social networks may generally share information with other members or users who are non-members by providing information through "posts." Posts contain information made available to other users on the online social network. Beyond the aforementioned nomenclature, a post may be variously known as a "tweet" (in the case of Twitter®), a "check-in" (in the case of Foursquare®) or otherwise, according to the parlance associated with that online social network. Posts associated with a user can be created by the user themselves, of their own volition, or they can alternatively be created without that user taking action to create the post. An example of the latter occurs in the online social network Facebook®, when one member creates a post to appear on another member's profile page. In this instance, the member whose profile page the post appears on has done nothing of their own volition to create the post.

Recently, online social networks have developed the ability to allow members to provide information on their real-life geographic location. Geographic location information may be provided to an online social network through posts, where the posts contain geographic location information collected from the member's computer or entered by a member. In this instance, the geographic information may be collected by computer hardware that is part of a computer. Alternatively, geographic location information may be provided to an online social network through the provision of geographic location information through the user's own acts or through the acts of others which determine the user's position (e.g., a post stating where the user is or is going, made by the user, or someone else). For example, a first user of an online social network may create a post stating their location and that they are present at that location with a second user of the online social network. Information on the location of both the first and the second user of the online social network is contained within the post. The capability to create such a post is present in the online social network Facebook®.

Foursquare® is a location-based online social network. The Foursquare® online social network may be accessed from the website Foursquare.com, text messaging, or through the Foursquare® app. Foursquare® was created by Dennis Crowley and Naveen Selvadurai. Foursquare® users are able to "check-in" anywhere in the world by accessing a website, text messaging, or by using the Foursquare® app on their computer.

Within Foursquare®, check-ins can be posted to a Foursquare® users' account on Facebook® and Twitter®. This allows Foursquare® users to share their location with people who can access these social networks. Foursquare® also enables push-notifications which can appear on a Foursquare® users' computer when one of the people they follow checks-in at a location.

Gowalla® is another example of a location-based online social network. Like Foursquare®, Gowalla® users can "check-in" at real-life physical locations. Other location-based online social networks include Brightkite® (a registered trademark of HDMessaging Inc.), MyTown® (a registered trademark of Booyah Inc.), Limbo® (a registered trademark of Limbo, Inc.), and Loopt® (a registered trademark of Loopt, Inc.). The social networking site Facebook® also released a location-based aspect to its site, known as Facebook® Places. With Facebook® Places, Facebook® users can share their location using any computer that can access the Facebook® online social network.

Example Embodiments

FIG. 1 illustrates a system architecture for electronic commerce initiated through use of video games and fulfilled by delivery of physical goods, according to some embodiments. A video game server 120 includes client interface 128 in communication with a database 124, an analytics module 126 and a merchant management module 122.

Video game server 120 communicates with video game clients 132 and 138, as well as a fulfillment entity 156, an analytics client 152, and a merchant client 155 over a network 146. In some embodiments, video game clients 132 and 138 are video game computers. Analytics client 152 and merchant client 155 may be general purpose computers or special purpose computers.

In one example transaction, video game client 132 maintains a session link 136 over network 146 with client interface 128 of video game server 120 for allowing a user of video game client 132 to interact with a video game provided by video game server 120. Video game server 120 includes in the video game environment presented to the video game player accessing video game client 132 a representation of a merchant outlet 134. Video game server 120 performs displaying within a video game environment a representation of a merchant outlet 134 by transmitting over session link 136 instructions and data for presenting the representation of merchant outlet 134. In the example described herein, representation of a merchant outlet 134 is achieved through the representation of a pizza delivery merchant in the video game environment. The pizza delivery merchant can deliver goods to the user of video game client 132. One of skill in the art will readily comprehend in light of having read the present disclosure that this example is merely illustrative, rather than limiting, and that the goods sellable through merchant outlet 134 are not limited to pizza or to any other particular class of goods.

In general, a merchant outlet exists in the video game environment as a resource that allows video game characters to purchase goods and services where those goods and services are for use in real life. The merchant outlet may be represented in the video game environment in a variety of ways. The merchant outlet in this example may be represented as a 3-D structure within the video game environment, where the 3-D structure is a merchant store that the player's character may enter. Once inside the merchant store the player's character may order by interacting with a non-human controlled character. This non-human controlled character in this example is a customer service agent present inside the merchant store that exists as part of the merchant outlet. Other manners to order items from the merchant outlet exist. In some other embodiments merchant outlets may have human-controlled characters that operate as part of the merchant outlet to facilitate the ordering of items, similar to the manner that customer service agents facilitate the ordering of items in the real world. In such examples the player's character may interact with the customer service agent that exists as part of the merchant outlet (e.g., by asking them questions, placing orders, receiving promotions, etc.). In some embodiments, the player may select the manner that they wish to order items from the merchant outlet (e.g., through a kiosk, through interaction with a human controlled character, through interaction with a non-human controlled character, etc.).

The merchant outlet in this example may sell items using a set-price for each item offered for sale. In some embodiments the price that a merchant outlet offers to sell a given item for may vary across different video game players (e.g., as a result of price-discrimination based on information about that video game player, as a result of A/B price testing, etc.). In some embodiments items offered for sale through a merchant outlet are sold through a haggle system. For example, the sale price of an item may not be displayed or known to the video game player, but rather may be determined after the video game player and the merchant outlet agree on a price for the item. The negotiation of a purchase price may be accomplished through the interaction of the player's video game character with a character representing the merchant outlet (e.g., a customer service agent). In some embodiments items offered for sale through a merchant outlet are sold through an auction system. Such auctions may be of any type (e.g., open ascending price auctions, open descending price auctions, first-price sealed-bid auctions, sealed-bid second-price auctions, reverse auctions, etc.). Such auctions may or may not involve a video game character that is an auctioneer to facilitate the sale of the items to be auctioned. The bidding on an item sold at auction by a merchant outlet may be accomplished through the action of the player's video game character in making bids. For example, several video game players may participate in an auction for an item that the merchant outlet will sell to the highest bidder by having their respective video game characters present at a merchant outlet (or other site within the video game environment, such as an auction house, where the auction occurs).

The merchant outlet in this example may include physical representations of some or all of the items offered for sale through the merchant outlet. In some embodiments a player's video game character may "grab-and-go" to accomplish purchase of an item. In such a case a player's video game character may interact with the representations of the items offered for sale within the merchant store, such that if the video game character leaves the merchant outlet (or a certain proximity around the merchant outlet) the video game player has effected the purchase of the real-life version of the item. In this situation the item will be delivered to the video game player in real life and payment information will be used according to information associated with the video game player. The video game player's character may further be able to manipulate representations of the items offered for sale in the merchant outlet. This could, for example, include trying on an item of clothing, such that the player's character is shown to be wearing the item of clothing in the video game environment. The player's character may further be able to physically manipulate the representation of an item offered for sale, so as to inspect it from various angles. The player's character may further be able to access information pertaining to items offered for sale, such as product reviews, prices at which other merchants offer the item for sale, and information on other people who have purchased the item, for example.

In some embodiments a video game character may interact with the merchant outlet (e.g., through the use of a kiosk, customer service representative, etc.) to search for and/or compare items that are sold through the merchant outlet.

In some embodiments a video game character may have the ability to communicate with the merchant outlet through the use of a game-play mechanics. For example, in a video game in which a player's video game character has a mobile phone that mobile phone may be used to communicate with a representative or system associated with a merchant outlet within the video game (e.g., by contacting a non-human customer service representative associated with the merchant store that is controlled by computer programming, an automated system associated with the merchant store that is controlled by computer programming, etc.). In another example, in a video game in which a player's video game character has a mobile phone that mobile phone may be used to communicate with a live representative of a merchant store (e.g., a live customer service representative existing in the real world, an automated system accessible through a phone number, etc.). This may be accomplished, for example, through the use of computer networking to make a telephone call from the player's video game computer. This allows the video game player to interface with a representative or system associated with the merchant store through the operation of the video game. In both scenarios the gameplay mechanics may allow for voice input, such that the player's real-life voice is used to communicate with the representative or system associated with the merchant store.

A user of video game client 132 provides input 130. For example, input 130 can be an instruction for an avatar that is the user's player character to take an action within the video game environment. In this example, input 130 may be an instruction that within the video game environment the avatar order and pay for a pizza within representation of a merchant outlet 134. Within the video game environment, the merchant outlet 134 presents one or more offers of items for sale, such as a variety of pizzas, beverages, salads, and desserts. The one or more offers of the items for sale includes offers of items for sale having physical existence in the physical world outside of the video game environment. Thus, by ordering a pizza in the virtual world of the video game environment using representation of a merchant outlet 134 and the input 130 provided by the user, the actions of the avatar in the video game environment cause a real-life pizza to be delivered to the real-life location of the user of video game client 132. The pizza is delivered by the merchant represented by the representation of merchant outlet 134.

A client interface 128 of video game server 120 receives (through session link 136 and video game client 132) input 130 from a video game player indicating acceptance of at least one of the one or more offers of items for sale (e.g., the pizza). Responsive at least in part to the input 130 from the video game player indicating the acceptance of the at least one of the one or more offers of items for sale, video game server 120 prepares an order 160 for an item (physical goods 154) corresponding to the at least one of the one or more offers of items for sale to be physically delivered to the video game player. Client interface 128 may communicate order 160 through order link 161 and through fulfillment session connection 144 to fulfillment entity 156. In this example a fulfillment entity 156, such as a physical pizza restaurant, prepares to the specifications of the order the physical goods 154 (pizza according to the order) for delivery.

In some embodiments, client interface 128 communicates with a merchant client 155 for handling of payment transactions (e.g., credit card payments, virtual currency debits) over a merchant interface 158 through which payment information 150 is communicated. In some embodiments, analytics client 152 receives from analytics module 126 for presentation through an analytics interface 153 analytics data 148 describing trends in the sale of items, trends in development of demographics of the potential customer base playing games presented by video game server 120, or suggestions for items to offer for sale in using representation of a merchant outlet 134. Examples of analytics transactions will vary between embodiments. For example, analytics module 126 may make generate product suggestions for offers in merchant outlet 134 based on the identity and previous purchase habits of a user of video game client 132. In another example, analytics module 126 may generate product suggestions for offers in merchant outlet 134 based on the previous purchase habits of users sharing characteristics or relationships with a user of video game client 132.

Assuming a hypothetical example video game player named Romeo Montague in Mantua, Italy, analytics module 126 may access database 124 to ascertain from the previous pizza topping purchase habits of Romeo the preferred toppings to suggest to him on a pizza offered through merchant outlet 134. Alternatively, similar suggestions may be generated from the profiles of persons with characteristics similar to the user of video game client 132. For example, because other video game players from Mantua, Italy tend to prefer thin-crust pizza (as indicated in database 124), Romeo may be presented with offers for thin-crust pizza. In this example a different suggestion may be made to a hypothetical example video game player named Juliet Capulet who lives in Verona, Italy using video game client 138. Because other video game players from Verona, Italy tend to prefer deep-dish pizza (as indicated in database 124), Juliet may be presented with offers for deep-dish pizza. Likewise, analytics module 126 may identify more complex inferences suggesting offers for presentation in merchant outlet 134. For example, video game server 120 may have access to data showing that Romeo has purchased cheese from Sicily in the past, the purchase of which is highly correlated with purchases of suits made in Italy. Therefore, merchant outlet 134 may use this information to present an offer to sell an Italian suit to Romeo. Various example functions usable by embodiments for performing analytics functions are discussed below, for example with respect to FIGS. 19-21, FIGS. 24-26, and FIGS. 29-31.

In some embodiments, video game client 138 will receive a status indication 140 over a game session link to inform the user of video game client 138 of a purchase ordered by a user of video game client 132. For example, as the physical pizza is delivered to the user of video game client 132, a virtual pizza delivery character associated with a merchant outlet might appear within the vision of a user of video game client 138, in order to encourage purchase of a pizza by the user of video game client 138. In another example, as the physical pizza is delivered to the user of video game client 132, a virtual pizza delivery character associated with a merchant outlet might appear within the vision of the user of video game client 132, in order to display the status of the delivery of physical goods. In another example, as the user of video game client 132 orders a pizza through the action of their video game character within the video game environment the order may be made known to the user of video game client 138 through a message within the video game.

Some embodiments allow video game players to engage in the above described aspects of shopping through their experiences within a video game. In some embodiments multiple players may simultaneously shop in a merchant outlet that is created within the video game environment through the use of their game characters. Moreover, some embodiments allow players within a game to share their character's location within the video game's virtual environment when their character is present at or in the vicinity of a merchant outlet within a video game, so that other players may know that the player's character is present at the merchant's outlet and/or may have their own characters join that player's character at the merchant's outlet within the video game environment. The player character's location within a video game environment may be provided to other players through an online social network, through the operation of the video game, or otherwise.

In some embodiments the merchant outlet within the video game's virtual environment is situated so as to encourage, foster, or otherwise facilitate purchases from the merchant outlet. This includes, for example, positioning the merchant outlet within the video game's virtual environment at a position where player's characters commonly visit (e.g., a crossroads, a regeneration point, etc.). In some embodiments the presence of games or other diversions that may be accessed when the player's character is present in or is in the vicinity of the merchant outlet may be used to entice players to the vicinity. In some embodiments the merchant outlet may be incorporated in to the normal course of game play by design of the video game. For example, a level may start such that the player's character is located within or in the vicinity of the merchant outlet within the video game environment.

The merchant outlet need not be a closed or even semi-closed structure within the video game environment. Rather, in some embodiments the merchant outlet within the video game's virtual environment is displayed in the form of a character, cart, table, shelf, kiosk, or otherwise. In such embodiments the player's character is not able to enter into the representation of the merchant outlet, so to speak, yet the player's character is still able to interact with the merchant outlet as in other embodiments where the player's character may enter into the representation of the merchant outlet.

In some embodiments the merchant outlet within the video game's virtual environment is displayed in the form of a mobile vendor or a character that can move. In such embodiments the location of the merchant outlet within the video game's virtual environment may change over time, much as a mobile vendor or person in the real world may change their position.

In some embodiments the video game's virtual environment may include advertisements for either the goods sold within the merchant outlet or advertisements for the merchant outlet itself.

In some embodiments the presence of a player's video game character at or in the vicinity of a merchant outlet within the video game environment may entitle the player to receive coupons, discounts, or credits to be used at a store that exists in real-life. For example, when a player's video game character enters a merchant outlet for a fast food merchant in the video game environment, the game may indicate that the player is entitled to receive a coupon or discount that may be applied in the purchase of real life goods and/or services from the fast food merchant's real-life stores.

In some embodiments the presence of a player's video game character at or in the vicinity of a merchant outlet within the video game environment may entitle the player to receive coupons, discounts, or credits to be used at that merchant outlet or another merchant outlet that exists in the video game environment. For example, when a player's video game character enters a merchant outlet for a grocery merchant in the video game environment, the game may indicate that the player is entitled to receive a coupon or discount that may be applied in the purchase of real life goods and/or services from the grocery merchant's outlets within the video game environment.

In some embodiments, within a video game a player may acquire discounts that may be applied at a merchant outlet within the video game (e.g., coupons, currency for use at a merchant outlet, etc.).

In some embodiments the merchant outlet is represented as a closed structure (e.g., a building) or a semi-closed structure (e.g., a tent) within the video game environment, such that a player's character may enter the representation of the merchant outlet. In such embodiments it is possible that multiple player's characters may be present at the merchant outlet at once. The appearance of the merchant outlet may be, but need not be, similar in form to a physical merchant store as it may appear in real-life.

In some embodiments a video game player's character within the video game environment is associated with a merchant outlet as an affiliate seller for the merchant outlet. In such an example, a video game player whose video game character is an affiliate of a merchant outlet may earn money, may receive discounts from a merchant outlet, or may receive other compensation in return for their referral of other video game players to the merchant outlet. Such referrals may take place within the video game environment.

In some embodiments a video game player's character may display advertisements for one or more merchant outlet. These advertisements may be seen by other video game characters through gameplay. This may be accomplished through the use of advertisements on a character's clothing, a sign held by the character, or otherwise. In such an instance the advertisements need not be limited to advertisements for merchant outlets within the video game environment, as advertisements of other real-life entities may also be desirable.

In some embodiments, video game server 120 transmits over network 146 game state information as a part of session link 136 for rendering the video game environment for gameplay by the video game player at video game client 132. In some embodiments, the video game environment includes a representation of a plurality of spaces, and one of the plurality of spaces comprises the merchant outlet 134.

In some embodiments, merchant management module 122 receives (e.g., via client interface 128 and video game client 132, input 130 from the video game player indicating movement of a video game character through the video game environment and input 130 from the video game player indicating manipulation of virtual objects in the video game environment. In some embodiments, the input 130 from the video game player indicating movement of a video game character through the video game environment includes movement of a video game character into the one of the plurality of spaces, such as a space containing the representation of a merchant outlet 134 and input 130 from the video game player indicating manipulation of virtual objects in the video game environment.

In some embodiments, merchant management module 122 receives (e.g., via client interface 128 and video game client 132, input 130 from the video game player indicating the acceptance of the at least one of the one or more offers of items for sale, and the input includes character action input from the video game player indicating an action by a character representing a purchase from the representation of the merchant outlet 134 of at least one of the one or more items for sale. In some embodiments, the character action input is represented in the video game environment as an action of a character associated with the video game player in the video game environment.

Some embodiments support indicating in the video game environment status of the item corresponding to the at least one of the one or more offers of items for sale to be physically delivered to the video game player. In some embodiments, a status indication is sent over a session link 136 to a video game client 132 for the purpose of indicating in the video game environment status of the item corresponding to the at least one of the one or more offers of items for sale to be physically delivered to the video game player. The indicating in the video game environment the status of the item corresponding to the at least one of the one or more offers of items for sale to be physically delivered to the video game player is represented in the video game environment as an action of a character in the video game environment. A status update (not shown) can be sent over session link 136 to video game client 132 to communicate to a user of video game client 132 the status of a purchase. Examples could include a character in the video game throwing pizza dough through the air while a pizza is being prepared or showing a character associated with the merchant outlet journeying to the character of the user of video game client 132 when the status of the purchase changes from 'in production' to 'in delivery.'

In some embodiments, merchant management module 122 can communicate to an observer in the video game environment the purchases of another user in the video game environment as a form of advertising. In some embodiments, a status indication 140 is sent over a session link 142 to a video game client 138 for the purpose of indicating in the video game environment status of the item corresponding to the at least one of the one or more offers of items for sale to be physically delivered to the video game player. The indicating in the video game environment the status of the item corresponding to the at least one of the one or more offers of items for sale to be physically delivered to the video game player is represented in the video game environment as an action of a character associated with the merchant outlet in the video game environment.

In some embodiments, order 160 has an associated record of a purchase transaction comprising transaction customization terms applicable to the acceptance of the at least one of the one or more offers of items for sale. In some embodiments, order 160 has an associated record of a purchase transaction comprising analytic data describing the video game player. In some embodiments, the order has an associated record of a purchase transaction comprising data representing the input from the video game player indicating acceptance of the at least one of the one or more offers of items for sale.

In some embodiments, order 160 is a record of a purchase transaction comprising transaction customization terms applicable to the acceptance of the at least one of the one or more offers of items for sale. In some embodiments, order 160 is a record of a purchase transaction comprising analytic data describing the video game player. In some embodiments, the order is a record of a purchase transaction comprising data representing the input from the video game player indicating acceptance of the at least one of the one or more offers of items for sale.

In some embodiments merchant management module 122 receiving input 130 originating from the video game player indicating the acceptance of the at least one of the one or more offers of items for sale comprises receiving character action input from the video game player indicating an action by a character representing a purchase from the representation of the merchant outlet of at least one of the one or more items for sale. In some embodiments merchant management module 122 communicates to a fulfillment entity 156 the order for the physical goods 154 corresponding to the at least one of the one or more offers of items for sale to be physically delivered to the video game player, for example over a fulfillment session connection 144.

Figure 2:
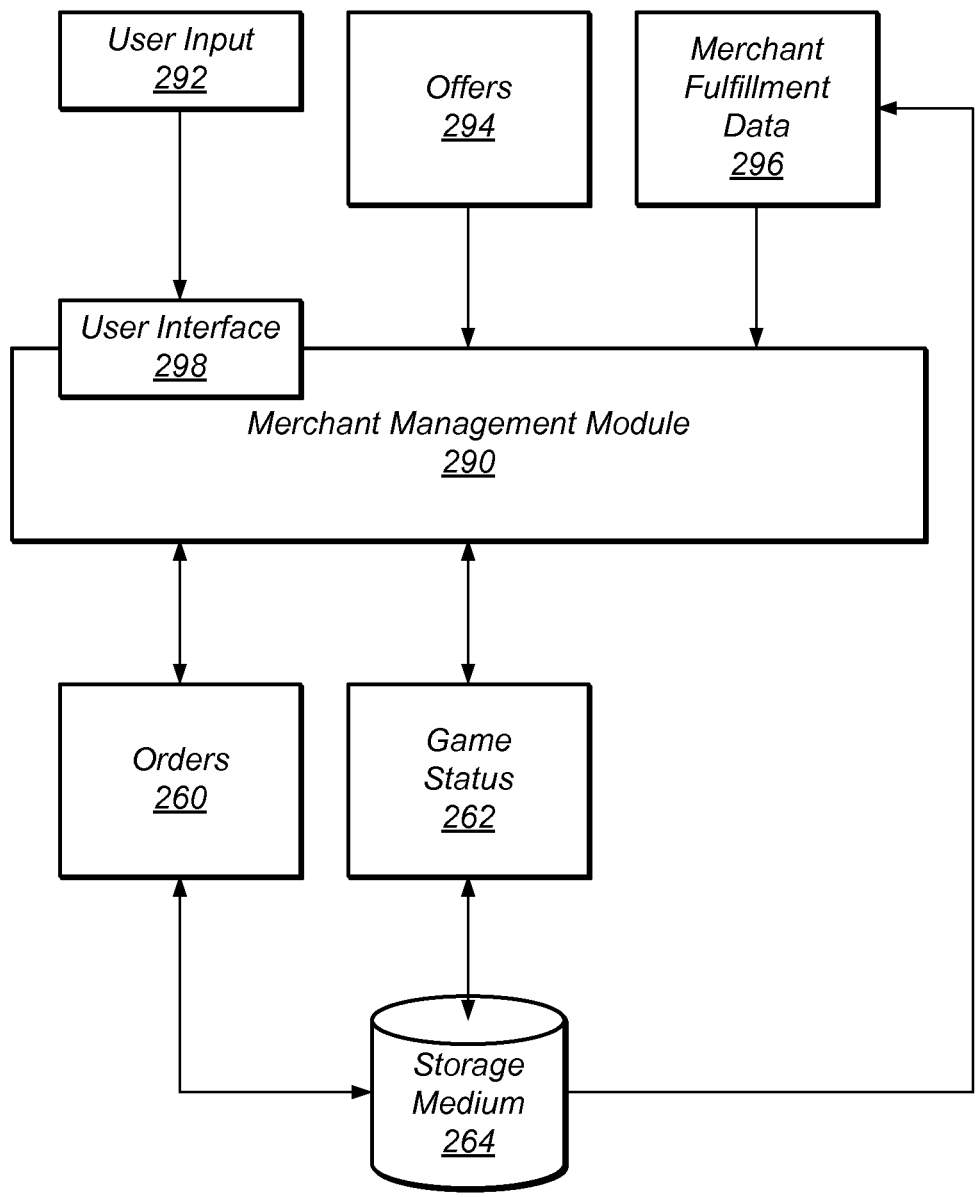
FIG. 2 depicts a module that may be used for implementing electronic commerce initiated through use of video games and fulfilled by delivery of physical goods, according to some embodiments.

FIG. 2 depicts a module that may be used for implementing electronic commerce initiated through use of video games and fulfilled by delivery of physical goods, according to some embodiments. Such a module is implemented on a server, as described above, or, in some embodiments, on a client machine or individual video game computer. A merchant management module 290 receives offers 294 for display within a video game environment a representation of a merchant outlet displayed on a user interface 298, which can also be reported as changes to game status 262 and can be stored in a storage medium 264. Within the video game environment, the merchant outlet presents one or more offers 294 of items for sale through user interface 298. The one or more offers 294 of the items for sale have physical existence in the physical world outside of the video game environment. User interface 298 receives user input 292 from the video game player indicating acceptance of at least one of the one or more offers 294 of items for sale. Responsive at least in part to the user input 292 from the video game player indicating the acceptance of the at least one of the one or more offers 294 of items for sale, merchant management module 290 prepares orders 260 for an item corresponding to the at least one of the one or more offers 294 of items for sale, which can be stored in storage medium 264. Merchant fulfillment data 296 may also be reported to merchant management module 290 for display in user interface 298.

Figure 3:
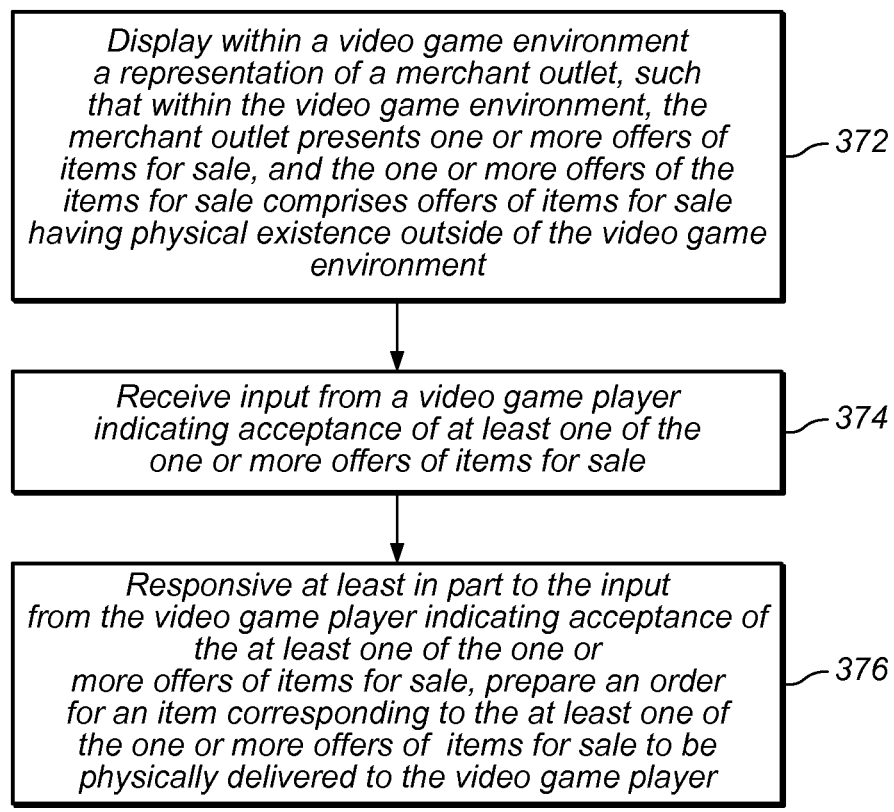
FIG. 3 is a flowchart of a method that may be used for implementing electronic commerce initiated through use of video games and fulfilled by delivery of physical goods according to some embodiments.

FIG. 3 is a flowchart of a method that may be used for implementing electronic commerce initiated through use of a video game and fulfilled by delivery of physical goods according to some embodiments. Within a video game environment a representation of a merchant outlet is displayed, such that within the video game environment, the merchant outlet presents one or more offers of items for sale, and the one or more offers of the items for sale comprises offers of items for sale having physical existence outside of the video game environment (block 372). Input from a video game player indicating acceptance of at least one of the one or more offers of items for sale is received (block 374). Responsive at least in part to the input from the video game player indicating acceptance of the at least one of the one or more offers of items for sale, an order for an item corresponding to the at least one of the one or more offers of items for sale to be physically delivered to the video game player is prepared (block 376).

Figure 4:
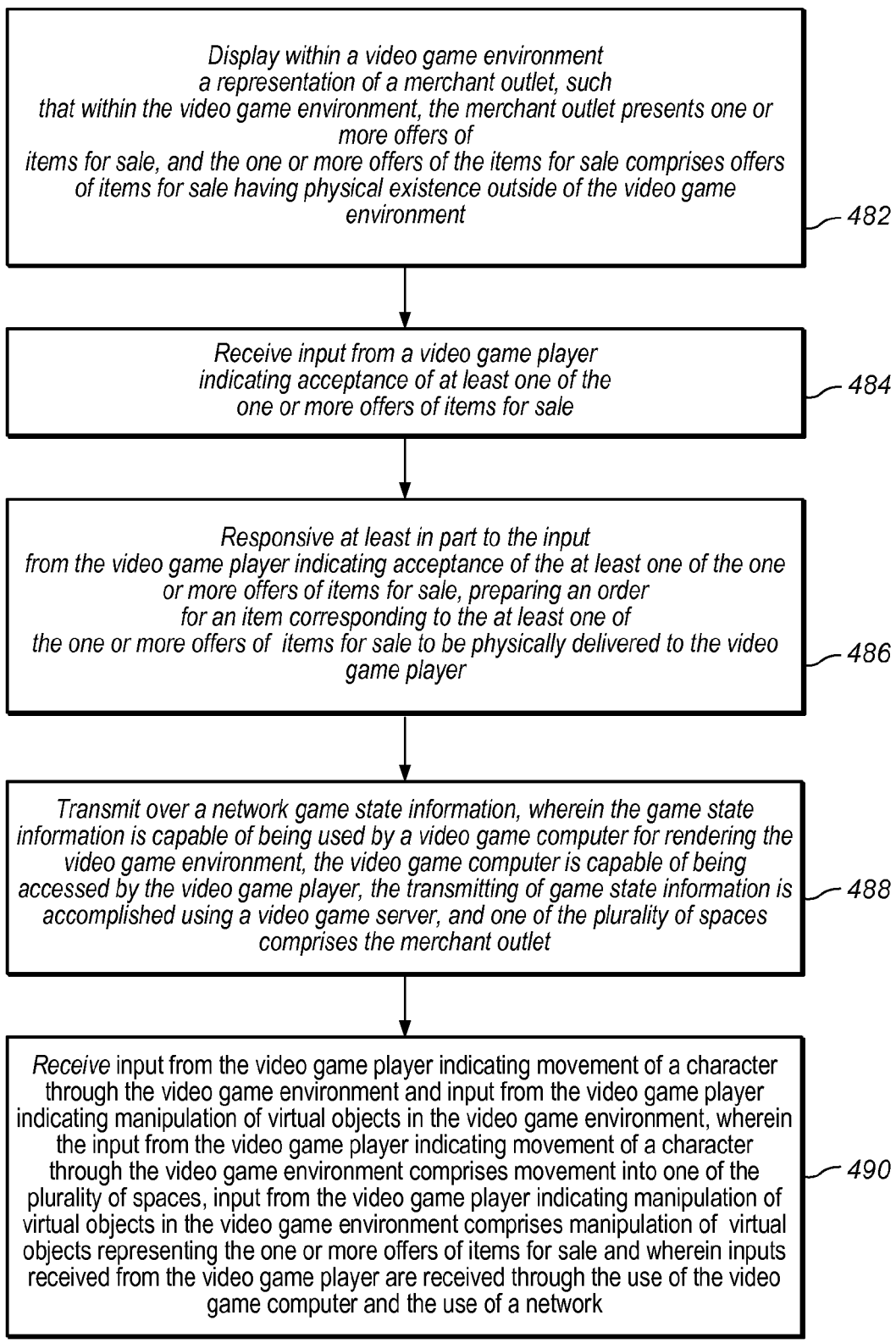
FIG. 4 is a flowchart of a method that may be used for implementing electronic commerce initiated through use of video games and fulfilled by delivery of physical goods according to some embodiments.

FIG. 4 is a flowchart of a method that may be used for implementing electronic commerce initiated through use of a video game and fulfilled by delivery of physical goods according to some embodiments. Within a video game environment a representation of a merchant outlet is displayed, such that within the video game environment, the merchant outlet presents one or more offers of items for sale, and the one or more offers of the items for sale comprises offers of items for sale having physical existence in the physical world outside of the video game environment (block 482). Input from a video game player indicating acceptance of at least one of the one or more offers of items for sale is received (block 484).

Responsive at least in part to the input from the video game player indicating the acceptance of the at least one of the one or more offers of items for sale, an order for an item corresponding to the at least one of the one or more offers of items for sale to be physically delivered to the video game player is prepared (block 486). Network game state information is transmitted, wherein the game state information is capable of being used by a video game computer for rendering the video game environment, and the video game computer is capable of being accessed by the video game player, and the transmitting of game state information is accomplished using a video game server, and one of the plurality of spaces comprises the merchant outlet. (block 488). Input from the video game player is received indicating movement of a character through the video game environment and input from the video game player indicating manipulation of virtual objects in the video game environment, wherein the input from the video game player indicating movement of a character through the video game environment comprises movement into one of the plurality of spaces, input from the video game player indicating manipulation of virtual objects in the video game environment comprises manipulation of virtual objects representing the one or more offers of items for sale and wherein inputs received from the video game player are received through the (block 490).

Figure 5:
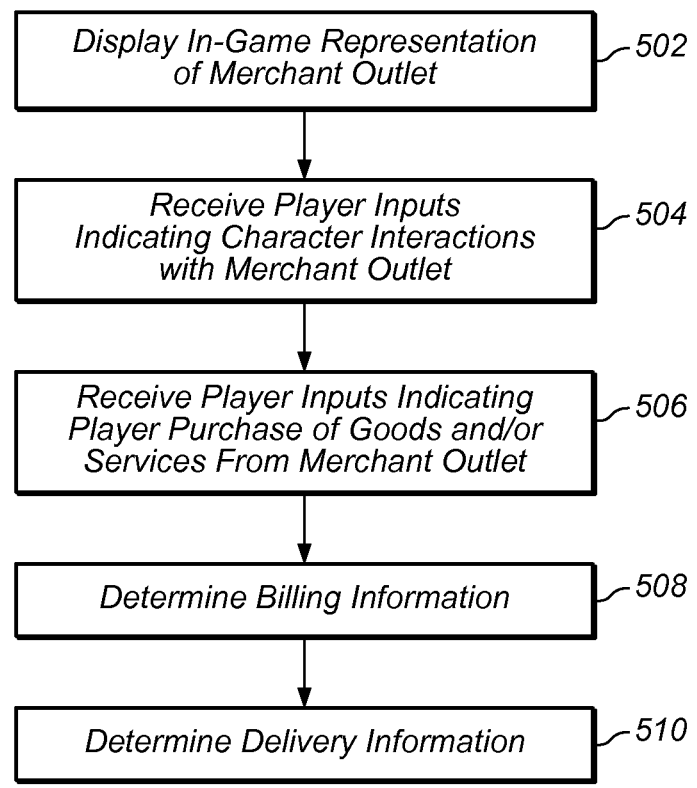
FIG. 5 is a block diagram depicting steps taken by a system in an embodiment of the invention.

FIG. 5 is a block diagram depicting steps taken in an embodiment of the invention. Within a video game the system displays an in-game representation of a merchant outlet (block 502). This representation may be consistent with the atmosphere created by the virtual video game environment. For example, in a video game where characters move through a 3-D world with 3-D rendering of structures, the in-game representation of the merchant outlet may be a rendered as a 3-D structure in the video game environment, consistent with its surroundings therein. Beyond this, where the video game environment takes on certain archetypal properties (e.g., medieval, futuristic, space-based, etc.) the in-game representation of the merchant outlet may match the archetype used such that stylistically the merchant outlet fits in with the video game environment. The merchant outlet may be a part of the game experience, such that a player's character may interact with the merchant outlet (e.g., access the store front, go into the store, interact with a character associated with the merchant outlet in the store, etc.) consistent with game-play mechanics.

Accordingly, the system may receive player inputs indicating that the player's character is interacting with the merchant outlet (block 504). Such interactions may include, for example, inputs indicating that the player's character wishes to enter/exit the merchant outlet, the player's character wishes to browse the goods and/or services offered for sale at the merchant outlet, or that the player wishes to purchase goods and/or services from the merchant outlet. The selection of goods and/or services offered for sale in the merchant outlet may be provided, for example, according to inventory information held on the video game computer, a merchant server, or another computer. This inventory may be provided through the use of an electronic merchant catalog held in memory on the video game computer, a merchant server, or another computer where such electronic merchant catalog contains information about the goods and/or services offered for sale by the merchant outlet (e.g., descriptions of the products/services, pictures, prices, quantity available, etc.). Once the player, through the operation of the video game (e.g., through the operations of the player's character), indicates that the player wishes to purchase goods and/or services from the merchant outlet, the system receives these inputs (block 506). The system then takes the necessary steps to complete the transaction, for example through the use of a payment gateway.

This may include determining billing information (block 508) for the transaction and determining delivery information (block 510) for the goods and/or services purchased. Billing information may take many forms, including a name, billing address, credit card account information, bank account information, Pay Pal account information, bank account routing number information, electronic funds transfer information, or other information used in the processing of payments. The billing information may also include information pertaining to virtual currency (e.g., credits, points, etc.) that exist in the video game. Delivery information may include a name, mailing address, physical address, P.O Box, longitude and latitude coordinates, location description (e.g., "second floor of the Ballston Mall"), closest street intersection, one or more photos/videos, satellite imagery, a map, written directions, IP address, username, or other information that can be used to determine the location where the goods and/or services purchased should be delivered. In determining billing information (block 508) the system may query the player, such that the player inputs the billing information to a prompt within the game. Alternatively, the system may access information already available in computer memory (where such computer memory may be located on a player's video game computer or on a game server, for example). Upon receiving billing information, the system may verify that the billing information is valid and provides sufficient funds to pay for the goods and/or services that the player wishes to purchase. Where the billing information received is insufficient to pay for the goods and/or services that the player wishes to purchase, or where the billing information is not valid (e.g., an invalid credit card number is received), the system may notify the player such that the player can provide alternative or additional billing information to satisfy the requirements for the purchase. In determining delivery information (block 510) the system may verify the provided delivery information as valid (e.g., by checking a provided address for correct format or by checking a provided address against a database of known addresses). Thereafter the system may take the necessary steps to ensure that the goods and/or services purchased are delivered to the appropriate location.

Figure 6:
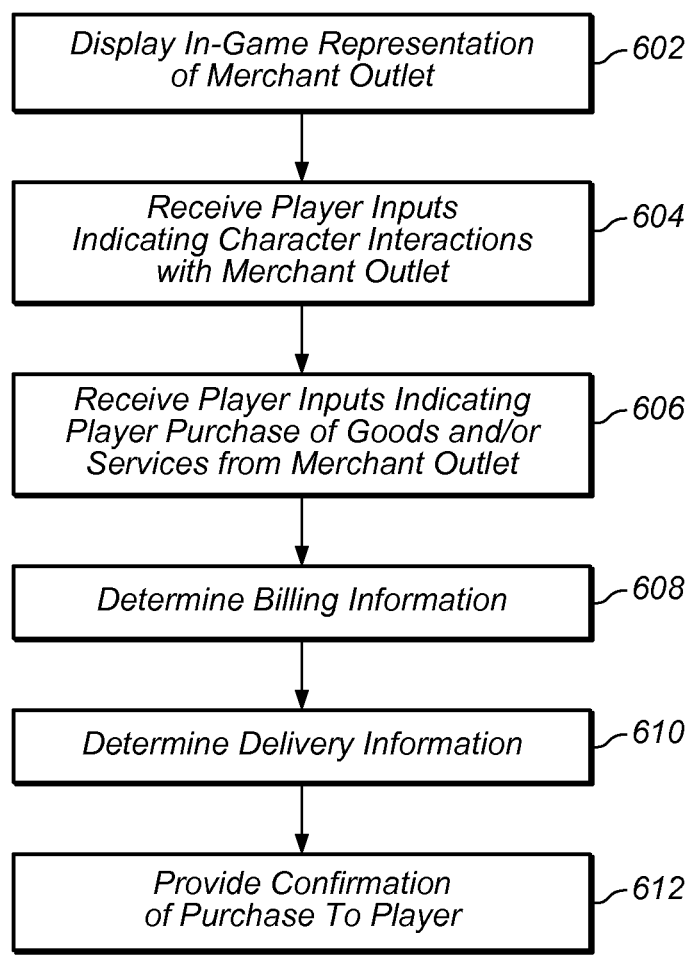
FIG. 6 is a block diagram depicting steps taken by a system in an embodiment of the invention, wherein confirmation of a purchase is provided to a player.

FIG. 6 is a block diagram depicting steps taken by a system in an embodiment of the invention. The system of FIG. 6 may operate as described above in reference to FIG. 5 (with blocks 602, 604, 606, 608, and 610 of FIG. 6 corresponding to blocks 502, 504, 506, 508, and 510 of FIG. 5, respectively), but also may provide confirmation of the purchase to the player (block 612). This confirmation may be provided in a number of ways. For example, the confirmation may be provided to the player through the operation of the video game. This may be as a visual or aural confirmation provided in the operation of the video game. Alternatively, or in addition, the system may generate a notification in the form of an email, text message, phone call, notification through an online social network, etc. that is designed to reach the player. In this scenario the player's phone number, email address, online social network identity, etc. must be determined or known by the system (e.g., as part of the process of the player ordering a good and/or service from the merchant outlet). In another embodiment, such notification may be sent in the same manner to a video game player other than the video game player who made the purchase.

Figure 7:
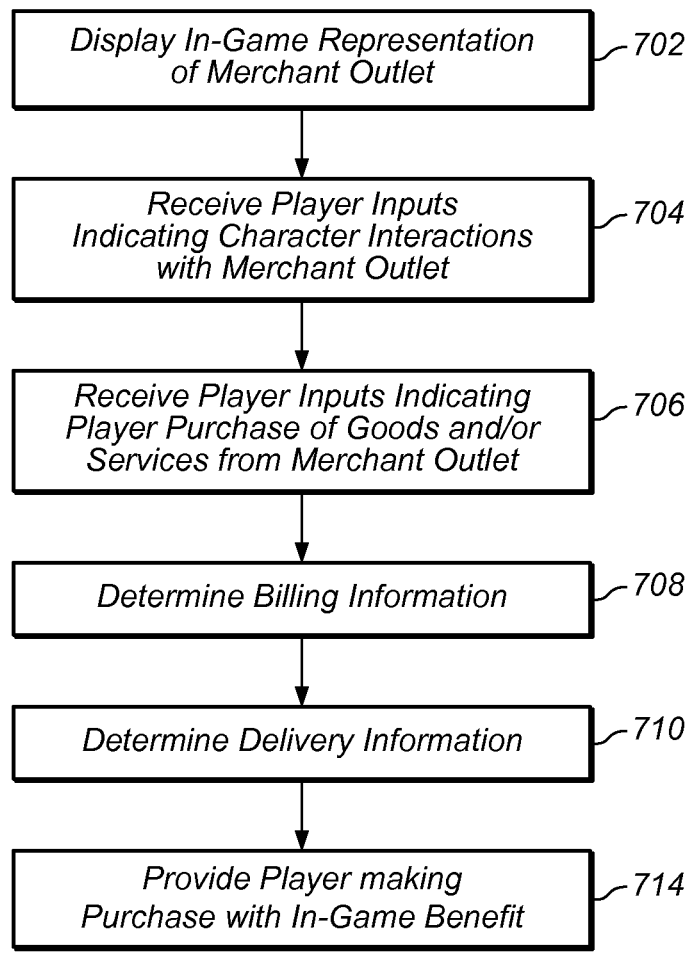
FIG. 7 is a block diagram depicting steps taken by a system in an embodiment of the invention, wherein an in-game benefit is provided to a player.

FIG. 7 is a block diagram depicting steps taken by a system in an embodiment of the invention. The system of FIG. 7 may operate as described above in reference to FIG. 5 (with blocks 702, 704, 706, 708, and 710 of FIG. 7 corresponding to blocks 502, 504, 506, 508, and 510 of FIG. 5, respectively), but also may provide the player making the purchase with an in-game benefit (block 714). This in-game benefit may be, for example an award of points, health, a badge, an ability, virtual cash, etc. This award may be attributed to the player's character or may be the "unlocking" of game content previously unavailable.

Figure 8:
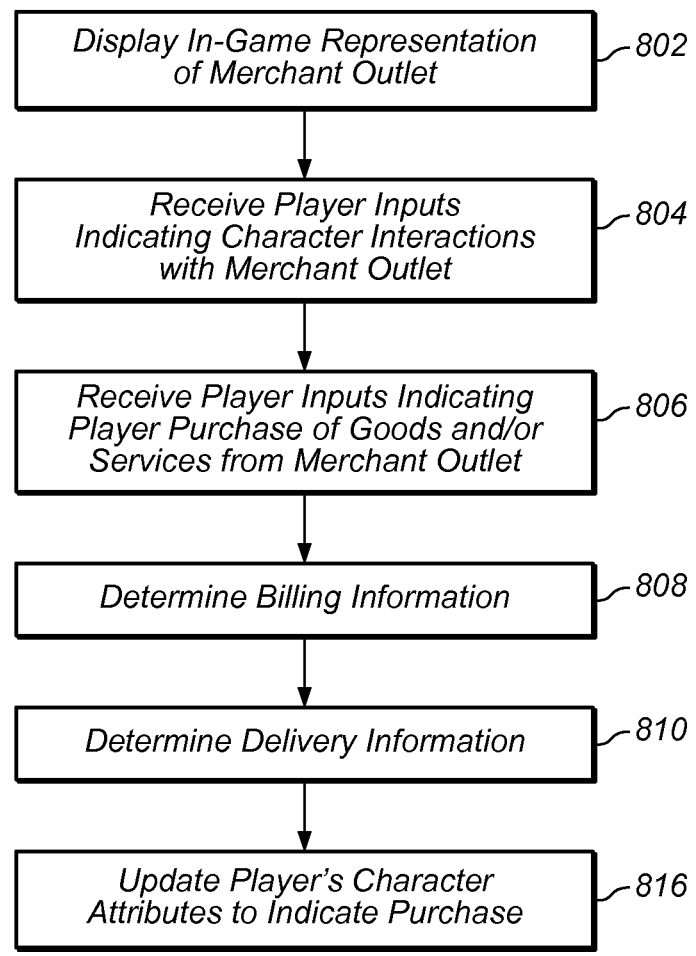
FIG. 8 is a block diagram depicting steps taken by a system in an embodiment of the invention, wherein the attributes of a player's character is updated to indicate a purchase has been made.

FIG. 8 is a block diagram depicting steps taken by a system in an embodiment of the invention. The system of FIG. 8 may operate as described above in reference to FIG. 5 (with blocks 802, 804, 806, 808, and 810 of FIG. 8 corresponding to blocks 502, 504, 506, 508, and 510 of FIG. 5, respectively) but also may update the character of the player making the purchase with attributes that indicate the purchase (block 816). This may be accomplished, for example, through the display of an attribute available to player's characters that have made a purchase at the merchant outlet. One such example would be the display of a certain jacket on the player's character once the player orders the real-life version of the jacket from the merchant outlet. In some embodiments, the display of such a jacket on a player's character may be available only after a player orders the real-life version of the jacket from a merchant outlet within the video game environment. In some embodiments, such attributes are visible to players within the game other than the player whose character's attributes have been updated. In some embodiments, such attributes are visible only to the player whose character's attributes have been updated.

Figure 9:
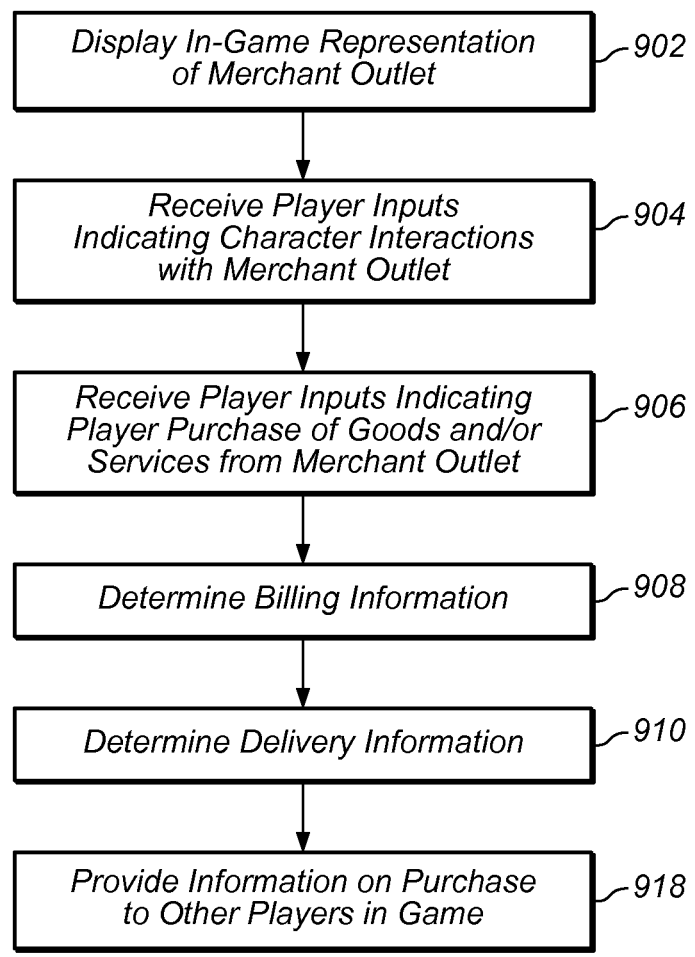
FIG. 9 is a block diagram depicting steps taken by a system in an embodiment of the invention, wherein information relating to a player's purchase is provided to other players in the game.

FIG. 9 is a block diagram depicting steps taken by a system in an embodiment of the invention. The system of FIG. 9 may operate as described above in reference to FIG. 5 (with blocks 902, 904, 906, 908, and 910 of FIG. 9 corresponding to blocks 502, 504, 506, 508, and 510 of FIG. 5, respectively), but also may provide information relating to a player's purchase of goods and/or services to other players in the video game (block 918). This may be accomplished, for example, by presenting a notice to some or all players playing the game at the time of the purchase. Alternatively, this may be accomplished by providing a certain visual or aural indicator to other players who have a character in the proximity of the character of the player that made the purchase, at the time the purchase is made or thereafter.

Figure 10:
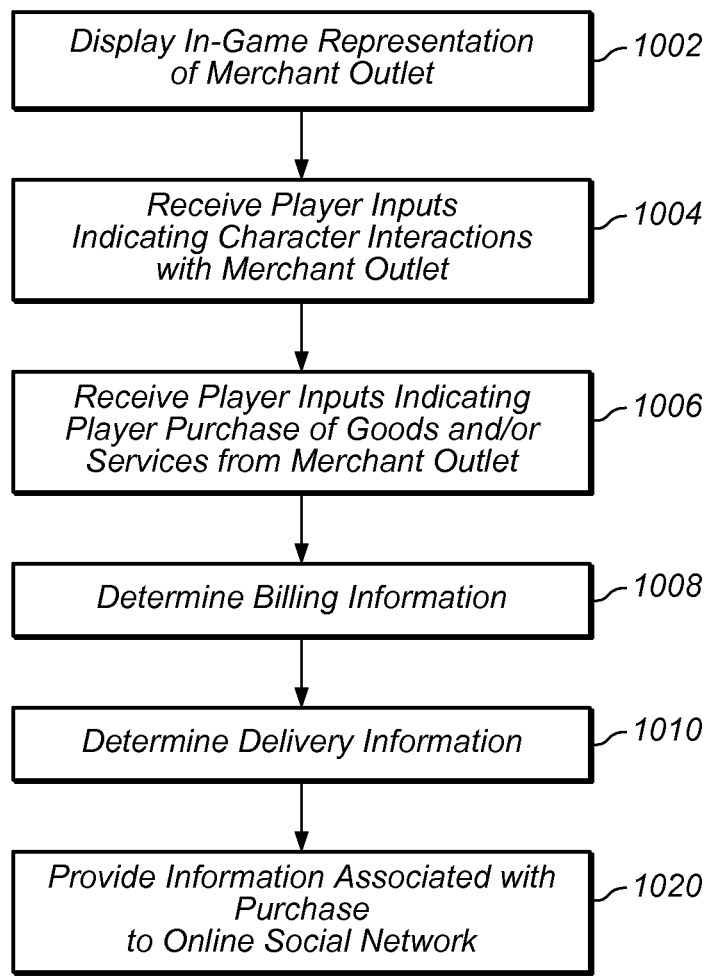
FIG. 10 is a block diagram depicting steps taken by a system in an embodiment of the invention, wherein information associated with a player's purchase within a video game is provided to an online social network.

FIG. 10 is a block diagram depicting steps taken by a system in an embodiment of the invention. The system of FIG. 10 may operate as described above in reference to FIG. 5 (with blocks 1002, 1004, 1006, 1008, and 1010 of FIG. 10 corresponding to blocks 502, 504, 506, 508, and 510 of FIG. 5, respectively), but also may provide information associated with the purchase to an online social network (block 1020). This may be accomplished, for example, by presenting a notice on an online social network using the information on the player's identification on an online social network. In this scenario the player's online social network identity must be determined or known by the system (e.g., as part of the process of the player ordering a good and/or service from the merchant outlet).

Figure 11:
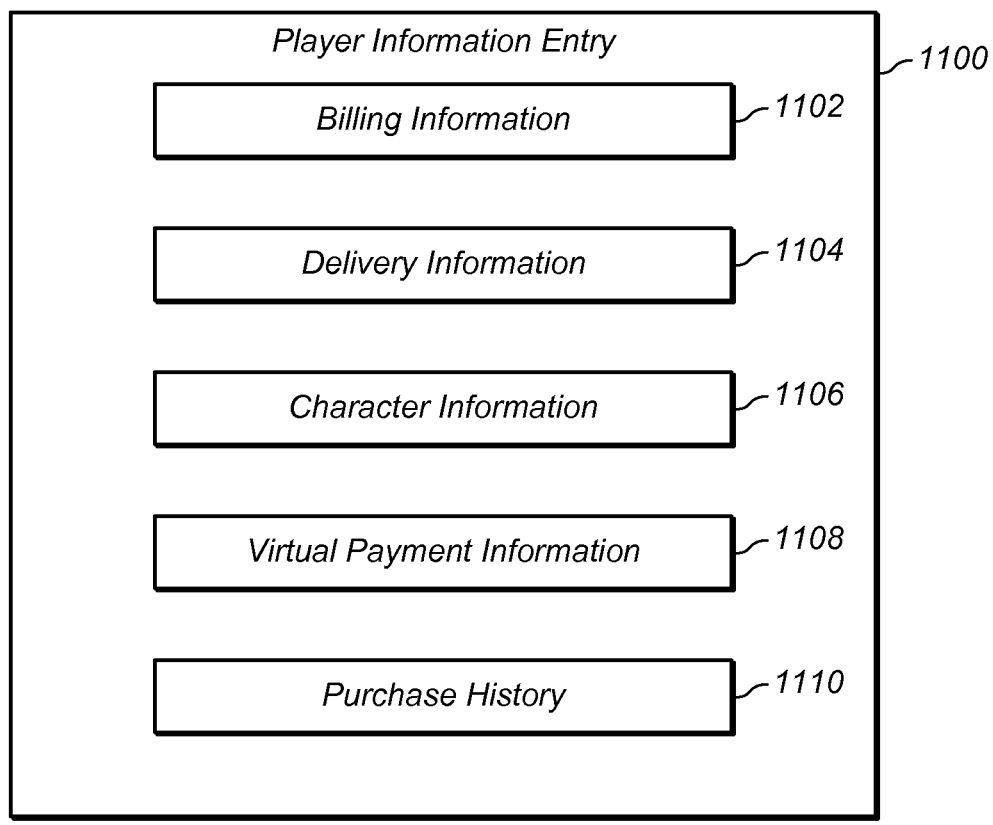
FIG. 11 is a block diagram depicting a system for use in an embodiment of the invention, wherein information specific to a video game player is stored in a player information entry.

FIG. 11 is a block diagram depicting a system for use in an embodiment of the invention. Player information entry 1100 contains information specific to a video game player. Player information entry 1100 may comprise various elements, including billing information 1102, delivery information 1104, character information 1106, virtual payment information 1108, and purchase history 1110. Player information entry 1100 may contain other elements, or less than all of the elements illustrated in FIG. 11. Also, as different players will have different player information entries 1100, each player information entry 1100 may have different elements across the players. Billing information 1102 may include a name, billing address, credit card account information, bank account information, Pay Pal account information, bank account routing number information, electronic funds transfer information, or other information used in the processing of electronic payments. Billing information 1102 may also indicate the funds available for use in the video game (e.g., the amount of funds in a prepaid account or debit account that can be accessed by a player to make purchases within the video game). The content of billing information 1102 may be used by the system in its determination of billing information as shown and discussed in reference to FIG. 5, FIG. 6, FIG. 7, FIG. 8, FIG. 9, and FIG. 10 as (block 508), (block 608), (block 708), (block 808), (block 908), and (block 1008) respectively.

Delivery information 1104 may include a name, mailing address, physical address, P.O Box, longitude and latitude coordinates, location description (e.g., "second floor of the Ballston Mall"), closest street intersection, one or more photos/videos, satellite imagery, a map, written directions, IP address, username, or other information that can be used to determine the location where goods and/or services should be delivered. The content of delivery information 1104 may by used by the system in its determination of delivery information), as shown and discussed in reference FIG. 5, FIG. 6, FIG. 7, FIG. 8, FIG. 9, and FIG. 10 as (block 510), (block 610), (block 710), (block 810), (block 910), and (block 1010) respectively. Character information 1106 may be characteristics associated with the player's character. Player information entry 1100 may have more than one character information 1106, as a single player may have more than one character in some video games. Character information 1106 may contain a player's character's characteristics. Depending on the video game, such characteristics could vary widely, but may include the objects, skills, abilities, weapons, titles, attributes, rewards, and awards the character has acquired; the location, level, or stage that the character has achieved; and/or the total points, health, strength, virtual currency, ranking etc. that the character has acquired. Virtual payment information 1108 provides information pertaining to virtual currency (e.g., credits, points, etc.) that exists in the video game. The content of virtual payment information 1108 may be used by the system in its determination of billing information, as shown and discussed in reference to FIG. 5, FIG. 6, FIG. 7, FIG. 8, FIG. 9, and FIG. 10 as (block 508), (block 608), (block 708), (block 808), (block 908), and (block 1008) respectively. Purchase history 1110 is information associated with past purchases made by the player. Purchase history 1110 may contain entries for each such previous purchase made by the player, with each entry containing information such as a description of the good or service purchased (e.g., an SKU, ISBN, UPC, ASIN, EAN, written description, or otherwise), the date of the purchase, the price paid for the item purchased, and the vendor the item was purchased from. Other information may also exist in purchase history 1110, and as subsequent purchases are made by the player purchase history 1110 may be updated to include information associated with those purchases.

Figure 12:
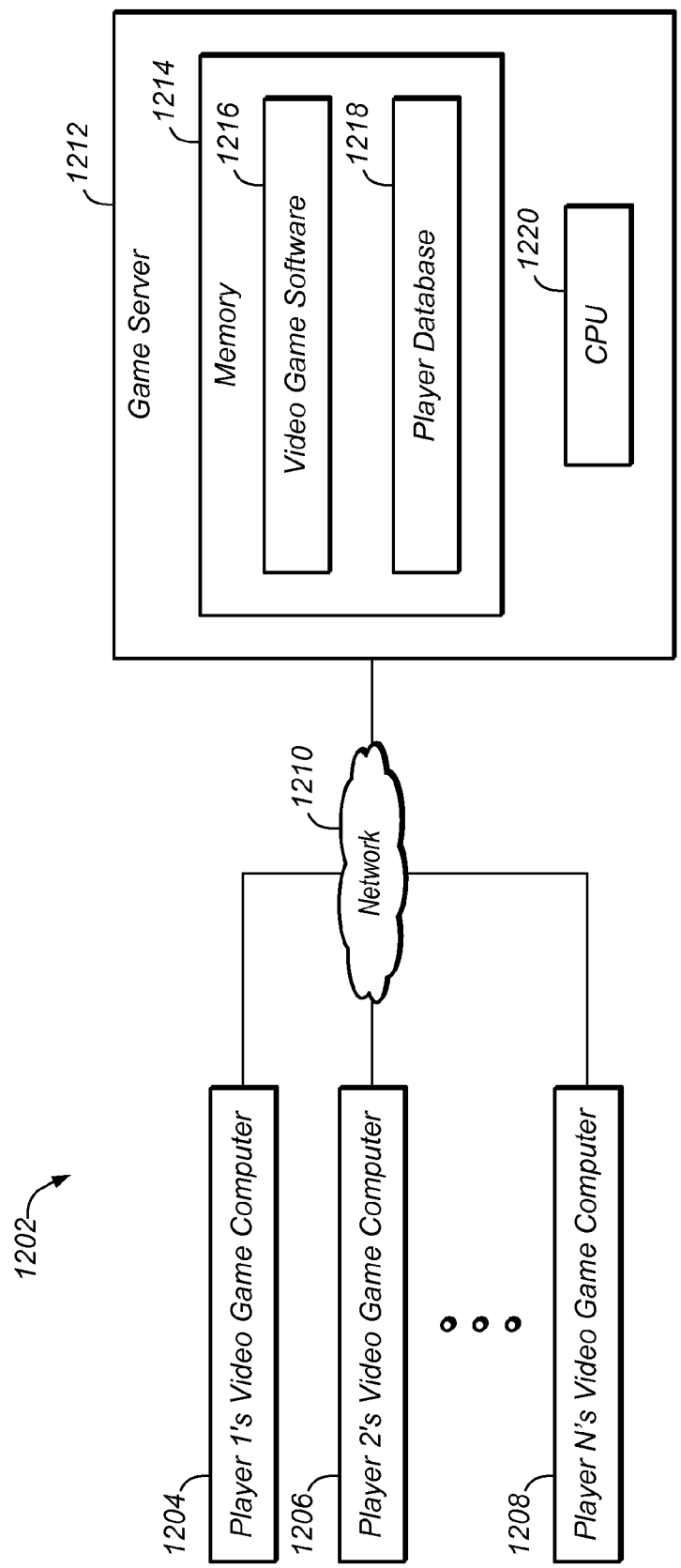
FIG. 12 is a block diagram depicting a system in an embodiment of the invention wherein video game computers are connected to a game server through a network.

FIG. 12 is a block diagram depicting a system in an embodiment of the invention. In network environment 1202 video game computers 1204, 1206, and 1208 connect to game server 1212 through network 1210. Network 1210 may be the Internet. Each of the video game computers 1204, 1206, and 1208 are used by video game players (e.g., "Player 1" in the case of video game computer 1204, "Player 2" in the case of video game computer 1206, and "Player N" in the case of video game computer 1208). It should be appreciated that FIG. 12 illustrates N video game computers connected to network 1210. Embodiments of the invention may exist where N is an integer greater than zero. Video game computers 1204, 1206, and 1208 and game server 1212 may communicate bi-directionally through network 1210. Game server 1212 contains memory 1214 and CPU 1220. Game server 1212 may comprise one or more separate servers, located in one or more physical locations. Memory 1214 stores video game software 1216 and player database 1218. Video game software 1216 maintains the virtual game environment of a video game. Game server 1212, particularly through the operation of video game software 1216, contains the software necessary to provide a merchant outlet within the video game, as well as the functionality to process orders for goods and/or services ordered by players from within the video game, therein.

For example, video game software 1216 may provide an in-game representation of a merchant outlet, such that a player's character may interact with the merchant outlet (e.g., access the store front, go into the store, etc.) consistent with game-play mechanics. Video game software 1216 may further receive player inputs indicating that the player's character is interacting with the merchant outlet. Such interactions may include, for example, inputs indicating that the player's character wishes to enter/exit the merchant outlet, the player's character wishes to browse the goods and/or services for sale at the merchant outlet, or that the player wishes to purchase goods and/or services from the merchant outlet. The goods and/or services available through the merchant outlet may be provided through the use of an electronic merchant catalog held in memory on game server 1212 or some other source, where such electronic merchant catalog contains information about the goods and/or services offered for sale in the merchant outlet (e.g., descriptions of the products/services, pictures, prices, quantity available, etc.).

Once the player, through the operation of the video game (e.g., through the operations of the player's character), indicates that the player wishes to purchase goods and/or services from the merchant outlet the video game software 1216 processes these inputs and can take the necessary steps to complete the transaction (e.g., through the use of a payment gateway). This includes determining billing information for the transaction and determining delivery information for the goods and/or services purchased. Player database 1218 contains information pertaining to the players who have registered and/or who are currently playing the video game related to video game software 1216. Embodiments of the invention may exist where a single game server 1212 contains multiple instances of memory 1214, multiple instances of video game software 1216, multiple player databases 1218, and/or multiple CPUs 1220. CPU (central processing unit) 1220 accesses memory 1214 and executes instructions from video game software 1216 to maintain operation of the video game's virtual game environment and process inputs received from video game computers 1204, 1206, and 1208.

Figure 13:
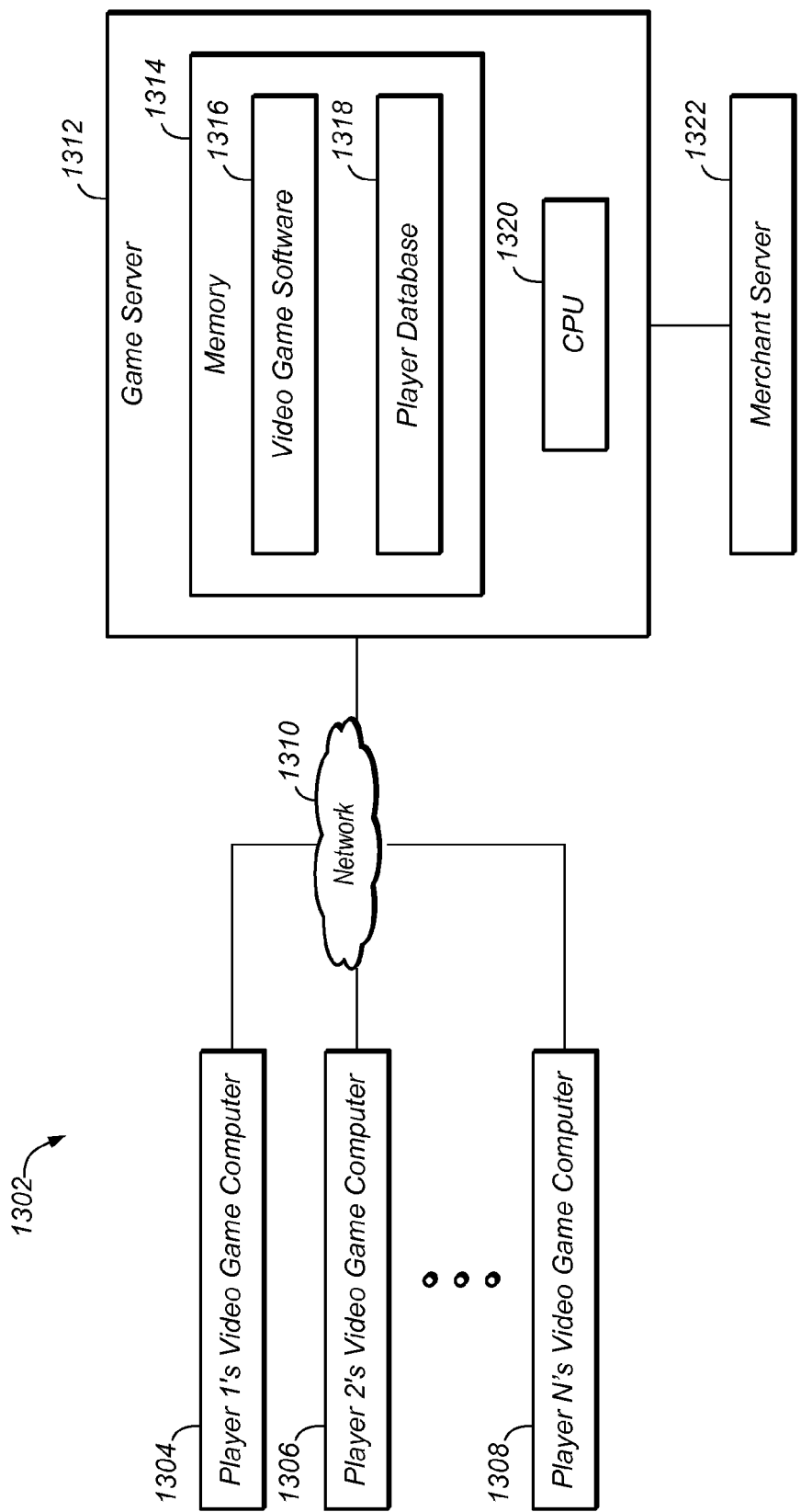
FIG. 13 is a block diagram depicting a system in an embodiment of the invention wherein video game computers are connected to a game server through a network and wherein a game server is connected to a merchant server.

FIG. 13 is a block diagram depicting a system in an embodiment of the invention. In network environment 1302 video game computers 1304, 1306, and 1308 connect to game server 1312 through network 1310. Network 1310 may be the Internet. Game server 1312 connects to merchant server 1322. This connection may be accomplished through a connection through a network (e.g., the internet). Each of the video game computers 1304, 1306, and 1308 are used by video game players (e.g., "Player 1" in the case of video game computer 1304, "Player 2" in the case of video game computer 1306, and "Player N" in the case of video game computer 1308). It should be appreciated that FIG. 13 illustrates N video game computers connected to network 1310. Embodiments of the invention may exist where N is an integer greater than zero. Video game computers 1304, 1306, and 1308 and game server 1312 may communicate bi-directionally through network 1310. Game server 1312 and merchant server 1322 may communicate bi-directionally. Game server 1312 contains memory 1314 and CPU 1320. Game server 1312 may comprise one or more separate servers, located in one or more physical locations. Memory 1314 stores video game software 1316 and player database 1318. Video game software 1316 maintains the virtual game environment of a video game. Game server 1312, particularly through the operation of video game software 1316, together with merchant server 1322 contain the software necessary to provide a merchant outlet within the video game, as well as the functionality to process orders for goods and/or services ordered by players in the video game, therein. For example, video game software 1316 may provide an in-game representation of a merchant outlet, such that a player's character may interact with the outlet (e.g., access the store front, go into the store, etc.) consistent with game-play mechanics.

Video game software 1316 may further receive player inputs indicating that the player's character is interacting with the merchant outlet. Such interactions may include, for example, inputs indicating that the player's character wishes to enter/exit the merchant outlet, the player's character wishes to browse the goods and/or services for sale at the merchant outlet, or that the player wishes to purchase goods and/or services from the merchant outlet. The selection of goods and/or services in the merchant outlet may be provided, for example, according to inventory information held on merchant server 1322. This inventory may be provided through the use of an electronic merchant catalog held in memory on merchant server 1322 where such electronic merchant catalog contains information about the goods and/or services offered for sale in the merchant outlet (e.g., descriptions of the products/services, pictures, prices, quantity available, etc.). Once the player, through the operation of the video game (e.g., through the operations of the player's character), indicates that the player wishes to purchase goods and/or services from the merchant outlet, the video game software 1316 processes these inputs and can take the necessary steps to complete the transaction (e.g., through the use of a payment gateway).

This may include receiving inputs from players for determining billing information for the transaction and for determining delivery information for the goods and/or services purchased, and sending such billing information and delivery information to merchant server 1322. The operation of each of the game server 1312 and merchant server 1322 in achieving this undertaking need not be limited to the aforementioned examples, as game server 1312 and merchant server 1322 may operate together in a variety of ways to provide a merchant outlet to a player within the video game, as well as provide the functionality to process orders for goods and/or services ordered by players from within the video game from the merchant outlet. Player database 1318 contains information pertaining to the players who have registered and/or who are currently playing the video game related to video game software 1316. CPU (central processing unit) 1320 accesses memory 1314 and executes instructions from video game software 1316 to maintain operation of the video game's virtual environment and process inputs received from video game computers 1304, 1306, and 1308. Embodiments of the invention may exist where a single game server 1312 contains multiple instances of memory 914, multiple instances of video game software 1316, multiple player databases 1318, and/or multiple CPUs 1320. Merchant server 1322 may contain memory and a CPU of its own.

Figure 14:
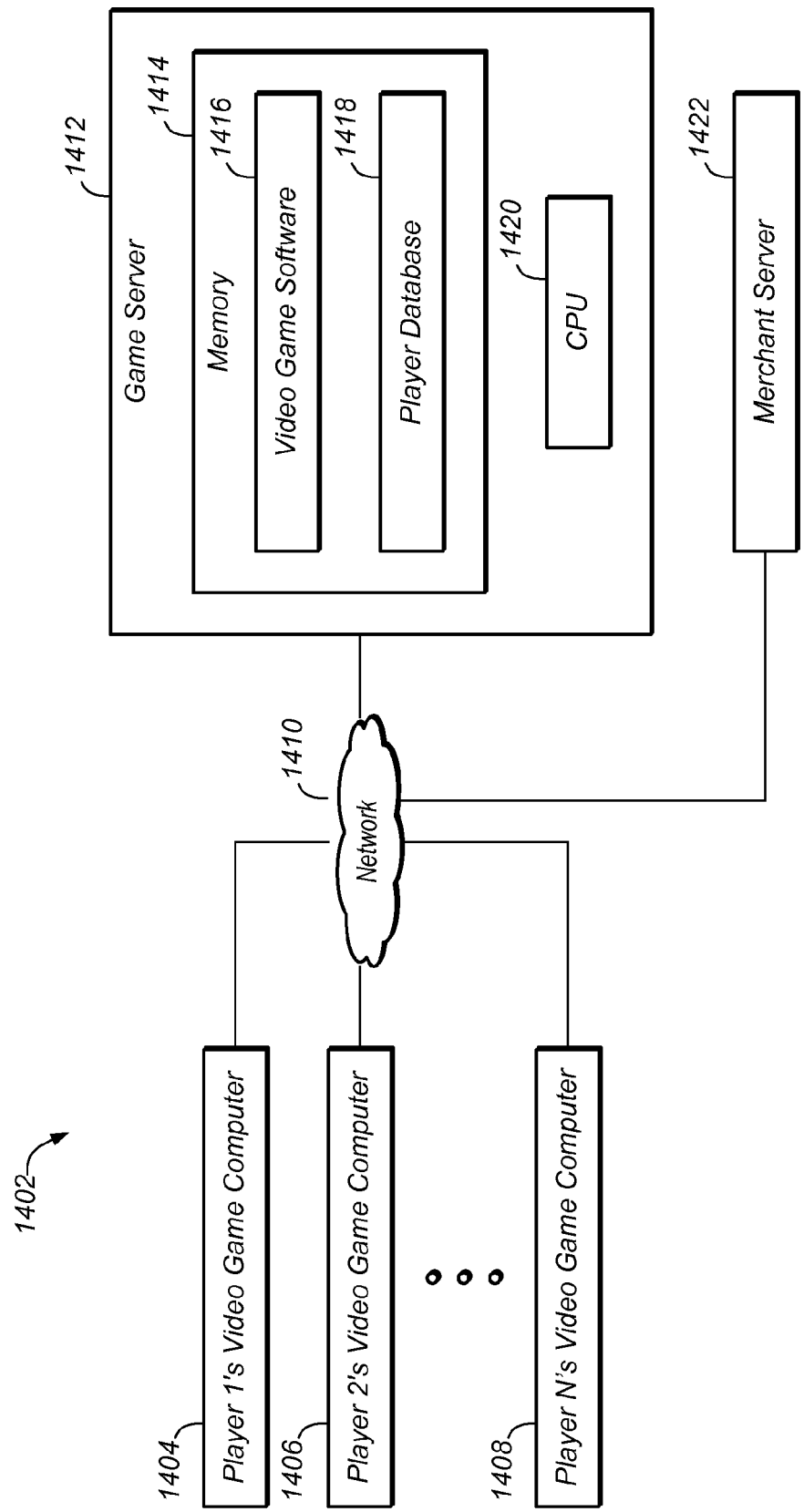
FIG. 14 is a block diagram depicting a system in an embodiment of the invention wherein video game computers, a merchant server, and a game server are connected to each other through a network.

FIG. 14 is a block diagram depicting a system in an embodiment of the invention. In network environment 1402 video game computers 1404, 1406, and 1408, merchant server 1422, and game server 1412 are connected and may communicate bi-directionally with one another through network 1410. Network 1410 may be the Internet. Each of the video game computers 1404, 1006, and 1408 are used by video game players (e.g., "Player 1" in the case of video game computer 1404, "Player 2" in the case of video game computer 1406, and "Player N" in the case of video game computer 1408). It should be appreciated that FIG. 14 illustrates N video game computers connected to network 1410. Embodiments of the invention may exist where N is an integer greater than zero. Game server 1412 contains memory 1414 and CPU 1420. Game server 1412 may comprise one or more separate servers, located in one or more physical locations. Memory

1414 stores video game software 1416 and player database 1418. Video game software 1416 maintains the virtual game environment of a video game.

Game server 1412, particularly through the operation of video game software 1416, together with merchant server 1422 contain the software necessary to provide a merchant outlet within the video game, as well as the functionality to process orders for goods and/or services ordered by players in the video game, therein. For example, video game software 1416 may provide an in-game representation of a merchant outlet, such that a player's character may interact with the merchant outlet (e.g., access the store front, go into the store, etc.) consistent with game-play mechanics. Video game software 1416 may further receive player inputs indicating that the player's character is interacting with the merchant outlet. Such interactions may include, for example, inputs indicating that the player's character wishes to enter/exit the merchant outlet, the player's character wishes to browse the goods and/or services for sale through the merchant outlet, or that the player wishes to purchase goods and/or services from the merchant outlet. The selection of goods and/or services in the merchant outlet may be provided, for example, according to inventory information held on merchant server 1422. This inventory may be provided through the use of an electronic merchant catalog held in memory on merchant server 1422, where such electronic merchant catalog contains information about the goods and/or services offered for sale through the merchant outlet (e.g., descriptions of the products/services, pictures, prices, quantity available, etc.).

Once the player, through the operation of the video game (e.g., through the operations of the player's character), indicates that the player wishes to purchase goods and/or services from the merchant outlet, the video game software 1416 processes these inputs and can take the necessary steps to complete the transaction (e.g., through the use of a payment gateway). Merchant server 1422 may receive inputs from players for determining billing information for the transaction and for determining delivery information for the goods and/or services purchased. The operation of each of the game server 1412 and merchant server 1422 in achieving this undertaking need not be limited to the aforementioned examples, as game server 1412 and merchant server 1422 may operate together in a variety of ways to provide a merchant outlet to a player within the video game, as well as provide the functionality to process orders for goods and/or services ordered by players from within the video game from the merchant outlet. Player database 1418 contains information pertaining to the players who have registered and/or who are currently playing the video game related to video game software 1416. CPU (central processing unit) 1420 accesses memory 1414 and executes instructions from video game software 1416 to maintain operation of the video game's virtual environment and process inputs received from video game computers 1404, 1406, and 1408. Embodiments of the invention may exist where a single game server 1412 contains multiple instances of memory 1414, multiple instances of video game software 1416, multiple player databases 1418, and multiple CPUs 1420. Merchant server 1422 may contain memory and a CPU of its own.

Figure 15:
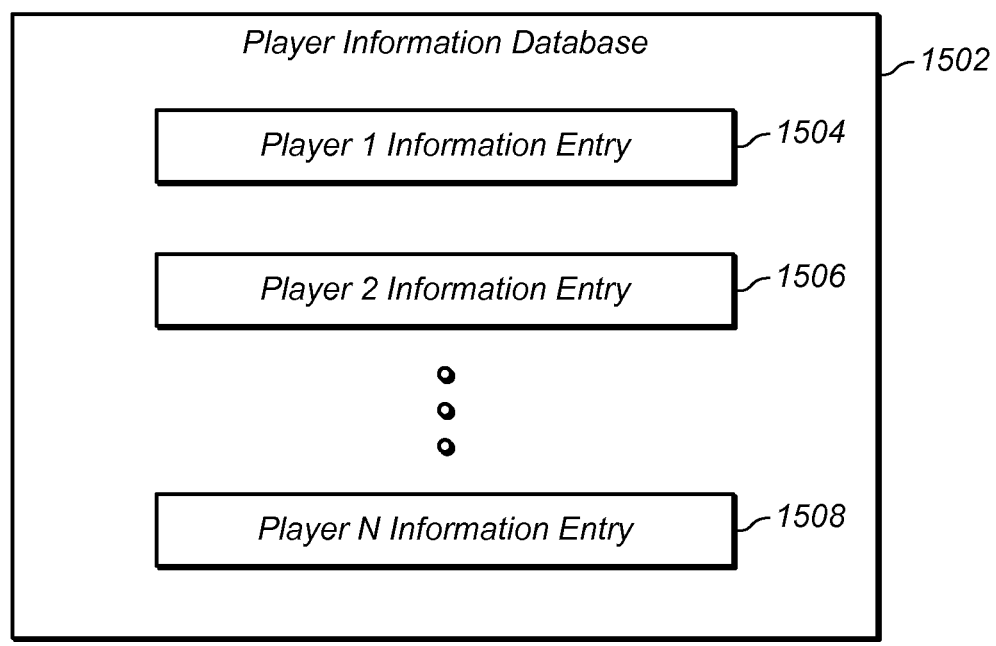
FIG. 15 is a block diagram depicting a system for use in an embodiment of the invention, wherein information specific to video game players is stored in a player information database.

FIG. 15 is a block diagram depicting a system for use in an embodiment of the invention. Player information database 1502 may contain multiple player information entries 1504, 1506, and 1508. Each of the player information entries 1504, 1506, and 1508 contain information about video game players (e.g., "Player 1" in the case of Player 1 information entry 1504, "Player 2" in the case of Player 2 information entry 1506, and "Player N" in the case of Player N information entry 1508). As such, player information entry 1100 as depicted and discussed in connection with FIG. 11 is suitable for use as player information entries 1504, 1506, and 1508. It should be appreciated that FIG. 15 illustrates N player information entries within player information database 1502. Embodiments of the invention may exist where N is an integer greater than zero.

Figure 16:
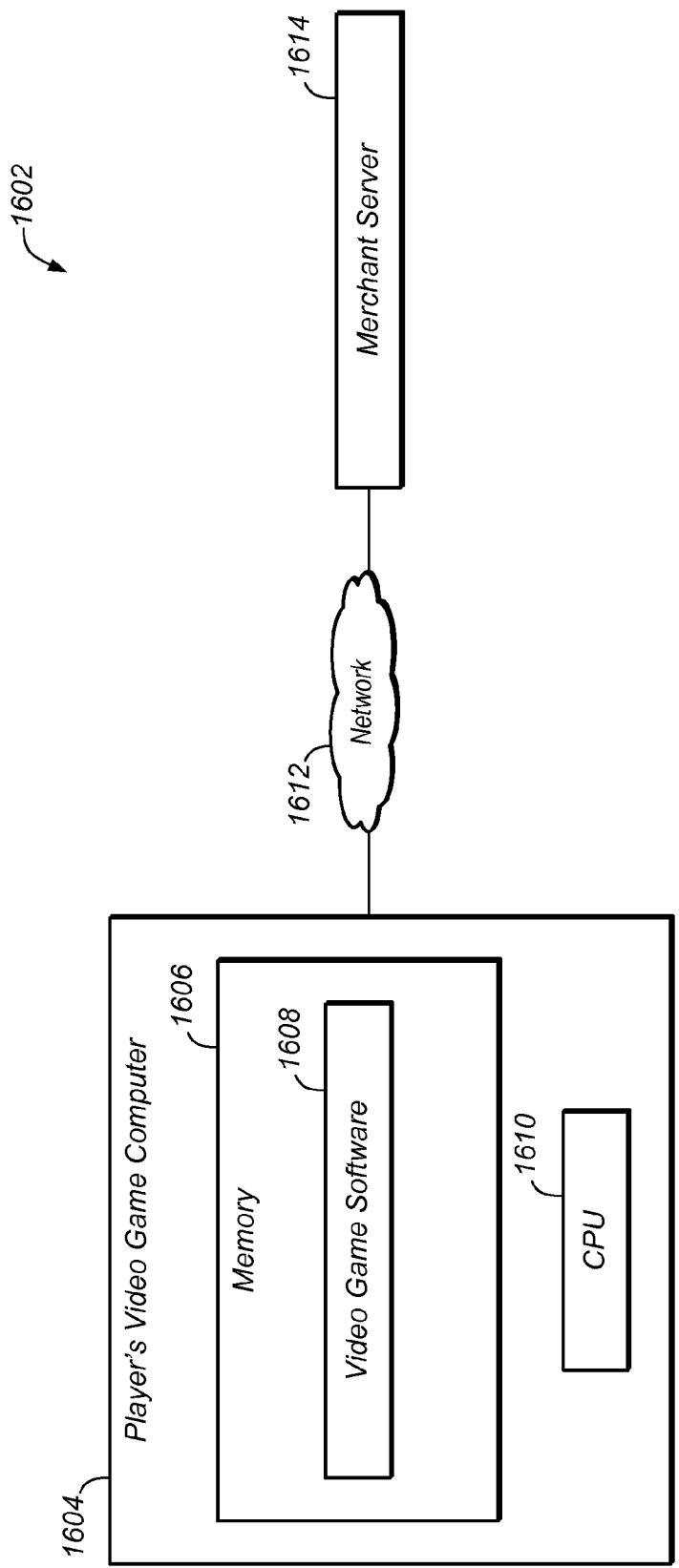
FIG. 16 is a block diagram depicting a system in an embodiment of the invention wherein a player's video game computer is connected to a merchant server through a network.

FIG. 16 is a block diagram depicting a system in an embodiment of the invention. In network environment 1602 a player's video game computer 1604 connects to merchant server 1614 through network 1612. Network 1612 may be the Internet. It should be appreciated that FIG. 16 illustrates one player's video game computer connected to network 1612, but embodiments of the invention may exist where more than one player's video game computer may be connected to network 1612 and that more than one player's video game computer may connect to merchant server 1614 through network 1612. Video game computer 1604 and merchant server 1614 may communicate bi-directionally through network 1612. Player's video game computer 1604 contains memory 1606 and CPU 1610. Memory 1606 stores video game software 1608.

Video game software 1608 maintains the virtual game environment of a video game. Player's video game computer 1604, particularly through the operation of video game software 1608, together with merchant server 1614 contain the software necessary to provide a merchant outlet within the video game, as well as the functionality to process orders for goods and/or services ordered by a player in the video game. For example, video game software 1608 may provide an in-game representation of a merchant outlet, such that a player's character may interact with the merchant outlet (e.g., access the store front, go into the store, etc.) consistent with game-play mechanics. Video game software 1608 may further receive player inputs indicating that the player's character is interacting with the merchant outlet. Such interactions may include, for example, inputs indicating that the player's character wishes to enter/exit the merchant outlet, the player's character wishes to browse the goods and/or services for sale at the merchant outlet, or that the player wishes to purchase goods and/or services from the merchant outlet. The selection of goods and/or services in the merchant outlet may be provided, for example, according to inventory information held on merchant server 1614.

This inventory may be provided through the use of an electronic merchant catalog held in memory on merchant server 1614 where such electronic merchant catalog contains information about the goods and/or services offered for sale in the merchant outlet (e.g., descriptions of the products/services, pictures, prices, quantity available, etc.). Once the player, through the operation of the video game (e.g., through the operations of the player's character), indicates that the player wishes to purchase goods and/or services from the merchant outlet, the video game software 1608 processes these inputs and can take the necessary steps to complete the transaction (e.g., through the use of a payment gateway). This may include receiving inputs from players for determining billing information for the transaction and for determining delivery information for the goods and/or services purchased, and sending such billing information and delivery information to merchant server 1614. The operation of each of the player's video game computer 1604 and merchant server 1614 in achieving this undertaking need not be limited to the aforementioned examples, as player's video game computer 1604 and merchant server 1614 may operate together in a variety of ways to provide a merchant outlet to a player within the video game, as well as provide the functionality to process orders for goods and/or services ordered by players from within the video game from the merchant outlet. The merchant outlet within the video game may operate much in the same manner as an online store operates. CPU (central processing unit) 1610 accesses memory 1606 and executes instructions from video game software 1608 to maintain operation of the video game's virtual environment and process inputs received from a player to video game computer 1604. Merchant server 1614 may contain memory and a CPU of its own.

Figure 17:
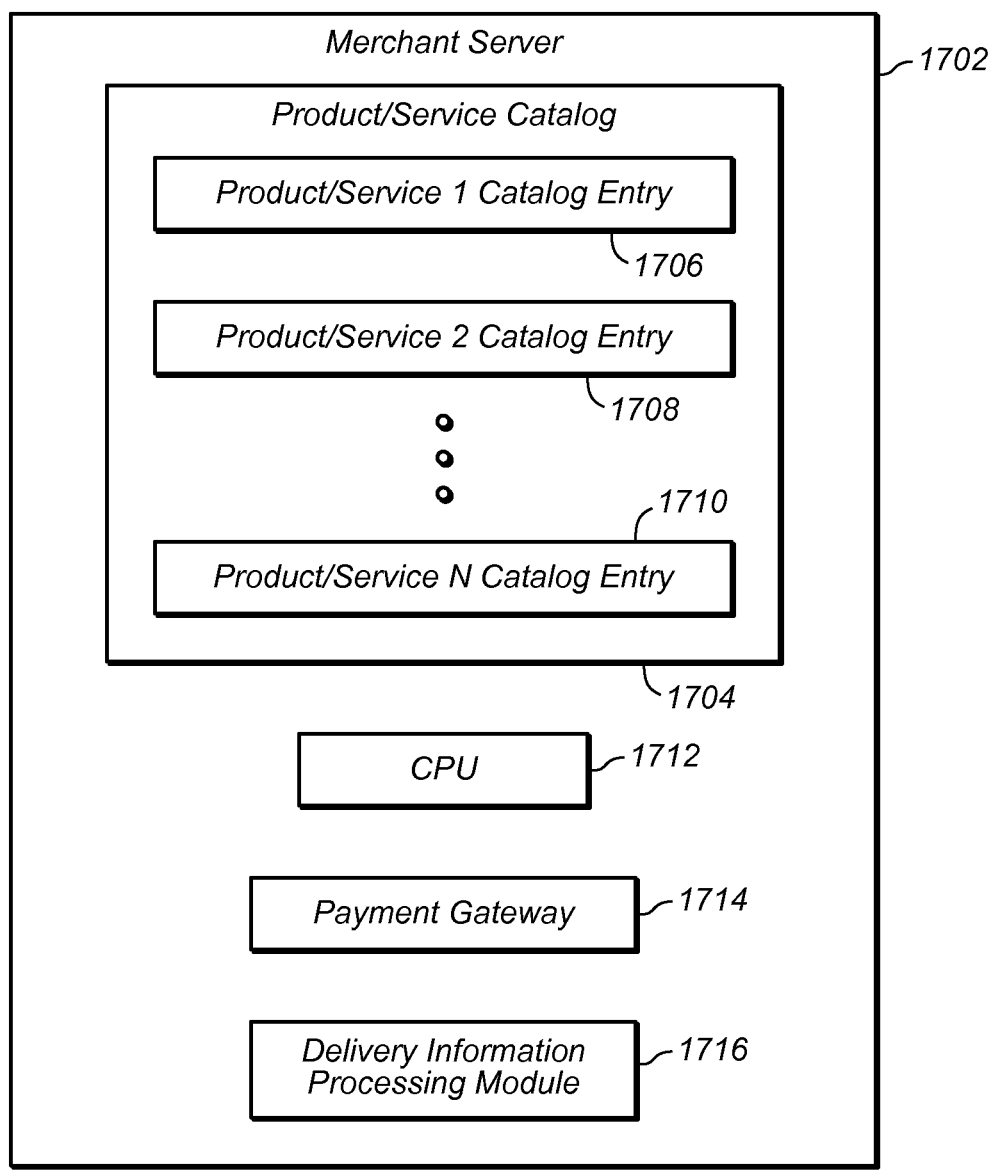
FIG. 17 is a block diagram depicting a system for use in an embodiment of the invention, wherein various elements are found in a merchant server.

FIG. 17 is a block diagram depicting a system for use in an embodiment of the invention, wherein various elements are found in a merchant server. Merchant server 1702 may include an electronic product/service catalog 1704, CPU 1712, payment gateway 1714, and delivery information processing module 1716. Product/service catalog 1704 may contain products and services provided for sale through a merchant outlet in a video game. Each of the product/service catalog entries 1706, 1708, and 1710 corresponds to products or services that may be made available through such a merchant outlet. It should be appreciated that FIG. 17 illustrates N product/service catalog entries in product/service catalog 1704. Embodiments of the invention may exist where N is a whole number. Merchant server 1702 may comprise one or more separate servers, located in one or more physical locations. Merchant server 1702 may exist in a form suitable for use, for example, as merchant server 1322 depicted and discussed in connection with FIG. 13, merchant server 1422 depicted and discussed in connection with FIG. 14, and/or merchant server 1614 depicted and discussed in connection with FIG. 16. One or more elements within merchant server 1702 may exist in computer memory. Merchant server 1702, particularly through the operation of product/service catalog 1704, payment gateway 1714, and delivery information processing module 1716 provide the functionality to process orders for goods and/or services ordered by players in the video game from a merchant outlet in the video game.

The selection of goods and/or services in the merchant outlet may be provided, for example, according to inventory information found in product/service catalog 1704. Payment gateway 1714 may receive inputs originating from players for determining billing information for the purchase of goods and/or services from a merchant outlet within a video game. The billing information processed by payment gateway 1714 may take many forms, including a name, billing address, credit card account information, bank account information, Pay Pal account information, bank account routing number information, electronic funds transfer information, or other information used in the processing of payments. The billing information received by payment gateway 1714 may also include information pertaining to virtual currency (e.g., credits, points, etc.) that exists in the video game. Payment gateway 1714 may exist in software. Delivery information processing module 1716 may receive inputs originating from players for determining delivery information for the goods and/or services purchased from a merchant outlet within a video game. The delivery information received by delivery information processing module 1716 may include a name, mailing address, physical address, P.O Box, longitude and latitude coordinates, location description (e.g., "second floor of the Ballston Mall"), closest street intersection, one or more photos/videos, satellite imagery, a map, written directions, IP address, username, or other information that can be used to determine the location where the goods and/or services purchased should be delivered. Delivery information processing module 1716 may exist in software. CPU (central processing unit) 1712 executes instructions to maintain the functions of merchant server 1702 and process inputs received. For example, where product/service catalog 1704, payment gateway 1714, and delivery information processing module 1716 exist in computer memory, CPU 1712 executes instructions to maintain the operation of merchant server 1702.

Figure 18:
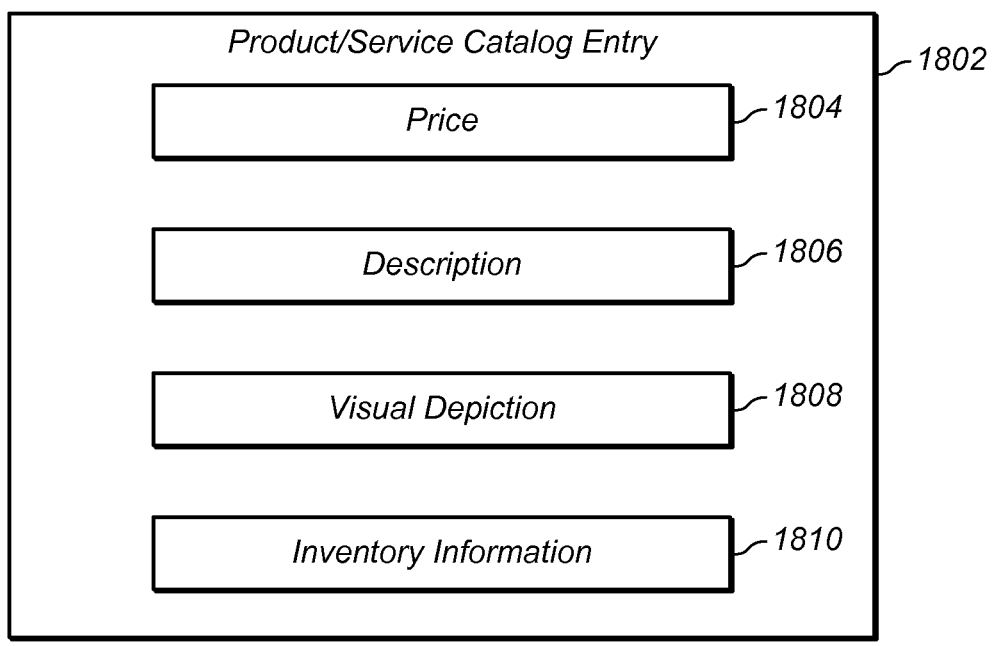
FIG. 18 is a block diagram depicting a system for use in an embodiment of the invention, wherein various elements are found in a product/service catalog entry.

FIG. 18 is a block diagram depicting a system for use in an embodiment of the invention, wherein various elements are found in a product/service catalog entry. Product/service catalog entry 1802 may include price 1804, description 1806, visual depiction 1808, and inventory information 1810. Product/service catalog entry 1802 may contain information related to a product or service offered for sale through a merchant outlet in a video game. For example, price 1804 may reflect the price of a product or service offered for sale through a merchant outlet in a video game. The price may be expressed in one or several real-life denominations (e.g., dollars, yen) as well as in one or more denominations that are particular to video games (e.g., game credits, points, etc.) or other electronic expressions. In some embodiments the price within price 1804 may be variable, depending on any number of inputs. In some embodiments the price within price 1804 may be a range of prices, rather than one single set price. Description 1806 may be a written, aural, visual, olfactory etc. description of a product or service offered for sale through a merchant outlet in a video game. Visual depiction 1808 may be one or more image of a product or service offered for sale through a merchant outlet in a video game. Visual depiction 1808 may include still images, interactive (e.g., rotatable, zoomable, etc.) images, videos, slideshows, 3-D projections, or otherwise. Inventory information 1810 may contain information on the quantity of a product or service offered for sale through a merchant outlet in a video game that is available. For example, inventory information 1810 may be implemented as a numerical value. In an embodiment of the invention product/service catalog 1802 may be updated. For example, when a purchase of one item is made, inventory information 1810 may be updated to reflect the fact that one less of the purchased product or service is available. Product/service catalog entry 1802 may exist in a form suitable for use, for example, as product/service catalog entries 1706, 1708, and/or 1710 depicted and discussed in connection with FIG. 17.

Figure 19:
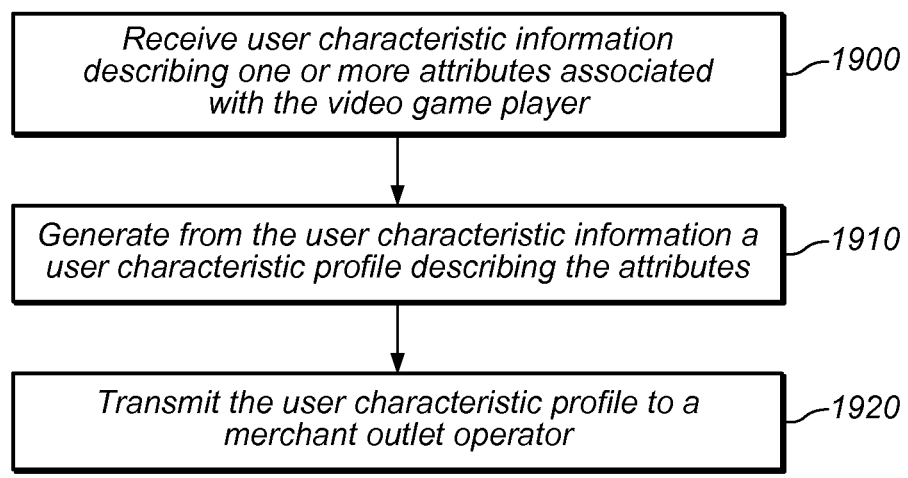
FIG. 19 is a flowchart of a method that may be used for implementing analytics functions in electronic commerce initiated through use of video games and fulfilled by delivery of physical goods according to some embodiments.

FIG. 19 is a flowchart of a method that may be used for implementing analytics functions in electronic commerce initiated through use of video games and fulfilled by delivery of physical goods according to some embodiments. User characteristic information describing one or more attributes associated with the video game player is received (block 1900). A user characteristic profile describing the attributes is generated from the user characteristic information (block 1910). The user characteristic profile is transmitted to a merchant outlet operator (block 1920).

Figure 20:
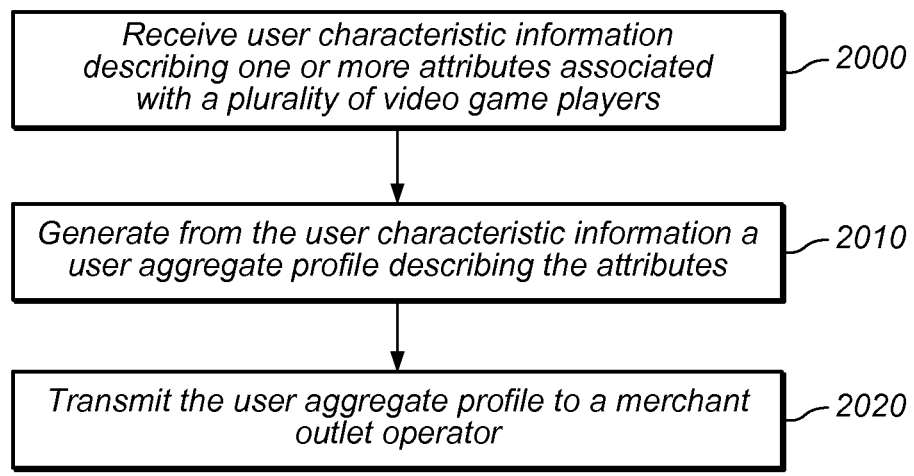
FIG. 20 is a flowchart of a method that may be used for implementing analytics functions in electronic commerce initiated through use of video games and fulfilled by delivery of physical goods according to some embodiments.

FIG. 20 is a flowchart of a method that may be used for implementing analytics functions in electronic commerce initiated through use of video games and fulfilled by delivery of physical goods according to some embodiments. User characteristic information describing one or more attributes associated with a plurality of video game players is received (block 2000). A user aggregate profile describing the attributes is generated from the user characteristic information (block 2010). The user aggregate profile is transmitted to a merchant outlet operator (block 2020).

Figure 21:
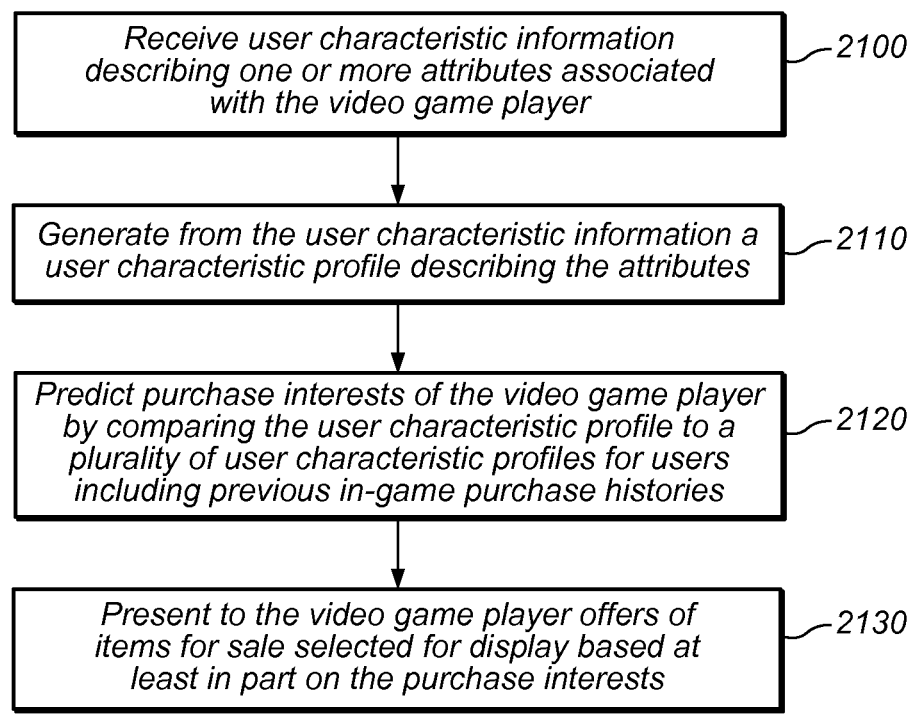
FIG. 21 is a flowchart of a method that may be used for implementing analytics functions in electronic commerce initiated through use of video games and fulfilled by delivery of physical goods according to some embodiments.

FIG. 21 is a flowchart of a method that may be used for implementing analytics functions in electronic commerce initiated through use of video games and fulfilled by delivery of physical goods according to some embodiments. User characteristic information describing one or more attributes associated with a plurality of video game players is received (block 2100). A user characteristic profile describing the attributes is generated from the user characteristic information (block 2110). Purchase interests of the video game player are predicted by comparing the user characteristic profile to a plurality of user characteristic profiles for users including previous in-game purchase histories (block 2120). Offers of items for sale selected for display based at least in part on the purchase interests are presented to the video game player (block 2130).

Figure 22:
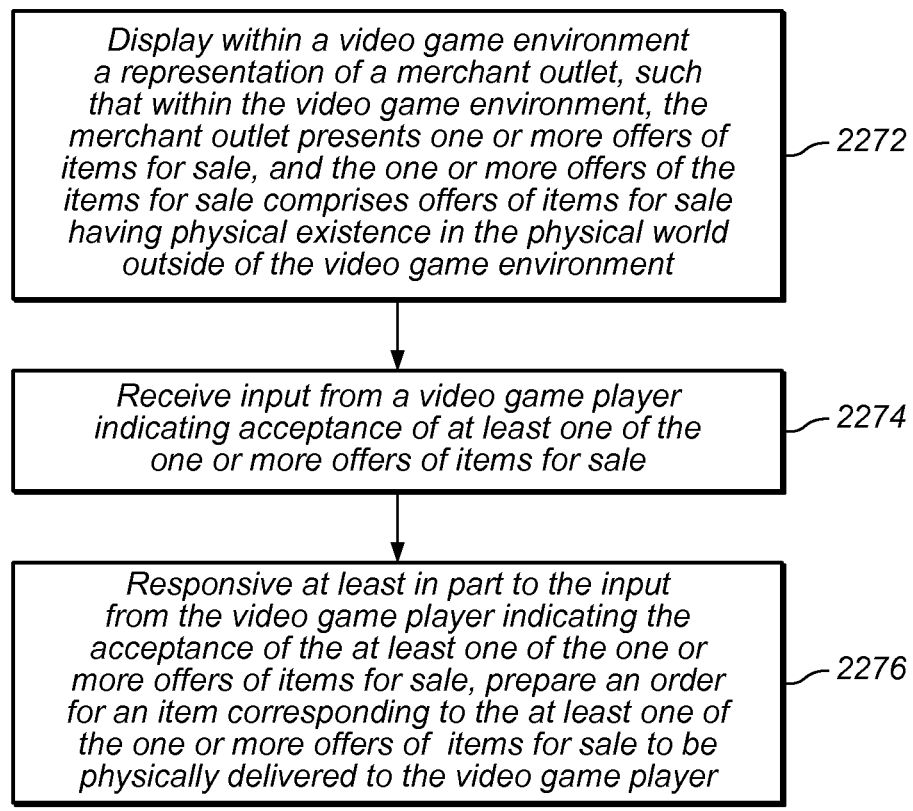
FIG. 22 is a flowchart of a method that may be used for implementing electronic commerce initiated through use of video games and fulfilled by delivery of physical goods according to some embodiments.

FIG. 22 is a flowchart of a method that may be used for implementing electronic commerce initiated through use of a video game and fulfilled by delivery of physical goods according to some embodiments. Within a video game environment a representation of a merchant outlet is displayed, such that within the video game environment, the merchant outlet presents one or more offers of items for sale, and the one or more offers of the items for sale comprises offers of items for sale having physical existence in the physical world outside of the video game environment (block 2272). Input from a video game player indicating acceptance of at least one of the one or more offers of items for sale is received (block 2274). Responsive at least in part to the input from the video game player indicating the acceptance of the at least one of the one or more offers of items for sale, an order for an item corresponding to the at least one of the one or more offers of items for sale to be physically delivered to the video game player is prepared (block 2276).

Figure 23:
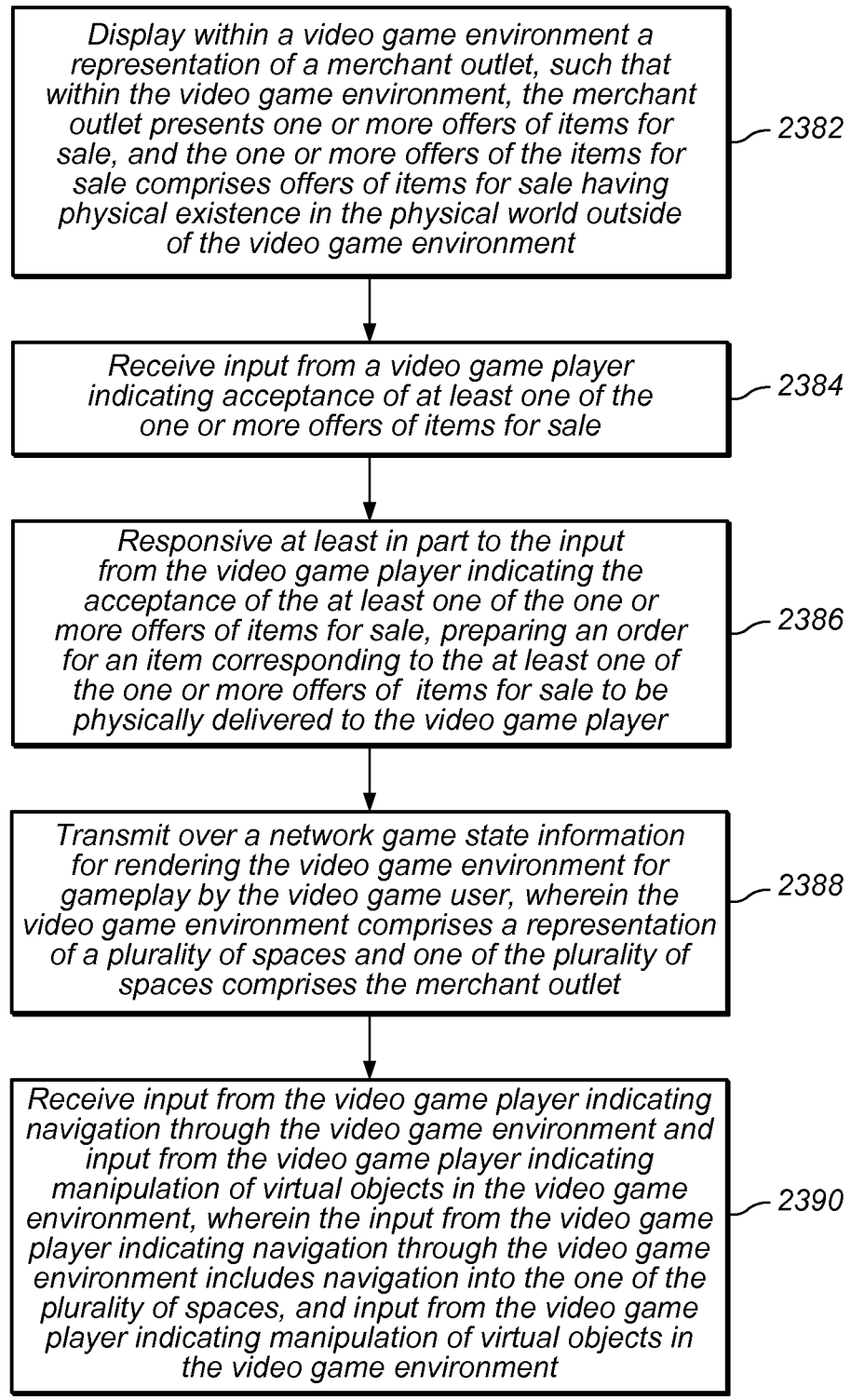
FIG. 23 is a flowchart of a method that may be used for implementing electronic commerce initiated through use of video games and fulfilled by delivery of physical goods according to some embodiments.

FIG. 23 is a flowchart of a method that may be used for implementing electronic commerce initiated through use of a video game and fulfilled by delivery of physical goods according to some embodiments. Within a video game environment a representation of a merchant outlet is displayed, such that within the video game environment, the merchant outlet presents one or more offers of items for sale, and the one or more offers of the items for sale comprises offers of items for sale having physical existence in the physical world outside of the video game environment (block 2382). Input from a video game player indicating acceptance of at least one of the one or more offers of items for sale is received (block 2384).

Responsive at least in part to the input from the video game player indicating the acceptance of the at least one of the one or more offers of items for sale, an order for an item corresponding to the at least one of the one or more offers of items for sale to be physically delivered to the video game player is prepared (block 2386). Game state information is transmitted over a network for rendering the video game environment for gameplay by the video game player, wherein the video game environment comprises a representation of a plurality of spaces and one of the plurality of spaces comprises the merchant outlet (block 2388). Input is received from the video game player indicating navigation through the video game environment and input from the video game player indicating manipulation of virtual objects in the video game environment, wherein the input from the video game player indicating navigation through the video game environment includes navigation into the one of the plurality of spaces, and input from the video game player indicating manipulation of virtual objects in the video game environment (block 2390).

Figure 24:
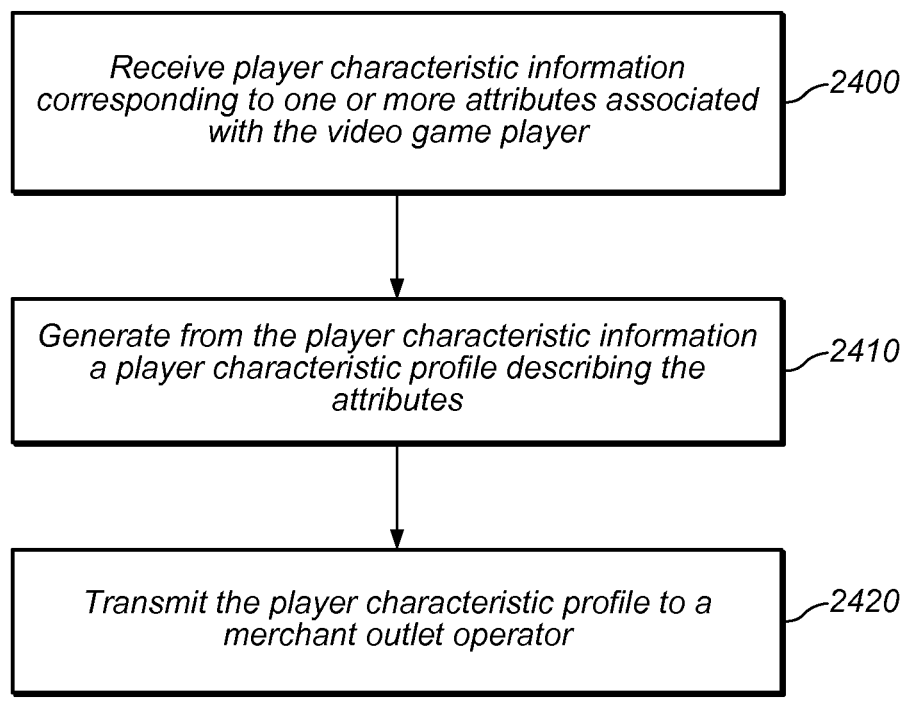
FIG. 24 is a flowchart of a method that may be used for implementing analytics functions in electronic commerce initiated through use of video games and fulfilled by delivery of physical goods according to some embodiments.

FIG. 24 is a flowchart of a method that may be used for implementing analytics functions in electronic commerce initiated through use of video games and fulfilled by delivery of physical goods according to some embodiments. Player characteristic information corresponding to one or more attributes associated with the video game player is received (block 2400). A player characteristic profile describing the attributes is generated from the player characteristic information (block 2410). The player characteristic profile is transmitted to a merchant outlet operator (block 2420).

Figure 25:
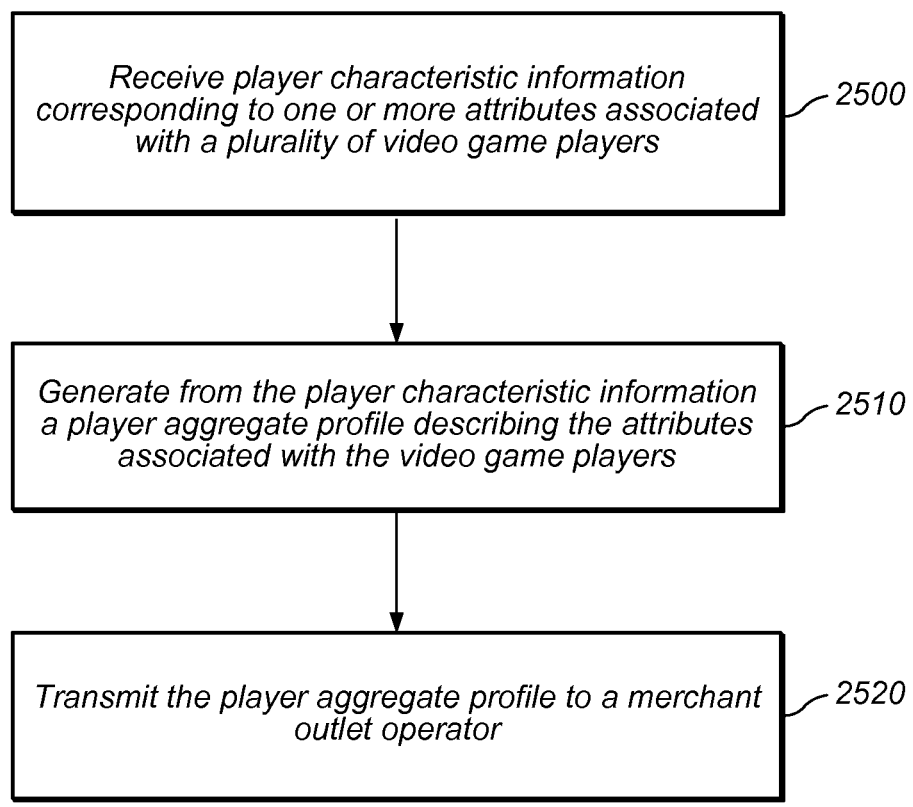
FIG. 25 is a flowchart of a method that may be used for implementing analytics functions in electronic commerce initiated through use of video games and fulfilled by delivery of physical goods according to some embodiments.

FIG. 25 is a flowchart of a method that may be used for implementing analytics functions in electronic commerce initiated through use of video games and fulfilled by delivery of physical goods according to some embodiments. Player characteristic information corresponding to one or more attributes associated with a plurality of video game players is received (block 2500). A player aggregate profile describing the attributes is generated from the player characteristic information (block 2510). The player aggregate profile is transmitted to a merchant outlet operator (block 2520).

Figure 26:
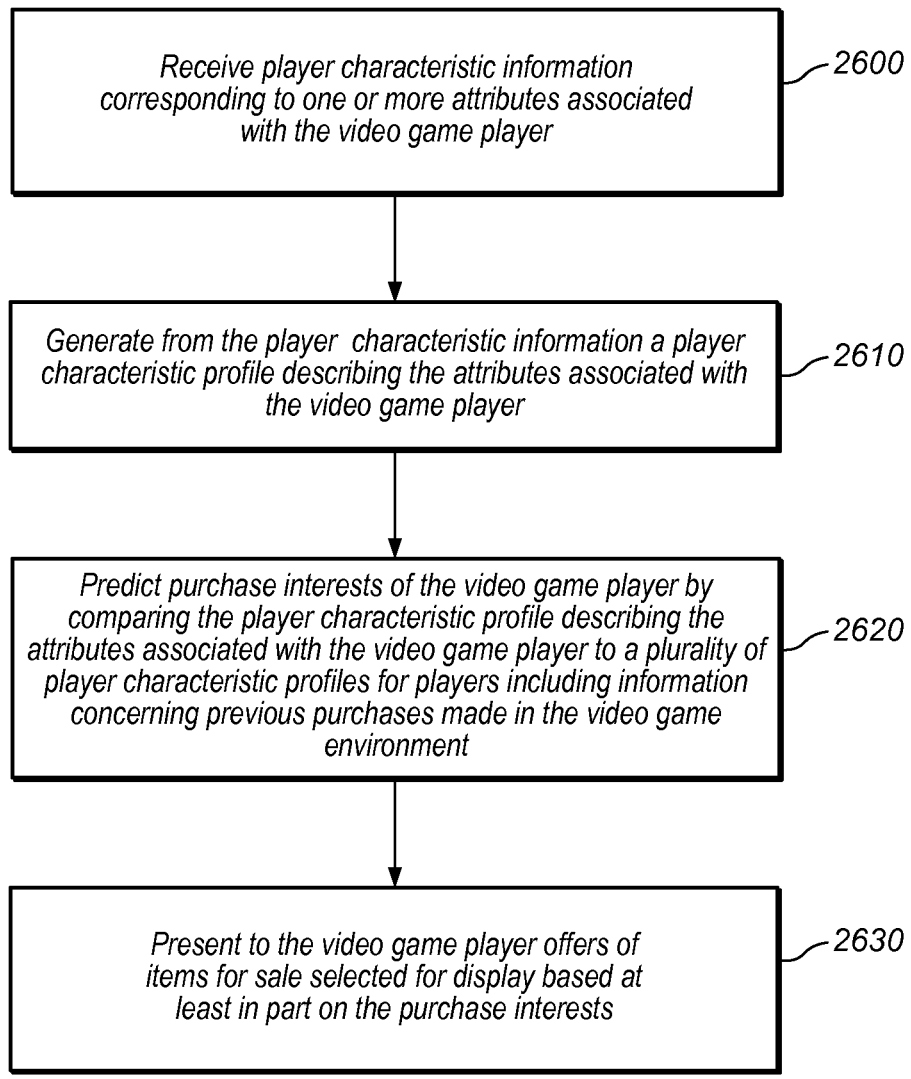
FIG. 26 is a flowchart of a method that may be used for implementing analytics functions in electronic commerce initiated through use of video games and fulfilled by delivery of physical goods according to some embodiments.

FIG. 26 is a flowchart of a method that may be used for implementing analytics functions in electronic commerce initiated through use of video games and fulfilled by delivery of physical goods according to some embodiments. Player characteristic information corresponding to one or more attributes associated with a plurality of video game players is received (block 2600). A player characteristic profile describing the attributes is generated from the player characteristic information (block 2610). Purchase interests of the video game player are predicted by comparing the player characteristic profile describing the attributes associated with the video game player to a plurality of player characteristic profiles for players including information concerning previous purchases made in the video game environment (block 2620). Offers of items for sale selected for display based at least in part on the purchase interests are presented to the video game player (block 2630).

Figure 27:
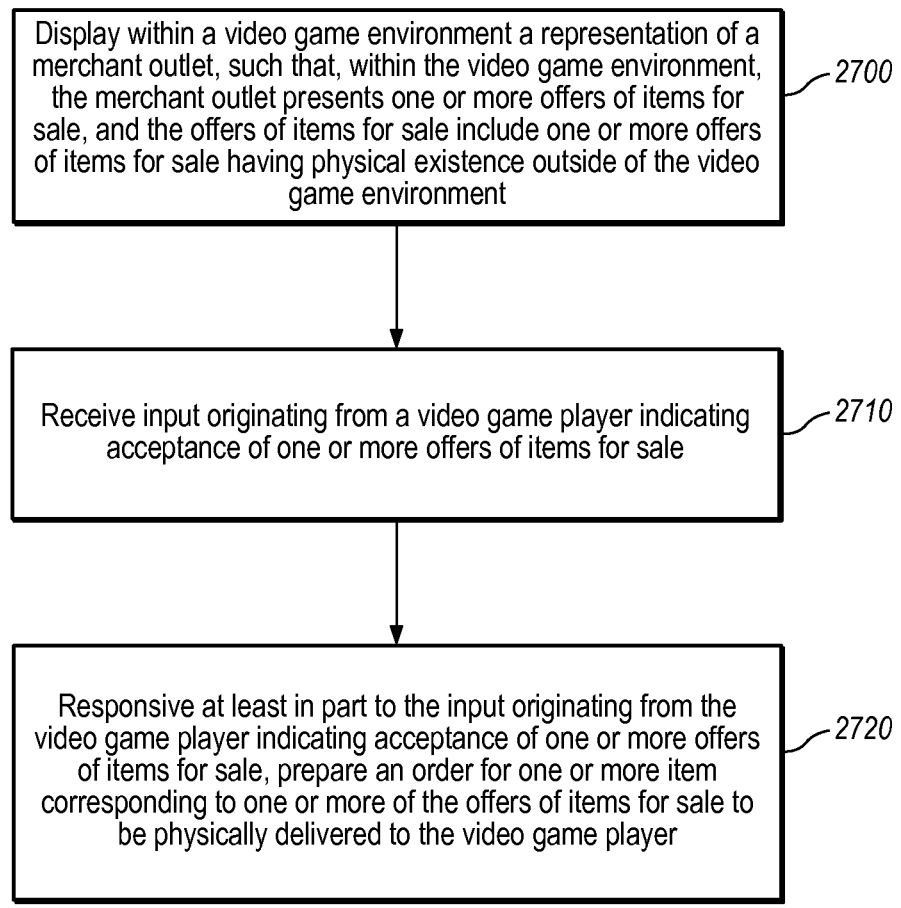
FIG. 27 is a flowchart of a method that may be used for implementing electronic commerce initiated through use of video games and fulfilled by delivery of physical goods according to some embodiments.

FIG. 27 is a flowchart of a method that may be used for implementing electronic commerce initiated through use of video games and fulfilled by delivery of physical goods according to some embodiments. Within a video game environment, a representation of a merchant outlet is displayed such that, within the video game environment, the merchant outlet presents one or more offers of items for sale, and the offers of items for sale include one or more offers of items for sale having physical existence outside of the video game environment (block 2700). Input originating from a video game player indicating acceptance of one or more offers of items for sale is received (block 2710). Responsive at least in part to the input originating from the video game player indicating acceptance of one or more offers of items for sale, an order is prepared for one or more item corresponding to one or more of the offers of items for sale to be physically delivered to the video game player (block 2720).

Figure 28:
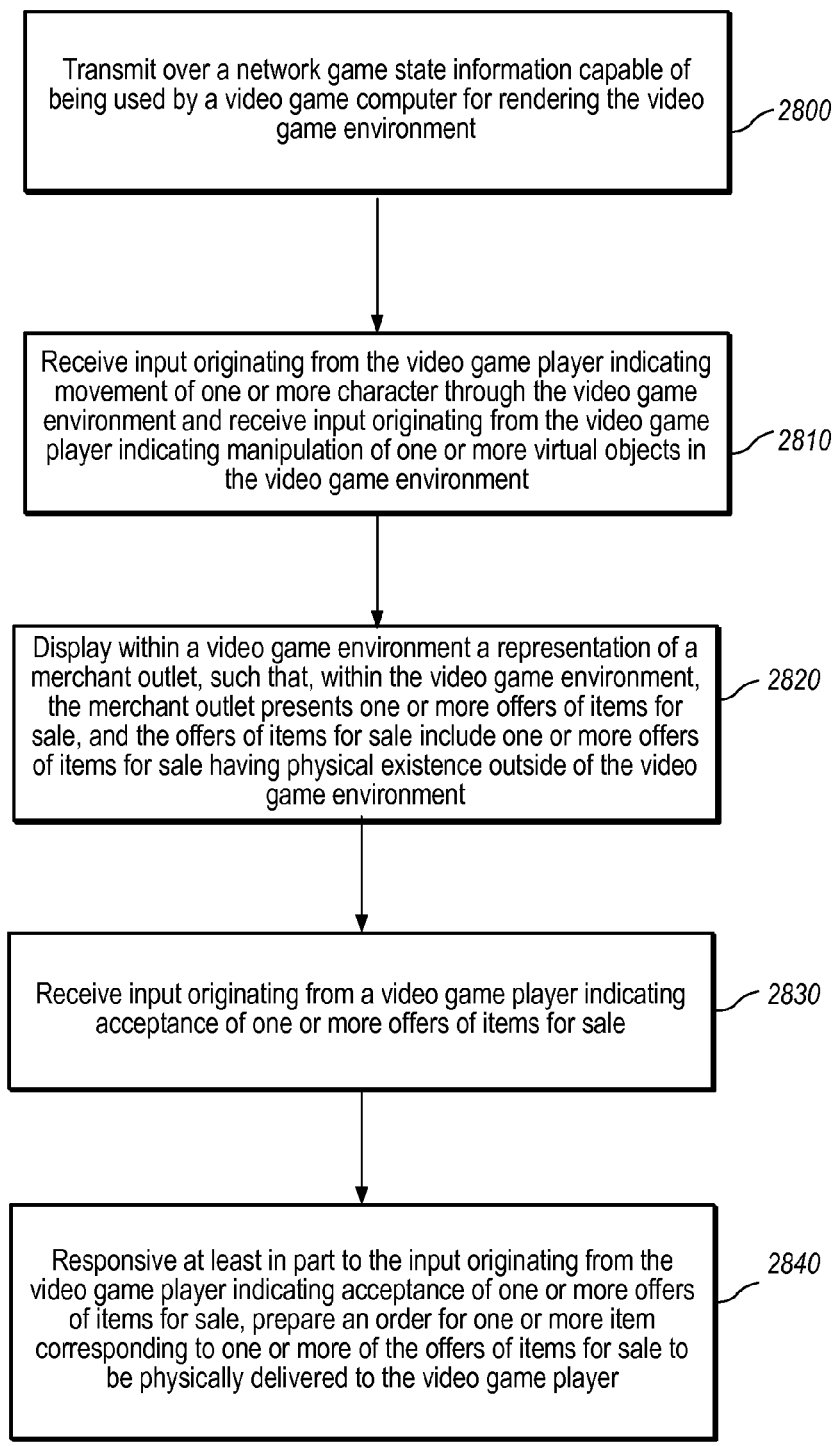
FIG. 28 is a flowchart of a method that may be used for implementing electronic commerce initiated through use of video games and fulfilled by delivery of physical goods according to some embodiments.

FIG. 28 is a flowchart of a method that may be used for implementing electronic commerce initiated through use of video games and fulfilled by delivery of physical goods according to some embodiments. Game state information capable of being used by a video game computer for rendering the video game environment is transmitted over a network (block 2800). Input originating from the video game player indicating movement of one or more character through the video game environment and input originating from the video game player indicating manipulation of one or more virtual objects in the video game environment are received (block 2810). Within a video game environment, a representation of a merchant outlet is displayed such that, within the video game environment, the merchant outlet presents one or more offers of items for sale, and the offers of items for sale include one or more offers of items for sale having physical existence outside of the video game environment (block 2820). Input originating from a video game player indicating acceptance of one or more offers of items for sale is received (block 2830). Responsive at least in part to the input originating from the video game player indicating acceptance of one or more offers of items for sale, an order is prepared for one or more item corresponding to one or more of the offers of items for sale to be physically delivered to the video game player (block 2840).

Figure 29:
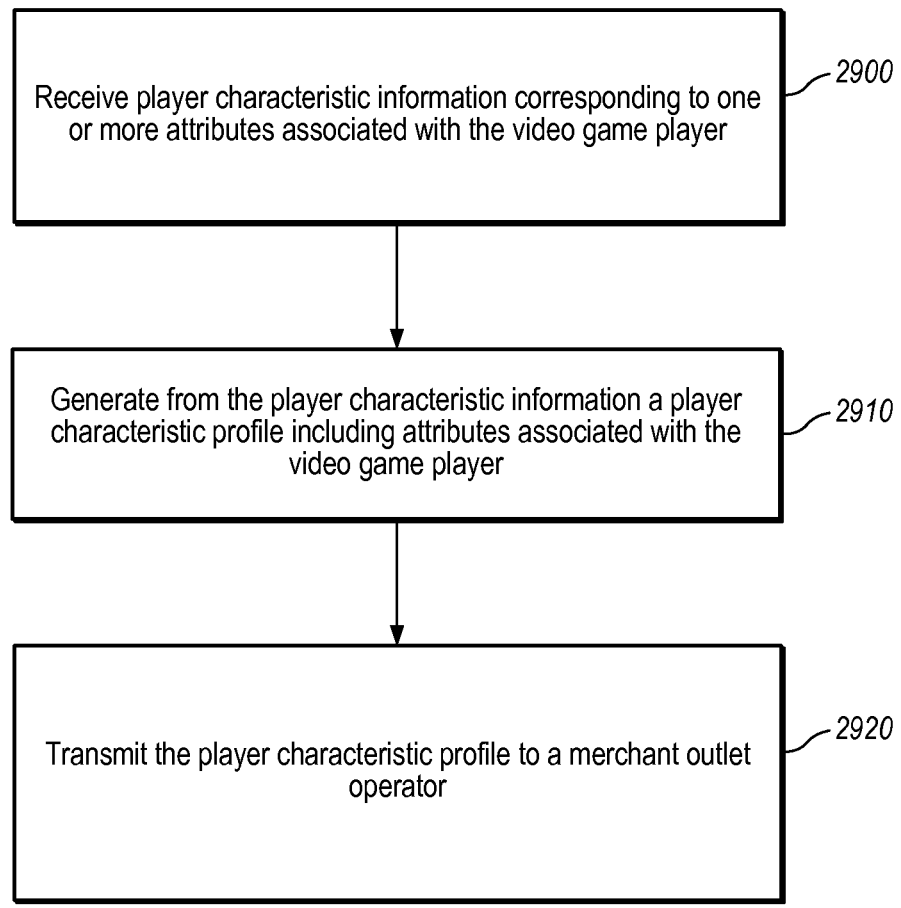
FIG. 29 is a flowchart of a method that may be used for implementing analytics functions in electronic commerce initiated through use of video games and fulfilled by delivery of physical goods according to some embodiments.

FIG. 29 is a flowchart of a method that may be used for implementing analytics functions in electronic commerce initiated through use of video games and fulfilled by delivery of physical goods according to some embodiments. Player characteristic information corresponding to one or more attributes associated with the video game player is received (block 2900). A player characteristic profile including attributes associated with the video game player is generated from the player characteristic information (block 2910). The player characteristic profile is transmitted to a merchant outlet operator (block 2920).

Figure 30:
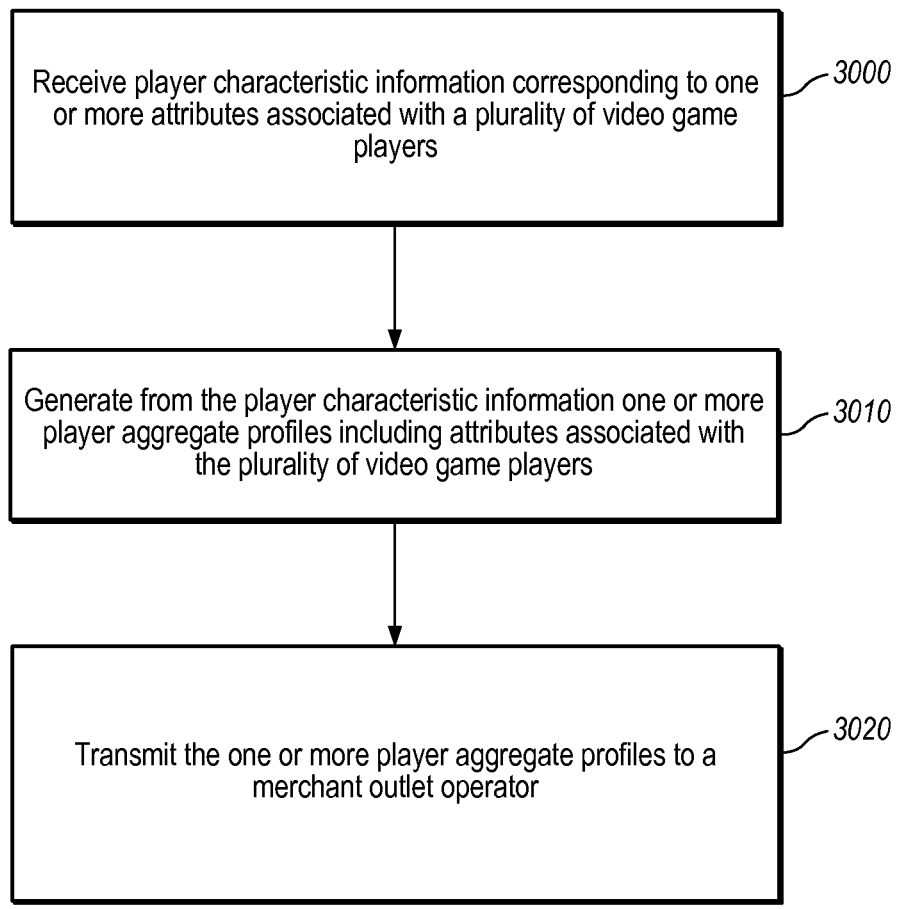
FIG. 30 is a flowchart of a method that may be used for implementing analytics functions in electronic commerce initiated through use of video games and fulfilled by delivery of physical goods according to some embodiments.

FIG. 30 is a flowchart of a method that may be used for implementing analytics functions in electronic commerce initiated through use of video games and fulfilled by delivery of physical goods according to some embodiments. Player characteristic information corresponding to one or more attributes associated with a plurality of video game players is received (block 3000). One or more player aggregate profiles including attributes associated with the plurality of video game players are generated from the player characteristic information (block 3010). The one or more player aggregate profiles are transmitted to a merchant outlet operator (block 3020).

Figure 31:
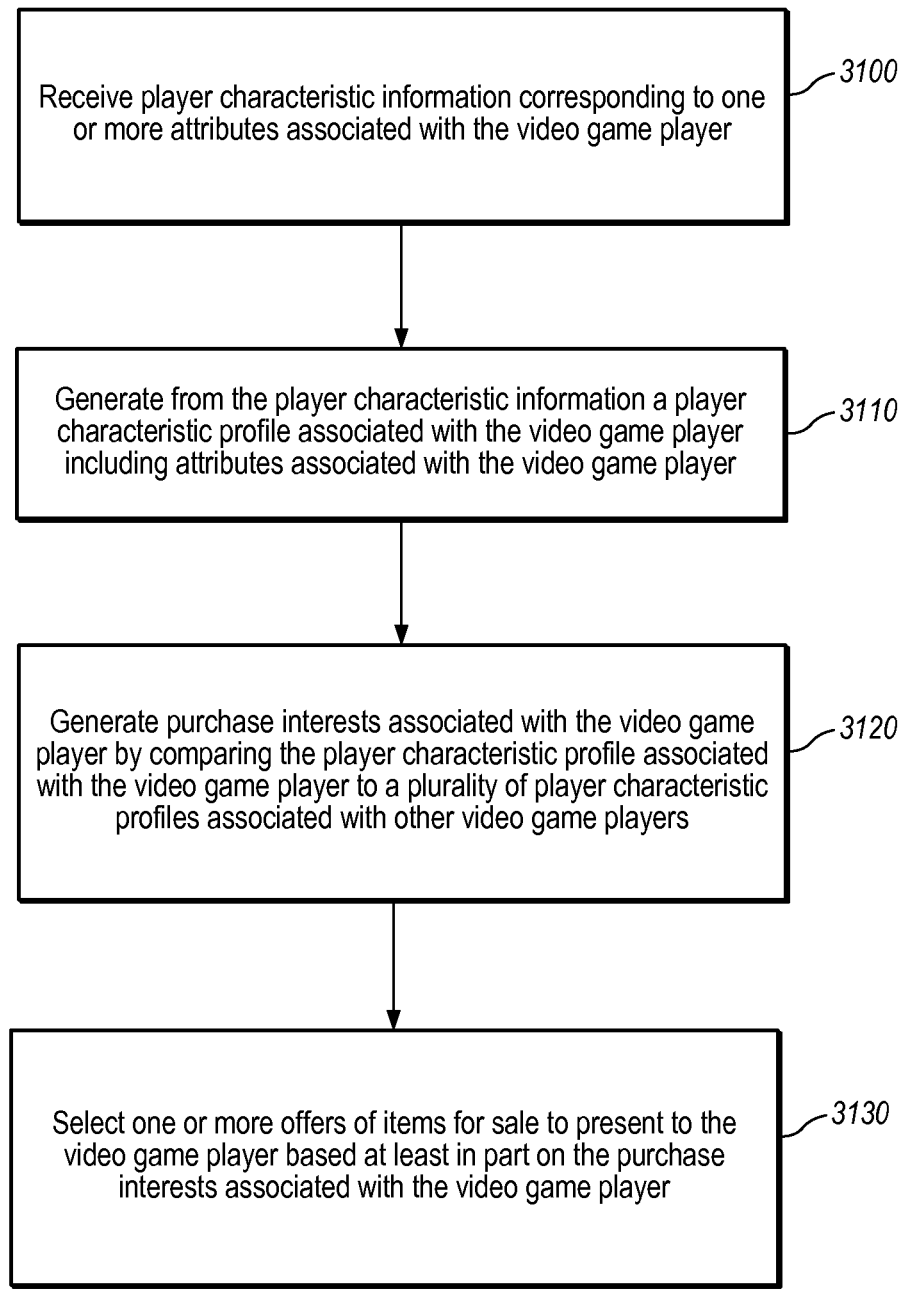
FIG. 31 is a flowchart of a method that may be used for implementing analytics functions in electronic commerce initiated through use of video games and fulfilled by delivery of physical goods according to some embodiments.

FIG. 31 is a flowchart of a method that may be used for implementing analytics functions in electronic commerce initiated through use of video games and fulfilled by delivery of physical goods according to some embodiments. Player characteristic information corresponding to one or more attributes associated with the video game player is received (block 3100). From the player characteristic information, a player characteristic profile associated with the video game player is generated, including attributes associated with the video game player (block 3110). Purchase interests associated with the video game player are generated by comparing the player characteristic profile associated with the video game player to a plurality of player characteristic profiles associated with other video game players (block 3120). One or more offers of items for sale to present to the video game player is selected based at least in part on the purchase interests associated with the video game player (block 3130).

Figure 32:
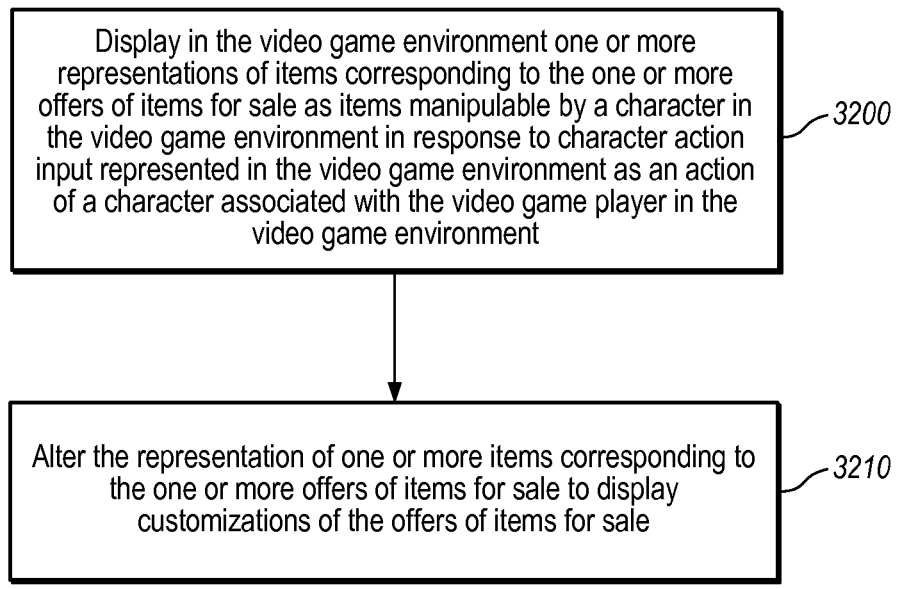
FIG. 32 is a flowchart of a method that may be used for implementing electronic commerce initiated through use of video games and fulfilled by delivery of physical goods according to some embodiments.

FIG. 32 is a flowchart of a method that may be used for implementing electronic commerce initiated through use of video games and fulfilled by delivery of physical goods according to some embodiments. Representations of items corresponding to the one or more offers of items for sale are displayed in the video game environment as items manipulable by a character in the video game environment in response to character action input represented in the video game environment as an action of a character associated with the video game player in the video game environment (block 3200). The representation of one or more items corresponding to the one or more offers of items for sale are altered to display customizations of the offers of items for sale (block 3210).

Further Example Implementations

Some embodiments include a system for displaying an in-game representation of a merchant outlet within a video game, wherein the representation of a merchant outlet is accessed by a player's character within the video game, and wherein the player may purchase goods and/or services from the merchant outlet through the actions of the player's character within the video game, and wherein the goods and/or services are for use in the real world.

Some embodiments include a system for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world.

Some embodiments include a system for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the purchase is paid for electronically using the billing information of one or more players that play the video game.

Some embodiments include a system for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the purchase is paid for electronically using the billing information of one or more players that play the video game, and wherein delivery information pertaining to the delivery destination of the goods and/or services is received from the player.

Some embodiments include a system for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the purchase is paid for electronically using the billing information of one or more players that play the video game, and wherein delivery information pertaining to the delivery destination of the goods and/or services is received from the player, and wherein confirmation is provided to the player to confirm the purchase in the form of confirmation within the video game.

Some embodiments include a system for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the purchase is paid for electronically using the billing information of one or more players that play the video game, and wherein delivery information pertaining to the delivery destination of the goods and/or services is received from the player, and wherein confirmation is provided to the player to confirm the purchase in the form of an email and/or text message notification.

Some embodiments include a system for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the purchase is paid for electronically using the billing information of one or more players that play the video game, and wherein delivery information pertaining to the delivery destination of the goods and/or services is received from the player, and wherein confirmation is provided to the player to confirm the purchase, in the form of confirmation within the video game, and wherein the event of the purchase is made known to other players within the video game.

Some embodiments include a system for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the purchase is paid for electronically using the billing information of one or more players that play the video game, and wherein delivery information pertaining to the delivery destination of the goods and/or services is received from the player, and wherein confirmation is provided to the player to confirm the purchase, in the form of confirmation within the video game, and wherein the event of the purchase is made known to users of an online social network.

Some embodiments include a system for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the purchase is paid for electronically using the billing information of one or more players that play the video game, and wherein delivery information pertaining to the delivery destination of the goods and/or services is received from the player, and wherein the player receives a benefit within the video game as a result of the purchase.

Some embodiments include a system for displaying an in-game representation of a merchant outlet within a video game, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the player's video game computer communicates over a network with a game server, and where the game server contains video game software for creating the representation of the merchant outlet.

Some embodiments include a system for displaying an in-game representation of a merchant outlet within a video game, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the player's video game computer communicates over a network with a game server, and where the game server contains video game software for creating the representation of the merchant outlet, and wherein the game server is connected to a merchant server, and where the merchant server facilitates at least part of the purchase of goods and/or services from the merchant outlet.

Some embodiments include a system for displaying an in-game representation of a merchant outlet within a video game, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the player's video game computer communicates over a network with a game server and a merchant server, and where the game server contains video game software for creating the representation of the merchant outlet.

Some embodiments include a system for displaying an in-game representation of a merchant outlet within a video game, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the player's video game computer communicates over a network with a game server and a merchant server, and where the game server contains video game software for creating the representation of the merchant outlet, and wherein the merchant server facilitates at least part of the purchase of goods and/or services from the merchant outlet.

Some embodiments include a system for displaying an in-game representation of a merchant outlet within a video game, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the player's video game computer communicates over a network with a merchant server, and wherein the merchant server facilitates at least part of the purchase of goods and/or services from the merchant outlet.

Some embodiments include a method for displaying an in-game representation of a merchant outlet within a video game comprising the steps of: receiving a signal that a representation of a merchant outlet has been accessed by a player's character within the video game, receiving a signal that the player has purchased goods and/or services from the merchant outlet through the actions of the player's character within the video game, where the goods and/or services are for use in the real world.

Some embodiments include a method for displaying an in-game representation of a merchant outlet within a video game comprising the steps of: receiving a signal that a representation of a merchant outlet has been accessed by a player's character within the video game, receiving a signal that the player has purchased goods and/or services from the merchant outlet through the actions of the player's character within the video game, wherein the goods and/or services are for use in the real world, and wherein the video game is capable of running on a video game computer that can connect to one or more game server through computer networking Some embodiments include a method for displaying an in-game representation of a merchant outlet within a video game comprising the steps of: receiving a signal that a representation of a merchant outlet has been accessed by a player's character within the video game, receiving a signal that the player has purchased goods and/or services from the merchant outlet through the actions of the player's character within the video game, and receiving billing information from one or more players that play the video game to electronically pay for the purchase, wherein the goods and/or services are for use in the real world, and wherein the video game is capable of running on a video game computer that can connect to one or more game server through computer networking Some embodiments include a method for displaying an in-game representation of a merchant outlet within a video game comprising the steps of: receiving a signal that a representation of a merchant outlet has been accessed by a player's character within the video game, receiving a signal that the player has purchased goods and/or services from the merchant outlet through the actions of the player's character within the video game, and receiving information pertaining to the delivery destination of the goods and/or services, wherein the goods and/or services are for use in the real world, and wherein the video game is capable of running on a video game computer that can connect to one or more game server through computer networking.

Some embodiments include a method for displaying an in-game representation of a merchant outlet within a video game comprising the steps of: receiving a signal that a representation of a merchant outlet has been accessed by a player's character within the video game, receiving a signal that the player has purchased goods and/or services from the merchant outlet through the actions of the player's character within the video game, and sending confirmation to the player to confirm the purchase in the form of confirmation within the video game, wherein the goods and/or services are for use in the real world, and wherein the video game is capable of running on a video game computer that can connect to one or more game server through computer networking.

Some embodiments include a method for displaying an in-game representation of a merchant outlet within a video game comprising the steps of: receiving a signal that a representation of a merchant outlet has been accessed by a player's character within the video game, receiving a signal that the player has purchased goods and/or services from the merchant outlet through the actions of the player's character within the video game, providing confirmation to the player to confirm the purchase in the form of an email and/or text message notification, wherein the goods and/or services are for use in the real world, and wherein the video game is capable of running on a video game computer that can connect to one or more game server through computer networking Some embodiments include a method for displaying an in-game representation of a merchant outlet within a video game comprising the steps of: receiving a signal that a representation of a merchant outlet has been accessed by a player's character within the video game, receiving a signal that the player has purchased goods and/or services from the merchant outlet through the actions of the player's character within the video game, and providing confirmation to the player to confirm the purchase, in the form of confirmation within the video game wherein the event of the purchase is made known to other players within the video game, wherein the goods and/or services are for use in the real world, and wherein the video game is capable of running on a video game computer that can connect to one or more game server through computer networking Some embodiments include a method for displaying an in-game representation of a merchant outlet within a video game comprising the steps of: receiving a signal that a representation of a merchant outlet has been accessed by a player's character within the video game, receiving a signal that the player has purchased goods and/or services from the merchant outlet through the actions of the player's character within the video game, and providing confirmation to the player to confirm the purchase, in the form of confirmation within the video game such that the event of the purchase is made known to users of an online social network, wherein the goods and/or services are for use in the real world, and wherein the video game is capable of running on a video game computer that can connect to one or more game server through computer networking Some embodiments include a method for displaying an in-game representation of a merchant outlet within a video game comprising the steps of: receiving a signal that a representation of a merchant outlet has been accessed by a player's character within the video game, receiving a signal that the player has purchased goods and/or services from the merchant outlet through the actions of the player's character within the video game, and providing the player a benefit within the video game as a result of the purchase, wherein the goods and/or services are for use in the real world, and wherein the video game is capable of running on a video game computer that can connect to one or more game server through computer networking Some embodiments include a system with means for displaying an in-game representation of a merchant outlet within a video game, wherein the representation of a merchant outlet is accessed by a player's character within the video game, and wherein the player may purchase goods and/or services from the merchant outlet through the actions of the player's character within the video game, and wherein the goods and/or services are for use in the real world.

Some embodiments include a system with means for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world.

Some embodiments include a system with means for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the purchase is paid for electronically using the billing information of one or more players that play the video game.

Some embodiments include a system with means for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the purchase is paid for electronically using the billing information of one or more players that play the video game, and wherein delivery information pertaining to the delivery destination of the goods and/or services is received from the player.

Some embodiments include a system with means for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the purchase is paid for electronically using the billing information of one or more players that play the video game, and wherein delivery information pertaining to the delivery destination of the goods and/or services is received from the player, and wherein confirmation is provided to the player to confirm the purchase in the form of confirmation within the video game.

Some embodiments include a system with means for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the purchase is paid for electronically using the billing information of one or more players that play the video game, and wherein delivery information pertaining to the delivery destination of the goods and/or services is received from the player, and wherein confirmation is provided to the player to confirm the purchase in the form of an email and/or text message notification.

Some embodiments include a system with means for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the purchase is paid for electronically using the billing information of one or more players that play the video game, and wherein delivery information pertaining to the delivery destination of the goods and/or services is received from the player, and wherein confirmation is provided to the player to confirm the purchase, in the form of confirmation within the video game, and wherein the event of the purchase is made known to other players within the video game.

Some embodiments include a system with means for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the purchase is paid for electronically using the billing information of one or more players that play the video game, and wherein delivery information pertaining to the delivery destination of the goods and/or services is received from the player, and wherein confirmation is provided to the player to confirm the purchase, in the form of confirmation within the video game, and wherein the event of the purchase is made known to users of an online social network.

Some embodiments include a system with means for displaying an in-game representation of a merchant outlet within a video game, where the video game is capable of running on a video game computer that can connect to one or more game server through computer networking, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the purchase is paid for electronically using the billing information of one or more players that play the video game, and wherein delivery information pertaining to the delivery destination of the goods and/or services is received from the player, and wherein the player receives a benefit within the video game as a result of the purchase.

Some embodiments include a system with means for displaying an in-game representation of a merchant outlet within a video game, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the player's video game computer communicates over a network with a game server, and where the game server contains video game software for creating the representation of the merchant outlet.

Some embodiments include a system with means for displaying an in-game representation of a merchant outlet within a video game, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the player's video game computer communicates over a network with a game server, and where the game server contains video game software for creating the representation of the merchant outlet, and wherein the game server is connected to a merchant server, and where the merchant server facilitates at least part of the purchase of goods and/or services from the merchant outlet.

Some embodiments include a system with means for displaying an in-game representation of a merchant outlet within a video game, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the player's video game computer communicates over a network with a game server and a merchant server, and where the game server contains video game software for creating the representation of the merchant outlet.

Some embodiments include a system with means for displaying an in-game representation of a merchant outlet within a video game, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the player's video game computer communicates over a network with a game server and a merchant server, and where the game server contains video game software for creating the representation of the merchant outlet, and wherein the merchant server facilitates at least part of the purchase of goods and/or services from the merchant outlet.

Some embodiments include a system with means for displaying an in-game representation of a merchant outlet within a video game, wherein the representation of a merchant outlet is accessed by a player's character within the video game, and wherein the player may purchase goods and/or services from the merchant outlet through the actions of the player's character within the video game, and wherein the goods and/or services are for use in the real world, and wherein the player's video game computer communicates over a network with a merchant server, and wherein the merchant server facilitates at least part of the purchase of goods and/or services from the merchant outlet.

Some embodiments include methods to allow video game players to purchase goods and/or services electronically through the use of computer networking, where such goods and/or services are purchased within a video game environment and wherein such goods and/or services are for use in the real world.

Some embodiments include a video game program with software for displaying a representation of a merchant outlet within the video game environment, software for providing online merchant outlet functionality to a video game player within the video game, and software for accepting orders for goods and/or services from a player from within the video game.

Some embodiments include a system for displaying a representation of a merchant outlet within a video game environment, and for further providing online merchant outlet functionality to a video game player within the video game, and for further accepting orders for goods and/or services from a player from within the video game, where such goods and/or services are for use in real-life.

Some embodiments include a game server configured to manage orders for real-life goods and/or services placed by a player within a video game environment, wherein the game server is remotely located from the player's video game computer.

Some embodiments include one or more methods, for example, a method of electronic commerce, comprising the steps of, providing a representation of a merchant outlet within a video game environment, providing offerings of goods and/or services to a video game player when the video game player's character appropriately interacts with the merchant outlet within the video game, and receiving orders for goods and/or services offered from the merchant outlet within the video game, where such orders include billing information and delivery information, and where such goods and/or services are for use in real-life.

Some embodiments include a method of producing a system for conducting electronic commerce, comprising the steps of, preparing an executable program or component thereof configured to: provide a representation of a merchant outlet within a video game environment, provide the ability for player's characters in the video game to interact with the merchant outlet, and provide the ability to receive orders for goods and/or services offered from the merchant outlet within the video game.

These and other embodiments and features may be implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

Example System

Figure 33:
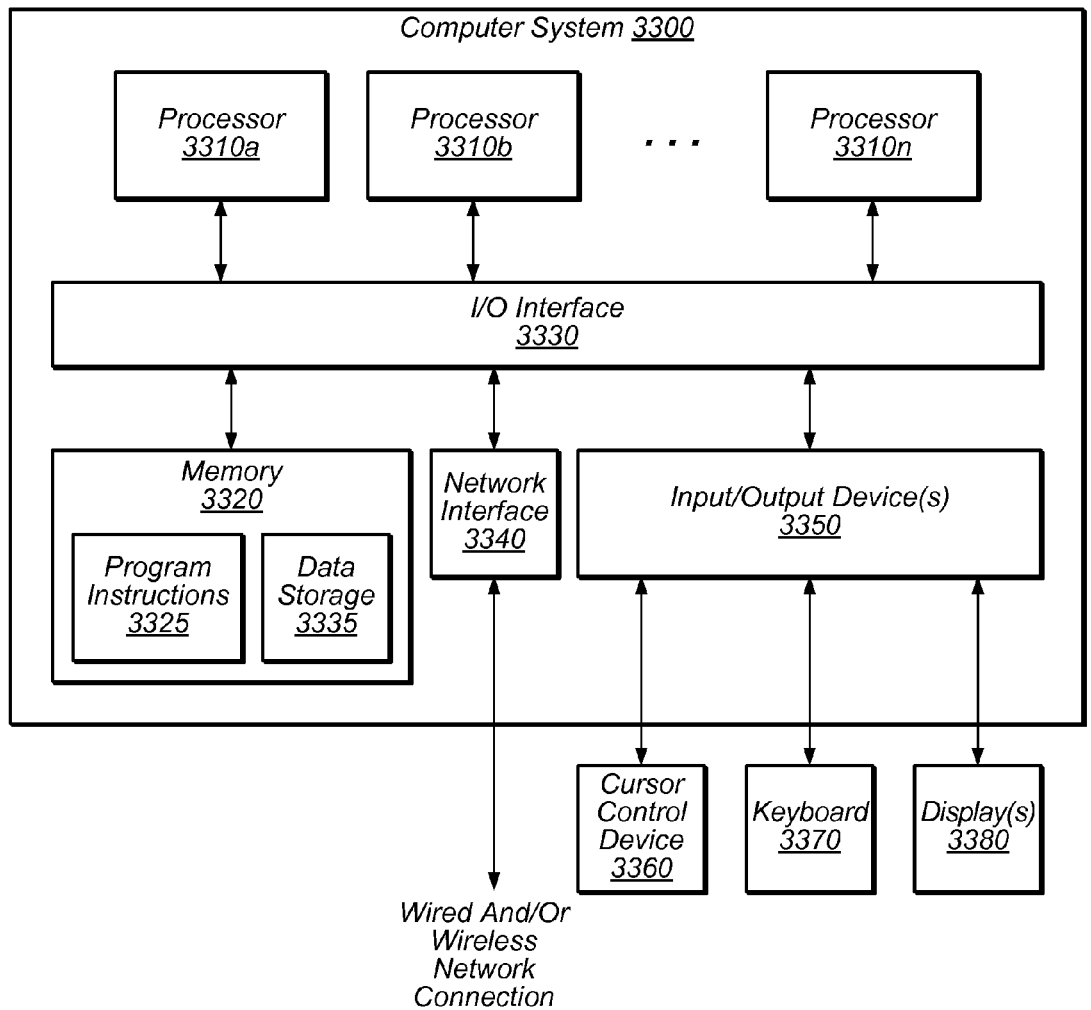
FIG. 33 illustrates an example computer system that may be used in embodiments.

Embodiments of a system for electronic commerce initiated through use of video games and fulfilled by delivery of physical goods as described herein may be executed on one or more computer systems, which may interact with various other devices. One such computer system is illustrated by FIG. 33. In different embodiments, computer system 3300 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 3300 includes one or more processors 3310 coupled to a system memory 3320 via an input/output (I/O) interface 3330. Computer system 3300 further includes a network interface 3340 coupled to I/O interface 3330, and one or more input/output devices 3350, such as cursor control device 3360, keyboard 3370, and display(s) 3380. In some embodiments, it is contemplated that embodiments are implemented using a single instance of computer system 3300, while in other embodiments multiple such systems, or multiple nodes making up computer system 3300, are configured to host different portions or instances of embodiments. For example, in one embodiment some elements are implemented via one or more nodes of computer system 3300 that are distinct from those nodes implementing other elements.

In various embodiments, computer system 3300 is a uniprocessor system including one processor 3310, or a multiprocessor system including several processors 3310 (e.g., two, four, eight, or another suitable number). Processors 3310 may be any suitable processor capable of executing instructions. For example, in various embodiments, processors 3310 are general-purpose or embedded processors implementing any of a variety of instruction set architectures (ISAs), such as the x86, PowerPC, SPARC, or MIPS ISAs, or any other suitable ISA. In multiprocessor systems, each of processors 3310 may commonly, but not necessarily, implement the same ISA.

In some embodiments, at least one processor 3310 is a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 3320 may be configured to store program instructions and/or data accessible by processor 3310. In various embodiments, system memory 3320 is implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a module for electronic commerce initiated through use of video games and fulfilled by delivery of physical goods are shown stored within system memory 3320 as program instructions 3325 and data storage 3335, respectively. In other embodiments, program instructions and/or data is received, sent or stored upon different types of computer-accessible media or on similar media separate from system memory 3320 or computer system 3300. Generally speaking, a computer-accessible medium may include storage media or memory media such as magnetic or optical media, e.g., disk or CD/DVD-ROM coupled to computer system 3300 via I/O interface 3330. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 3340.

In one embodiment, I/O interface 3330 is configured to coordinate I/O traffic between processor 3310, system memory 3320, and any peripheral devices in the device, including network interface 3340 or other peripheral interfaces, such as input/output devices 3350. In some embodiments, I/O interface 3330 may perform any necessary protocol, timing or other data transformations to convert data signals from one component (e.g., system memory 3320) into a format suitable for use by another component (e.g., processor 3310). In some embodiments, I/O interface 3330 may include support for devices attached through various types of peripheral buses, such as a variant of the Peripheral Component Interconnect (PCI) bus standard or the Universal Serial Bus (USB) standard, for example. In some embodiments, the function of I/O interface 3330 is split into two or more separate components, such as a north bridge and a south bridge, for example. In addition, in some embodiments some or all of the functionality of I/O interface 3330, such as an interface to system memory 3320, is incorporated directly into processor 3310.

Network interface 3340 may be configured to allow data to be exchanged between computer system 3300 and other devices attached to a network, such as other computer systems, or between nodes of computer system 3300. In various embodiments, network interface 3340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 3350 may, in some embodiments, include one or more display terminals, keyboards, keypads, touchpads, scanning devices, voice or optical recognition devices, or any other devices suitable for entering or retrieving data by one or more computer system 3300. Multiple input/output devices 3350 may be present in computer system 3300 or may be distributed on various nodes of computer system 3300. In some embodiments, similar input/output devices are separate from computer system 3300 and may interact with one or more nodes of computer system 3300 through a wired or wireless connection, such as over network interface 3340.

As shown in FIG. 33, memory 3320 may include program instructions 3325, configured to implement embodiments of a module for electronic commerce initiated through use of video games and fulfilled by delivery of physical goods as described herein, and data storage 3335, comprising various data accessible by program instructions 3325. In one embodiment, program instructions 3325 may include software elements of embodiments of a module for electronic commerce initiated through use of video games and fulfilled by delivery of physical goods as illustrated in the above Figures. Data storage 3335 may include data that may be used in embodiments. In other embodiments, other or different software elements and data may be included.

Those skilled in the art will appreciate that computer system 3300 is merely illustrative and is not intended to limit the scope of a module for electronic commerce initiated through use of video games and fulfilled by delivery of physical goods as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 3300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 3300 may be transmitted to computer system 3300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

As will be appreciated by one skilled in the art, the present invention may be embodied as a system, method, or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized with the invention. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a hard disk, a portable computer diskette, a read-only memory (ROM), a random access memory (RAM), an erasable programmable read-only memory (EPROM or Flash memory), an optical fiber, a compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this specification, a computer-usable or computer-readable medium may be any medium that can contain, store, propagate, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, RF, optical fiber cable, etc.

Computer program code for carrying out operations of the present invention may be written in any combination of one or more programming languages. The program code may execute entirely on a player's video game computer, partly on a player's video game computer, as a stand-alone software package, partly on a player's video game computer and partly on a remote computer (e.g., a game server) or entirely on a remote computer. In the latter scenario, the remote computer may be connected to the player's video game computer through any type of network, including a local area network (LAN) or a wide area network (WAN), or the connection may be made to an external computer (for example, through the Internet).

The present invention is described herein with reference to flowchart figures and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

1. Terms

Within this application, the term "billing information" shall mean any information pertaining to the billing of charges, including a name, billing address, credit card account information, bank account information, Pay Pal account information, bank account routing number information, electronic funds transfer information, or other information used in the processing of payments.

Within this application, the term "credit card" means a credit instrument issued by a real world institution that allows a player to make purchases by providing an account identifier (e.g. a credit card number) rather than cash or other currency. Examples include credit cards issued by Visa, American Express, Discover, and MasterCard. For the purposes of the present application, the term "credit card" is intended in a broad sense and is not limited to situations in which a player's purchases are made on credit (i.e. where payments for those purchases is not due until a later time) but also includes financial instruments such as debit cards, check cards, gift cards, and the like.

Within this application, the term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

Within this application, the term "invention" and the like mean "the one or more inventions disclosed in this application," unless expressly specified otherwise.

Within this application, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments of the disclosed invention(s)," unless expressly specified otherwise.

Within this application, a "variation" of an invention means an embodiment of the invention, unless expressly specified otherwise.

Within this application, a reference to "another embodiment" in describing an embodiment does not imply that the referenced embodiment is mutually exclusive with another embodiment (e.g., an embodiment described before the referenced embodiment), unless expressly specified otherwise.

Within this application, the terms "including," "comprising" and variations thereof mean "including but not necessarily limited to," unless expressly specified otherwise. Thus, for example, the sentence "the portfolio includes a blue widget and a red widget" means the portfolio includes the blue widget and the red widget, but may include something else.

Within this application, the terms "a," "an" and "the" mean "one or more," unless expressly specified otherwise.

Within this application, the phrase "at least one of," when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of," when such phrase modifies a plurality of things does not mean "one of each of" the plurality of things.

Within this application, the phrase "based on" does not mean "based only on," unless expressly specified otherwise. In other words, the phrase "based on" describes both "based only on" and "based at least on." The phrase "based at least on" is equivalent to the phrase "based at least in part on."

Within this application, the term "represent" and like terms are not exclusive, unless expressly specified otherwise. For example, the term "represents" does not mean "represents only," unless expressly specified otherwise. In other words, the phrase "the data represents a credit card number" describes both "the data represents only a credit card number" and "the data represents a credit card number and the data also represents something else."

Within this application, the term "e.g." and like terms mean "for example," and thus does not limit the term or phrase it explains. For example, in the sentence "the server sends data (e.g., instructions, a data structure) over the Internet," the term "e.g." explains that "instructions" are an example of "data" that the server may send over the Internet, and also explains that "a data structure" is an example of "data" that the server may send over the Internet. However, both "instructions" and "a data structure" are merely examples of "data," and other things besides "instructions" and "a data structure" can be "data."

Within this application, the term "respective" and like terms mean "taken individually." Thus if two or more things have "respective" characteristics, then each such thing has its own characteristic, and these characteristics can be different from each other but need not be. For example, the phrase "each of two computers has a respective function" means that the first such computer has a function and the second such computer has a function as well. The function of the first computer may or may not be the same as the function of the second computer.

Within this application, where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to," the mere usage of the phrase "including but not limited to" does not mean that the term "including" means something other than "including but not limited to."

Within this application, the term "determining" and grammatical variants thereof (e.g., to determine a price, determining a value, determine an object which meets a certain criterion) is used in a broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

Within this application, the term "determining" does not imply certainty or absolute precision, and therefore "determining" can include estimating, approximating, extrapolating, predicting, guessing and the like.

Within this application, the term "determining" does not imply that mathematical processing must be performed, and does not imply that numerical methods must be used, and does not imply that an algorithm or process is used.

Within this application, the term "determining" does not imply that any particular device must be used. For example, a computer need not necessarily perform the determining.

Within this application, where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Within this application, when an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

Within this application, when a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, within this application, where more than one device, article or other product is described herein (whether or not they cooperate), in another embodiment a single device or article may alternatively be used in place of the more than one device or article that is described. For example, a plurality of computer-based devices may be substituted with a single computer-based device. (Conversely, a single computer-based device may be substituted with multiple computer-based devices operating in cooperation with one another.) Accordingly, the various functionality that is described as being possessed by more than one device or article may alternatively be possessed by a single device or article.

Within this application, the functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

2. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim.

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites. No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

3. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

Within this application, the term "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

Within this application, the term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

4. 35 U.S.C. §112(f)

In a claim, a limitation of the claim which includes the phrase "means for" or the phrase "step for" means that 35 U.S.C. §112 (f) applies to that limitation.

With respect to a means or a step for performing a specified function in accordance with 35 U.S.C. §112(f), the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112(f), structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

5. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform."

6. Incorporation by Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

7. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

What is claimed is:

1. A method for enabling electronic commerce initiated through use of a video game, comprising:
    presenting a video game to one or more video game players;
    displaying during play of the video game an in-game representation of a merchant outlet with which at least one video game player of the one or more video game players may interact consistent with game play mechanics of the video game,
        wherein the in-game representation of the merchant outlet displayed during play of the video game presents one or more offers of items for sale, and
            wherein the items for sale are offered as physical items outside of a video game environment in which the video game is played;
    receiving input originating from at least one video game player of the one or more video game players during play of the video game, the input indicating interaction between a video game character and at least one of the in-game representation of the merchant outlet and an in-game representation of at least one of the items for sale,
        wherein the video game character is controlled at least in part by the at least one video game player; and
    ordering one or more items corresponding to one or more of the offers of items for sale presented by the merchant outlet,
        wherein the ordering is effected in response to receiving the input, and
    wherein
        the interaction includes a change in a proximity of the video game character to the in-game representation of the merchant outlet and the change in the proximity is necessary to complete the ordering, or
        the interaction is between the video game character and the in-game representation of at least one of the items for sale and an ending of the interaction is necessary to complete the ordering.

2. The method of claim 1, wherein the interaction includes a change in a proximity of the video game character to the in-game representation of the merchant outlet and the input indicates the change in the proximity,
    wherein the change in proximity indicates the video game character leaving the in-game representation of the merchant outlet or a proximity around the in-game representation of the merchant outlet.

3. The method of claim 1, further comprising:
    storing in a database information pertaining to the one or more video game players playing the video game, the information including billing information; and
    using billing information of the at least one video game player to pay for the one or more ordered items,
        wherein the use of billing information is responsive at least in part to the input originating from the at least one video game player during play of the video game.

* * * * *